(12) United States Patent
Kwon et al.

(10) Patent No.: US 9,710,147 B2
(45) Date of Patent: Jul. 18, 2017

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Arim Kwon, Seoul (KR); Songyi Baek, Seoul (KR); Sehyun Jung, Seoul (KR); Eunsoo Jung, Seoul (KR); Hyemi Jung, Seoul (KR); Kyunghye Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/281,366

(22) Filed: May 19, 2014

(65) Prior Publication Data

US 2015/0026620 A1    Jan. 22, 2015

(30) Foreign Application Priority Data

May 29, 2013 (KR) .......................... 10-2013-0061221
Jun. 12, 2013 (KR) .......................... 10-2013-0067413

(51) Int. Cl.
*G06F 3/048* (2013.01)
*G06F 3/0486* (2013.01)
*G06F 3/0488* (2013.01)
(Continued)

(52) U.S. Cl.
CPC .......... *G06F 3/0486* (2013.01); *G06F 3/0488* (2013.01); *G06F 3/04817* (2013.01);
(Continued)

(58) Field of Classification Search
CPC ....................................................... G06F 3/048
See application file for complete search history.

(56) References Cited

U.S. PATENT DOCUMENTS

| 2007/0061747 A1 | 3/2007 | Hahn et al. |
| 2011/0125970 A1* | 5/2011 | Commarford .......... G06F 17/24 |
| | | 711/126 |

(Continued)

FOREIGN PATENT DOCUMENTS

| EP | 2 503 442 A2 | 9/2012 |
| JP | 2005-301647 A | 10/2005 |

OTHER PUBLICATIONS

Hamburger., "Launch Center Pro for iPhone Lets You Speed-Dial Emails, Texts, and Tweets", The Verge, Jun. 21, 2012, 4 pages. XP-055157562.

(Continued)

*Primary Examiner* — Xuyang Xia
(74) *Attorney, Agent, or Firm* — Birch, Stewarat, Kolasch & Birch, LLP

(57) ABSTRACT

A mobile terminal including a wireless communication unit configured to provide wireless communication; a touchscreen; a memory; and a controller configured to display a clipboard including copied content on the touchscreen, receive a paste selection signal indicating a pasting of the copied content from the clipboard to another location on the touchscreen, determine a property of the other location of the touchscreen, and modify a type of the copied content to correspond to the determined property of the other location when the content is pasted to the other location.

15 Claims, 61 Drawing Sheets

(51) Int. Cl.
*G06F 9/54* (2006.01)
*G06F 3/0481* (2013.01)
*G06F 3/0484* (2013.01)

(52) U.S. Cl.
CPC ...... *G06F 3/04845* (2013.01); *G06F 3/04883* (2013.01); *G06F 3/04886* (2013.01); *G06F 9/543* (2013.01); *G06F 2203/04804* (2013.01); *G06F 2203/04808* (2013.01)

(56) References Cited

U.S. PATENT DOCUMENTS

| | | | | |
|---|---|---|---|---|
| 2011/0126093 | A1* | 5/2011 | Ozzie | G06F 9/543 715/256 |
| 2011/0165841 | A1* | 7/2011 | Baek | H04L 67/10 455/41.2 |
| 2011/0197155 | A1* | 8/2011 | Lee | G06F 1/1616 715/770 |
| 2012/0246594 | A1* | 9/2012 | Han | G06F 3/0486 715/790 |
| 2014/0026099 | A1* | 1/2014 | Andersson Reimer | G06F 3/04883 715/825 |

OTHER PUBLICATIONS

Stylos et al., "Citrine: Providing Intelligent Copy-and-Paste", Proceedings of the 17th Annual ACM Symposium on User Interface Software and Technology, Sante Fe, NM, Oct. 24-27, 2004, vol. 6, Issue 2, 4 pages. XP-002662205.

* cited by examiner

FIG. 9
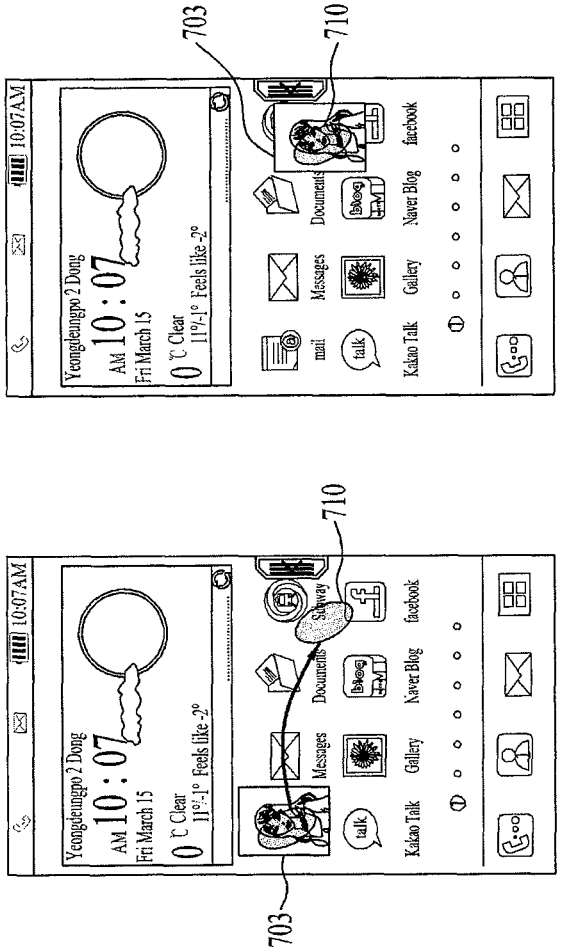
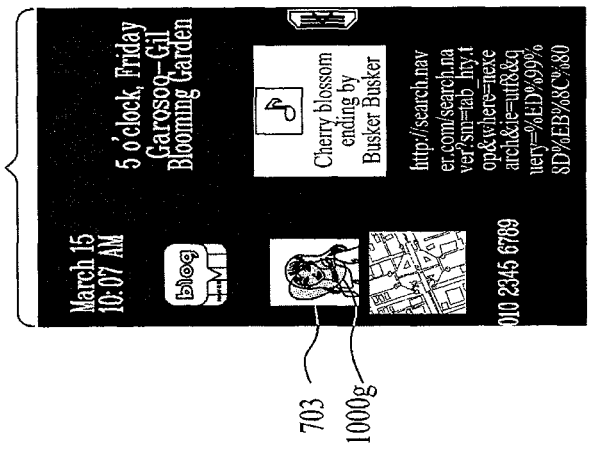

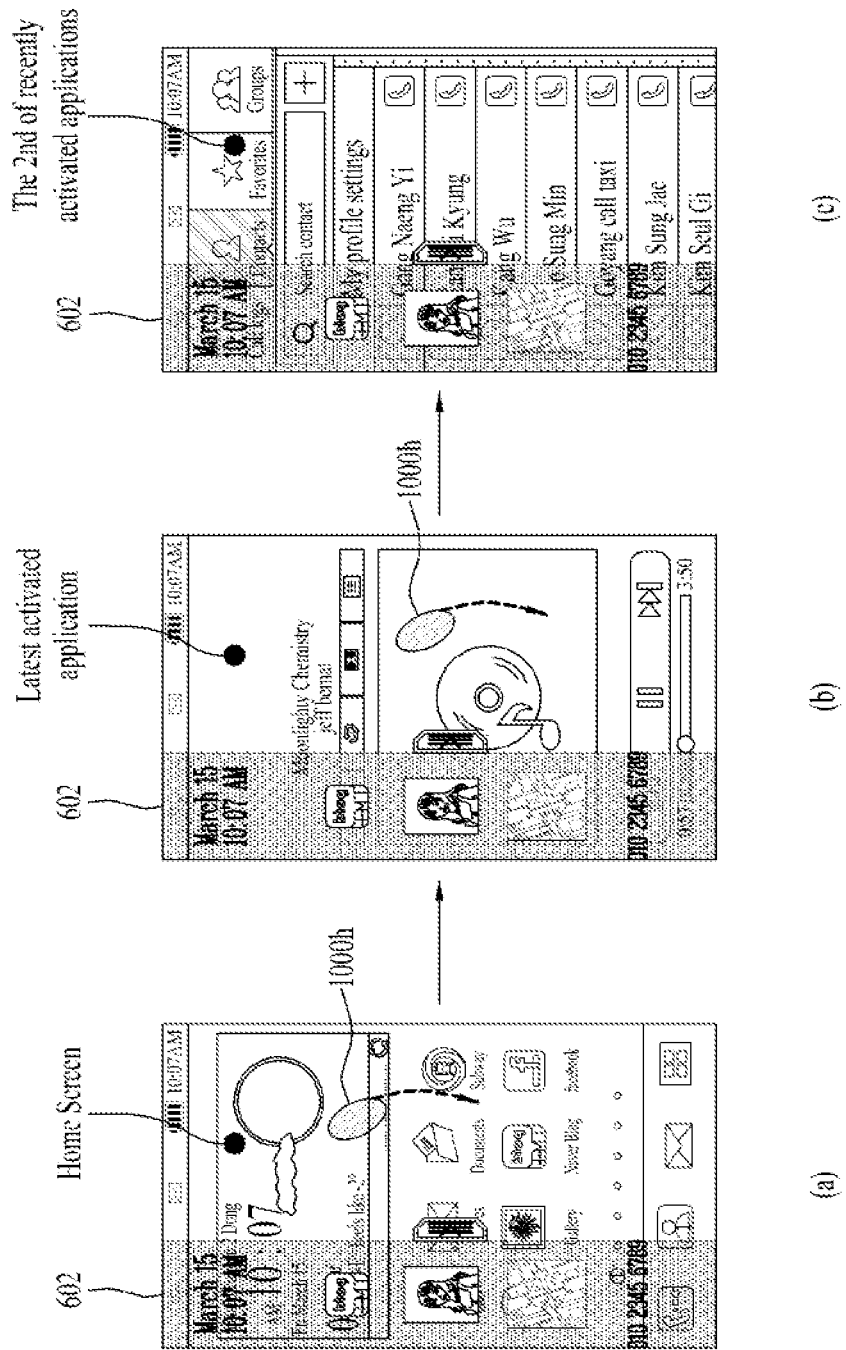

FIG. 11B
<Application layer is located on a top layer>   <Clipboard layer is located on a top layer>
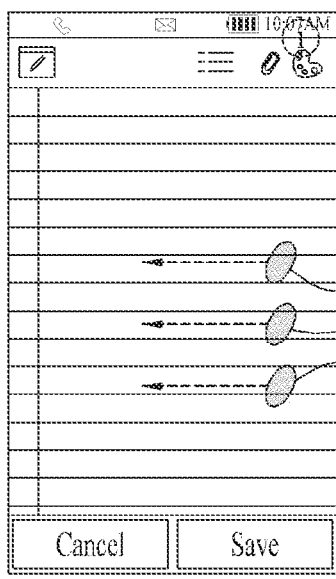
(a)   (b)

(a)            (b)

(a)   (b)

(a)  (b)

FIG. 36
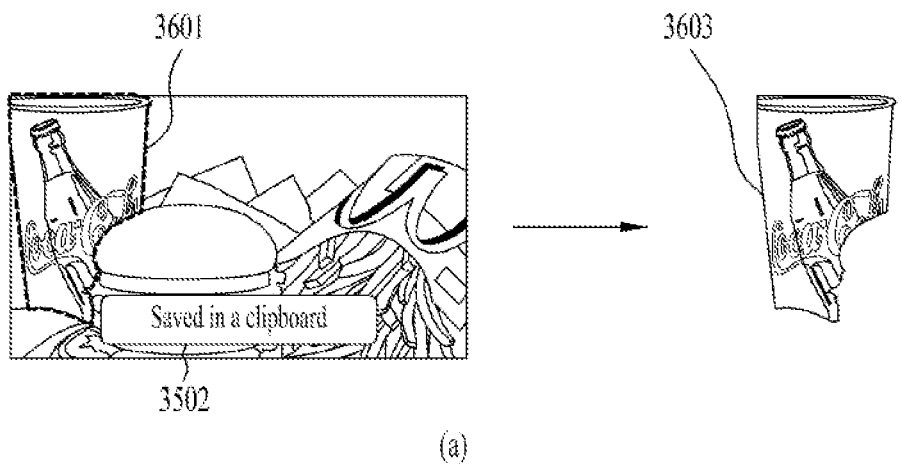
(a)
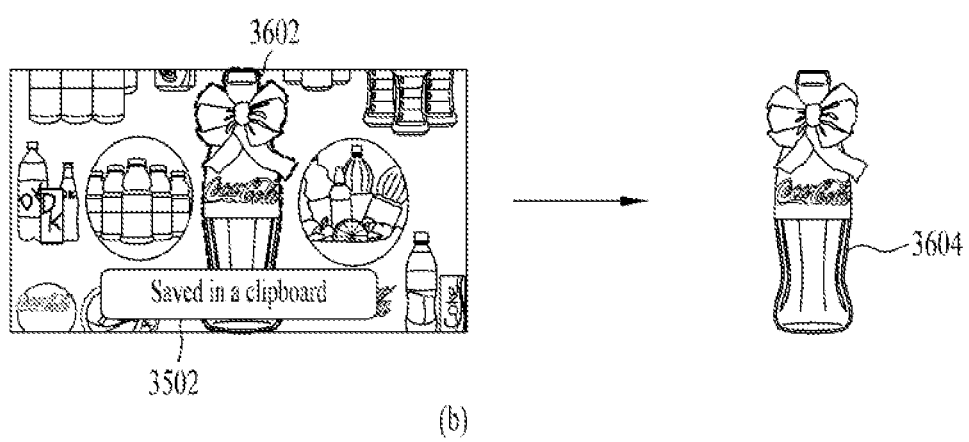
(b)

FIG. 39
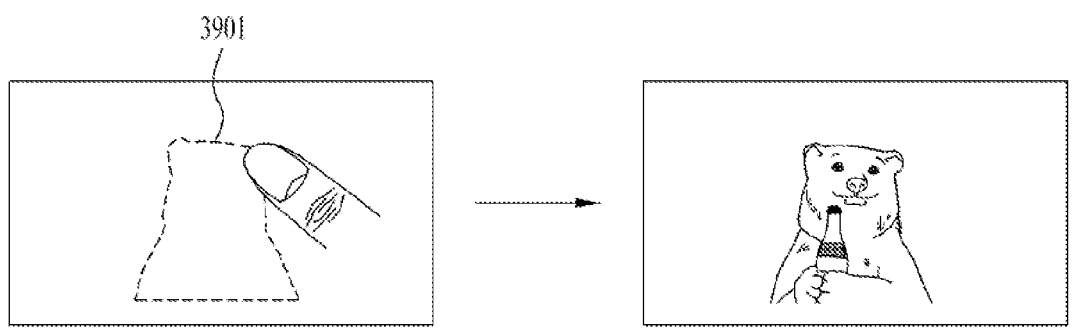
(a)    (b)
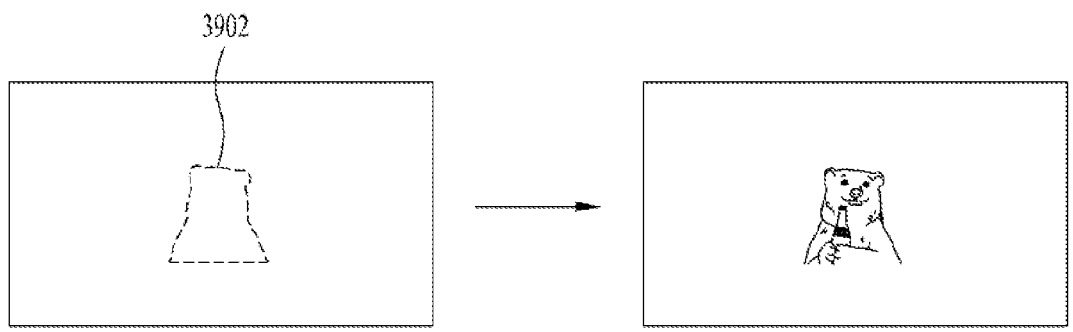
(c)    (d)

ns and stationary terminals. In addition, mobile terminals
MOBILE TERMINAL AND CONTROLLING METHOD THEREOF Pursuant to 35 U.S.C. §119(a), this application claims the benefit of earlier filing date and right of priority to Korean Applications Nos. 10-2013-0061221, filed on May 29, 2013, and 10-2013-0067413, filed on Jun. 12, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal can perform various functions including data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, mobile terminals can be further classified into handheld terminals and vehicle mounted terminals.

Recently, mobile terminals have been provided as smartphone versions and the performance of a mobile terminal has significantly advanced. The advanced performance however increases the amount and/or types of contents handled by the mobile terminal.

Generally, a mobile terminal provided as a version of a smartphone is configured by outputting a desired data through a relatively wide touchscreen as soon as receiving a control input through the output screen. However, in controlling the various and massive contents through the touchscreen, efficient controlling methods have not been provided. Particularly, the demands for a controlling method for performing a copy & paste action on various kinds of contents are increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which various kinds of contents can be managed and controlled effectively.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in the invention herein as well as the accompanying drawings. Such aspects may also be appreciated by those skilled in the art based on the invention herein.

To achieve these objects and other advantages and in accordance with the purpose of the invention, as embodied and broadly described herein, a mobile terminal according to an embodiment of the present invention may include a touchscreen, a memory configured to store at least one content, and a controller, if receiving a command for pasting a prescribed content on a prescribed location on a screen output through the touchscreen, pasting the prescribed content on the prescribed location in response to the command, the controller determining a property of the prescribed location, the controller pasting the prescribed content by modifying a paste type of the prescribed content depending on the determined property. Accordingly, the present invention provides a user interface environment facilitating a copy & paste operation of a user-designated region for multimedia contents.

In another aspect of the present invention, as embodied and broadly described herein, a method of controlling a mobile terminal according to an embodiment of the present invention may include the steps of if receiving a command for pasting a prescribed content on a prescribed location on a screen output through a touchscreen, determining a property of the prescribed location and pasting the prescribed content on the prescribed location by modifying a paste type of the prescribed content depending on the determined property.

In another aspect of the present invention, as embodied and broadly described herein, a mobile terminal according to an embodiment of the present invention may include a memory configured to store at least one image, a touchscreen, and a controller recognizing a first touch path of a touch drag input through the touchscreen, the controller searching the at least one image for at least one image having a portion of an outline figure matched to the recognized first touch path.

Preferably, the controller may output the outline figure of the found at least one image to the touchscreen.

More preferably, if a plurality of outline figures are output, the controller may control a plurality of the outline figures to be output by overlying a location of the recognized first touch path.

The controller may recognize the first touch path by real time until a touch of the touch drag input is removed. In addition, the controller may filter a plurality of the output outline figures depending on a variation of the first touch path recognized by real time.

If only one of the output outline figures remains due to the filtering, the controller may paste an image corresponding to the output outline figure on the location of the recognized first touch path.

The controller may adjust a size of the pasted image depending on a size of a figure formed by the first touch path.

More preferably, when an image saving mode, the controller may recognize a second touch path of the touch drag input through the touchscreen. If a closed curve corresponding to the recognized second touch path is formed, the controller may save a capture screen of a screen output within the closed curve.

In addition, an outline figure of the saved capture screen may include the formed closed curve.

In a further aspect of the present invention, as embodied and broadly described herein, a method of controlling a mobile terminal according to an embodiment of the present invention may include the steps of saving at least one image, recognizing a first touch path of a touch drag input through a touchscreen, and searching the at least one image for at least one image having a portion of an outline figure matched to the recognized first touch path.

Preferably, the method may further include the step of outputting the outline figure of the found at least one image to the touchscreen.

More preferably, the outputting step may include the step of if a plurality of outline figures are output, controlling a plurality of the outline figures to be output by overlying a location of the recognized first touch path.

The recognizing step may further include the steps of recognizing the first touch path by real time until a touch of the touch drag input is removed and filtering a plurality of the output outline figures depending on a variation of the first touch path recognized by real time.

The method may further include the step of if only one of the output outline figures remains due to the filtering, pasting an image corresponding to the output outline figure on the location of the recognized first touch path.

The pasting step may include the step of adjusting a size of the pasted image depending on a size of a figure formed by the first touch path.

More preferably, when an image saving mode, the method may further include the steps of recognizing a second touch path of the touch drag input through the touchscreen and if a closed curve corresponding to the recognized second touch path is formed, saving a capture screen of a screen output within the closed curve.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8 and FIG. 9 are diagrams illustrating examples of a paste operation according to one embodiment of the present invention;

FIG. 10 is a diagram illustrating one example of a method of facilitating a switching between active applications in paste mode for displaying a clipboard 602 on a prescribed region of a touchscreen 151;

FIG. 11A and FIG. 11B are diagrams illustrating one example of a method of performing a switching between a clipboard layer and an application layer in paste mode according to one embodiment of the present invention;

FIG. 36 is a diagram illustrating another example of a saved capture screen (or image) according to one embodiment of the present invention;

FIG. 39 is a diagram to describe a paste operation according to a second embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
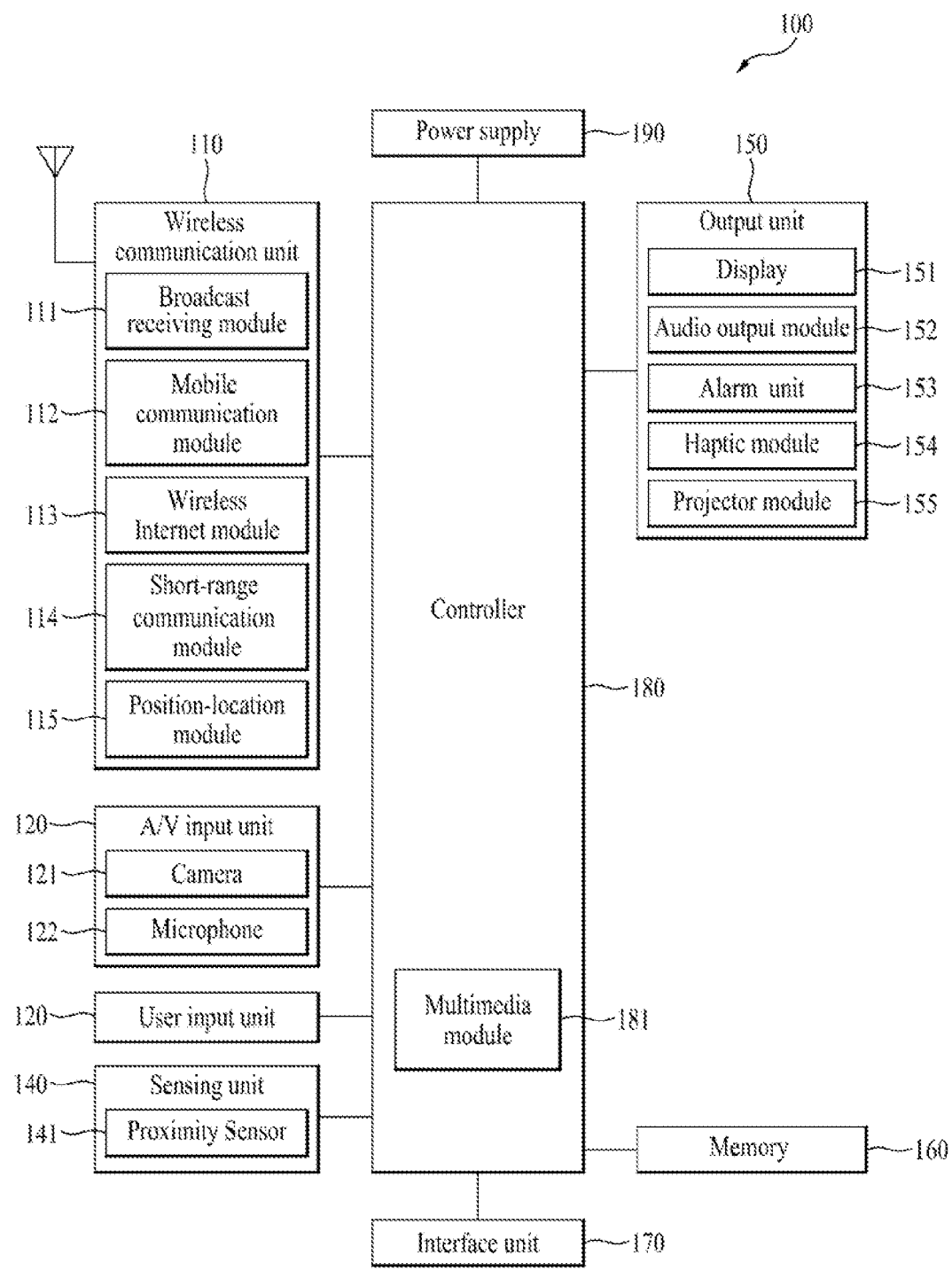
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated while receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
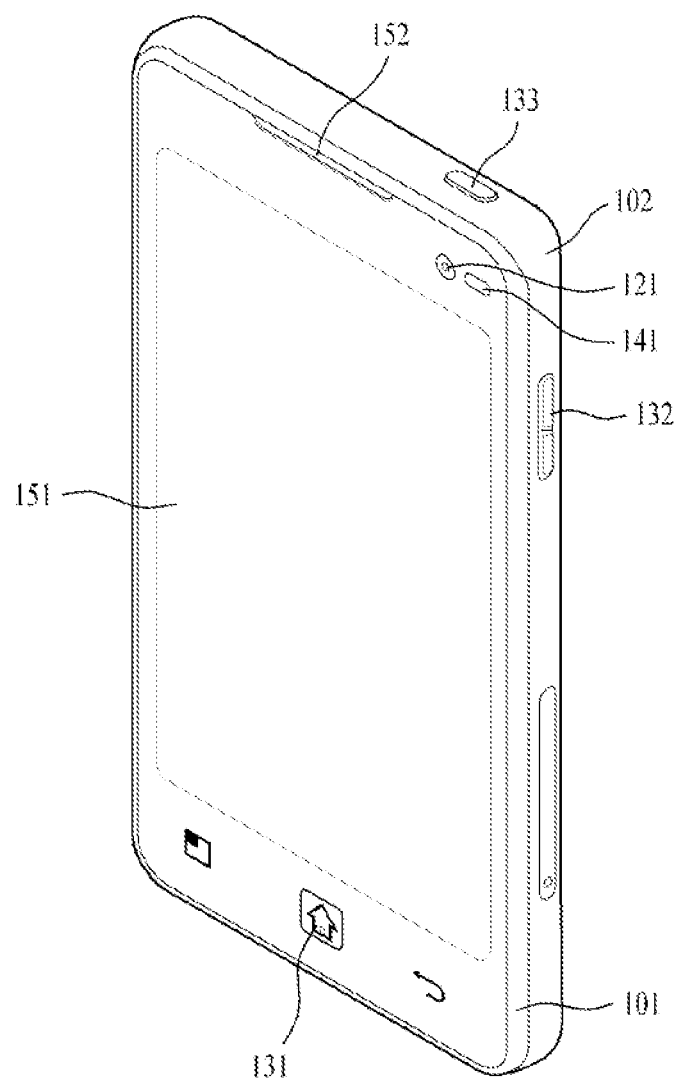
FIG. 2 is a front perspective diagram illustrating one example of a mobile or portable terminal according to an embodiment of the present invention.

FIG. 2 is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further invention will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

Figure 3:
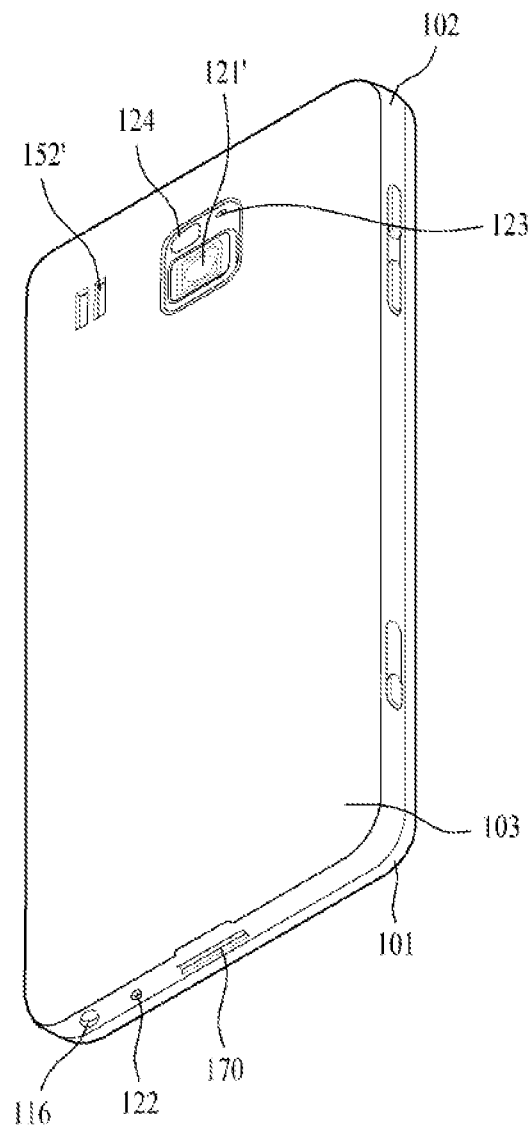
FIG. 3 is a rear perspective diagram of the mobile terminal shown in FIG. 2.

As shown in FIGS. 2 and 3, a display 151, an audio output unit 152, a camera 121, user input units 130/131 and 132, proximity sensor 141, audio output unit 152, a microphone 122, an interface 170 (FIG. 3) and the like can be provided to the terminal body.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121' has a photographing direction that is substantially opposite to the camera 121 shown in FIG. 2 and may have pixels differing from those of the camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
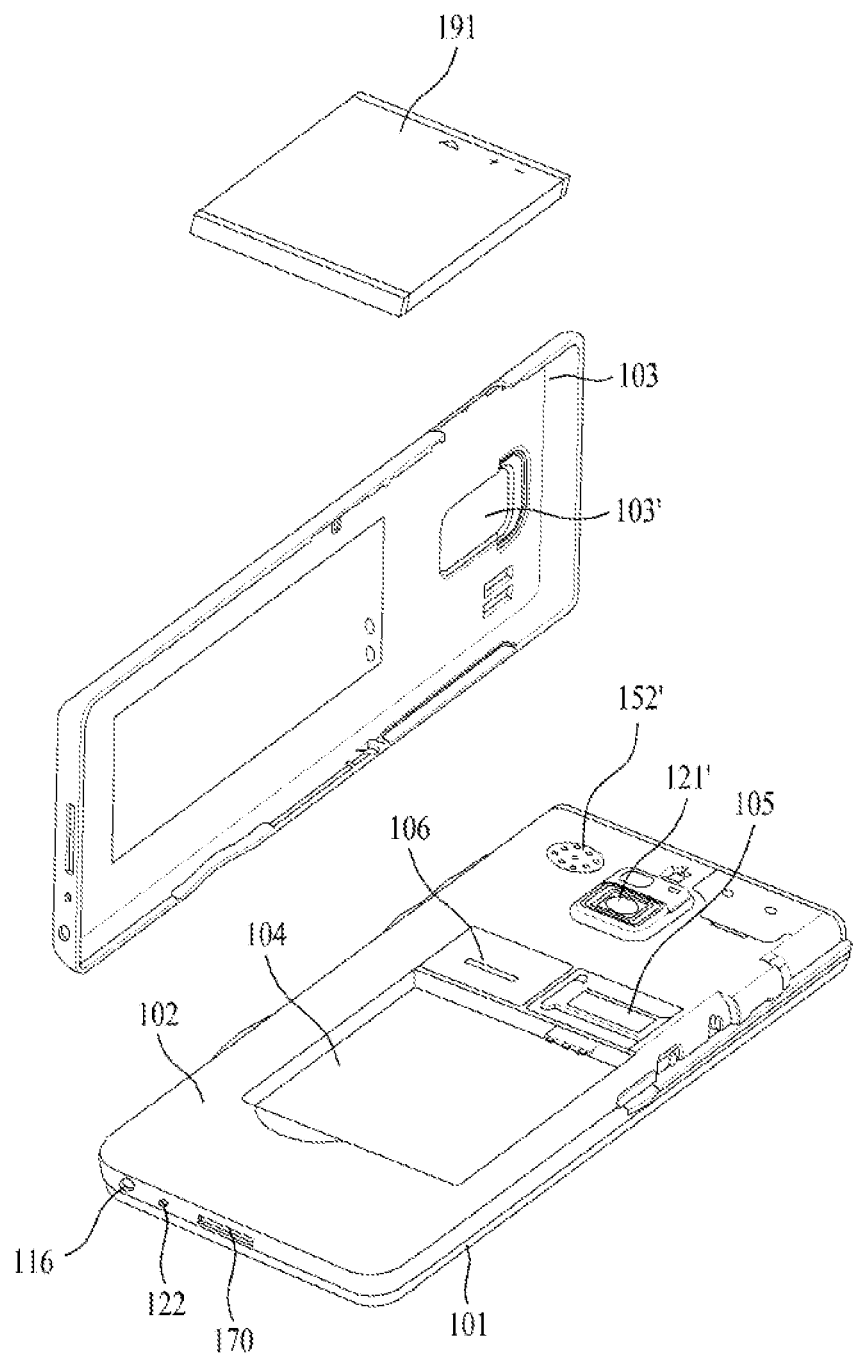
FIG. 4 is a rear perspective diagram of a surface of a rear case exposed by separating a rear cover of a mobile terminal according to one embodiment of the present invention.

Next, FIG. 4 is a rear perspective diagram of a surface of a rear case exposed by separating a rear cover of a mobile terminal according to one embodiment of the present invention. Referring to FIG. 4, a front case 101, a rear case 102, a rear cover (or a battery cover) 103, a camera 121', an interface unit 170, a microphone 122, a speaker module, an audio output unit 152', a battery 191, a battery loading unit 104, a USIM card loading unit 105, and a memory card loading unit 106 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

The battery 191 can be configured as a replaceable type, as shown in FIG. 4, to complement a considerable amount of power consumption. When the replaceable type is adopted, the battery loading unit 104 is formed on the surface of the rear case 102 to enable a user to detach the corresponding battery. In this instance, a contact terminal is provided to the battery loading unit 104 to be electrically connected to a part installed within the case.

The USIM card loading unit 105 or the memory card loading unit 106 may be provided, as shown in FIG. 4, next to the battery loading unit 104. Alternatively, the USIM card loading unit 105 or the memory card loading unit 106 may be provided to a bottom surface of the battery loading unit 104. Hence, the battery 191 can be externally exposed if the battery 191 is unloaded from the battery loading unit 104. In this instance, because a size of the battery loading unit 104 is extensible, the battery 191 can be oversized.

Although FIG. 4 shows the configuration that the USIM card loading unit 105 or the memory card loading unit 106 is mounted on a backside of the rear case 102, it can be inserted in or separated from the mobile terminal 100 by being inserted in a lateral side of the rear case 102.

The rear cover 103 covers the surface of the rear case 102. Hence, the rear cover 103 can fix the battery 191, the USIM card, the memory card, etc. not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

As mentioned in the foregoing description, since the performance of the mobile terminal 100 has made rapid progress recently, contents of various types handled by fixed terminals can be processed by the mobile terminal 100 as well. In this instance, the types of the contents may include a text content, a video content, a voice content, a location (or position) information content, an image content, a contact content and the like.

One embodiment of the present invention provides a controlling method for enhancing convenience in a mobile terminal environment that handles contents of various types. In particular, one embodiment of the present invention provides a method of facilitating a control of an operation of copying & pasting a specific content and a controlling method for adaptively performing such an operation in accordance with an environment for performing the corresponding operation.

In order to emphasize the aspect of mobility or portability, the mobile terminal 100 includes a touchscreen capable of performing both an input and an output. However, the input through the touchscreen is not appropriate for editing and controlling various kinds of multimedia contents. The reason for this is that the way for performing the input through the touchscreen are not various. Therefore, according to one embodiment of the present invention, proposed are methods of effectively controlling multimedia contents through a touchscreen. Particularly, according to one embodiment of the present invention, proposed is a method of effectively performing a copy & paste operation on multimedia contents.

Meanwhile, in the following descriptions of embodiments of the present invention, a terminology 'copy & paste operation' is used. A user may attempt to use a specific content, which is currently used in a prescribed application (or a specific use environment), in a specific application (or another use environment). In this instance, the user temporarily saves the corresponding specific content and can then input the specific content in a manner that the specific content is brought by a different application. For this operation, if an input for saving a specific content is received from a user, the controller 180 saves the corresponding specific content in the memory 160. Such an operation is named a copy operation. In the above description of the copy operation, a specific content is saved temporarily for example. Alternatively, a method of saving a specific content in a non-flash memory permanently can be included as well as a method of saving a specific content in a flash memory temporarily.

The content saved in the above manner can be input by being brought by a user's input in a different application (or a different use environment). Such an operation is named a paste operation. In particular, the paste operation means an operation performed in a manner that the controller 180 reads in a specific content saved in the memory 160 and then inputs the corresponding content.

In the following description, embodiments related to a controlling method are described with reference to the accompanying drawings.

First of all, the above-mentioned copy operation and a clipboard corresponding to a tool for editing & managing copied contents are described as follows.

Copy Operation & Clipboard

A clipboard is a tool for managing at least one content saved by a copy operation. In addition, the clipboard may include one virtual region for outputting a list of at least one or more contents saved in the memory 160 to the touchscreen. In the following description, although such an expression of saving something in a clipboard, the controller 180 can control something to be saved in the memory 160 actually. However, the expression of saving a specific content in a clipboard may be interpreted as controlling the specific content to be included in a content list displayed on the clipboard.

Figure 5:
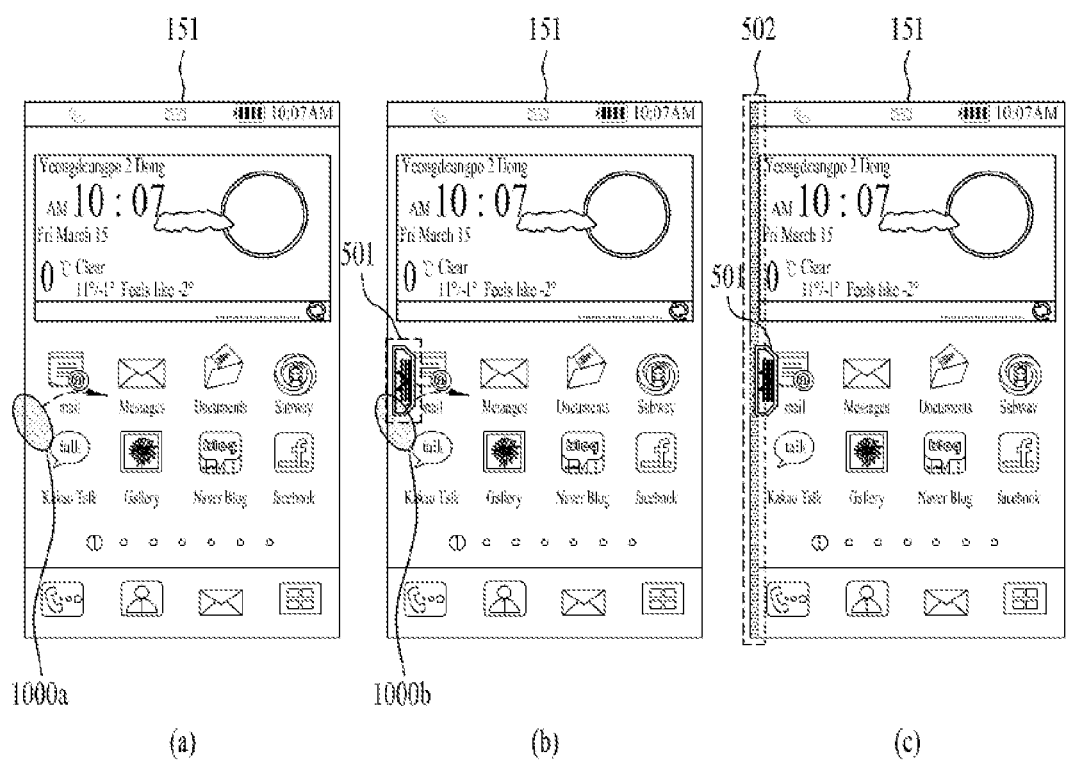
FIG. 5 is a diagram illustrating one example of a controlling method for paging a clipboard according to one embodiment of the present invention.

FIG. 5 is a diagram illustrating one example of a controlling method for paging a clipboard according to one embodiment of the present invention. Referring to FIG. 5, for clarity of the description in the present specification, a case for forming an exterior of the mobile terminal is omitted and a diagram illustrating a configuration of an output through the display unit 151 is shown only.

Referring to FIG. 5 (a), the controller 180 outputs an image of a home screen. Generally, the home screen may be defined as a screen initially displayed on the touchscreen when a locked state of the touchscreen is cancelled (i.e., unlocked). On the home screen, at least one icon or widget for activating an application or an internal function may be displayed. At least two home screens can exist in the mobile terminal 100. In this instance, if a prescribed touch gesture is performed on the touchscreen, the at least two home screens can be sequentially displayed on the touchscreen one by one. In addition, different icons (or widgets) can be arranged on each of the at least two home screens.

According to one embodiment of the present invention, if an action of performing a drag inward by maintaining a touch 1000a to one edge of the display 151 (hereinafter, an action of performing a drag by maintaining a touch shall be named a touch drag action), the controller 180 can page or output a clipboard handler 501 that is an object capable of controlling a clipboard.

The controller 180 can control the paged clipboard handler 501 to be continuously output through the display unit 151 during a prescribed time. (Thus, the clipboard handler 501 can be output except an application that uses a full screen.)

According to another embodiment of the present invention, although a separate paging input is not received, the controller 180 can control the above-mentioned clipboard handler 501 to be always output. (Thus, the clipboard handler can be output except an application that uses a full screen.)

According to one embodiment of the present invention, if a touch drag action 1000b is performed inward on the clipboard handler 501, the controller 180 can provide a content copy mode for saving a content in a clipboard (cf. FIG. 5 (c)). In this instance, the content copy mode means a user interface for performing a copy operation more efficiently. In particular, according to one embodiment of the present invention, in the content copy mode, general operations provided by the mobile terminal 100 are not provided except the copy operation. FIG. 5 (c) shows a state diagram illustrating one example of a content copy mode. Referring to FIG. 5 (c), an indicator 502 (hereinafter named a bar indicator) of a bar type can be output to indicate the content copy mode.

In the content copy mode, a user designates a prescribed region and can then save a content included in the designated prescribed region and/or a capture screen of the designated prescribed region in the clipboard. This copy operation shall be described in detail with reference to FIG. 6 as follows.

Figure 6:
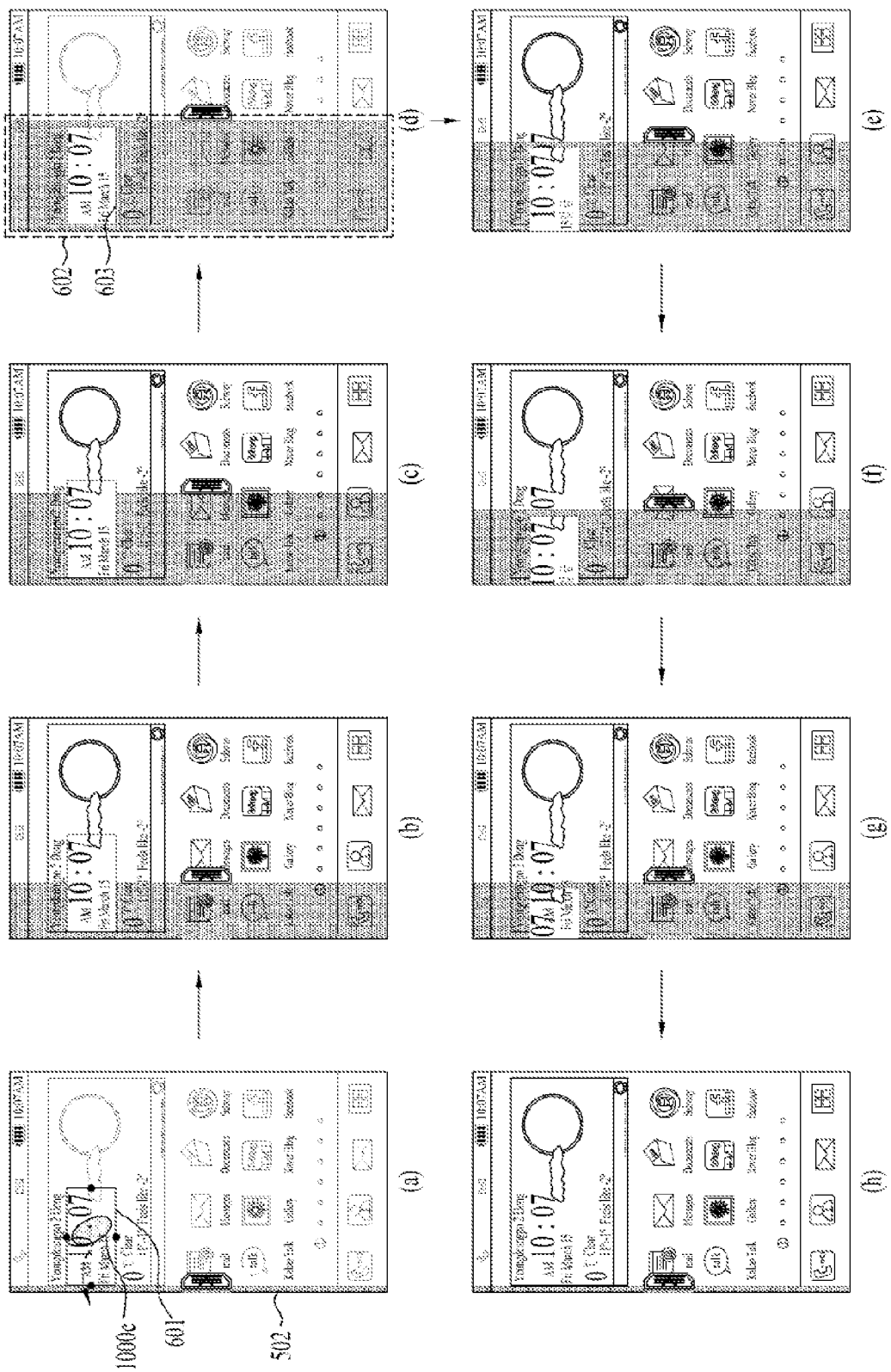
FIG. 6 is a diagram illustrating one example of designating a partial region in content copy mode and then saving a content in the designated partial region according to one embodiment of the present invention.

FIG. 6 is a diagram illustrating one example of designating a partial region in content copy mode and then saving a content in the designated partial region according to one embodiment of the present invention.

Referring to FIG. 6, in the content copy mode, the controller 180 can output a region designating indicator 601 to receive a designation of a prescribed region. The controller 180 can receive an input of changing a location and/or size of the region designating indicator 601 and can then change the location and/or size of the region designating indicator 601 in response to the input. In order to provide more intuitive cognition to a user, the controller 180 can fade the rest of the regions except the region designated by the user.

If a command for saving the designated prescribed region is received, the controller 180 can save a content related to the designated prescribed region in the clipboard. In this instance, the command for saving the designated prescribed region may include a flicking input performed in a specific direction after a touch to an inside of the region designating indicator 601 (e.g., a flicking input in a direction toward the currently output bar indicator 502, a flicking input in a left direction in FIG. 6, etc.). The controller 180 can save contents related to an object existing in the designated prescribed region in the clipboard (described in detail with reference to FIG. 7 later). The controller 180 can save a capture screen of the designated prescribed region in the clipboard. In addition, the controller 180 can control the object existing in the designated prescribed region and the capture screen to be saved by being matched.

If a flicking input performed in a left direction after a touch to an inside of the region designating indictor 601 is received, the controller can output a clipboard region 602 by extending a region of the bar indicator 502. The clipboard region 602 is one virtual region on the touchscreen and can output a list of at least one content currently saved in the clipboard.

FIGS. 6 (*a*) to 6 (*h*) are diagrams of a series of operations for saving the aforementioned capture screen in the output clipboard region 602. A series of the operations illustrate an animation effect as if opening or closing a drawer when the clipboard region 602 is extended or reduced from the region of the bar indicator 502. The animation effect shown in FIG. 6 represents one example of saving a content, by which one embodiment of the present invention is non-limited.

In response to the operations shown in FIG. 6, after the controller 180 has performed the copy operation, it can additionally output a region designating indicator 601 in order to save a next content, which is to be copied, consecutively. In the following description, an operation of saving a content additionally is explained with reference to FIG. 7.

Figure 7:
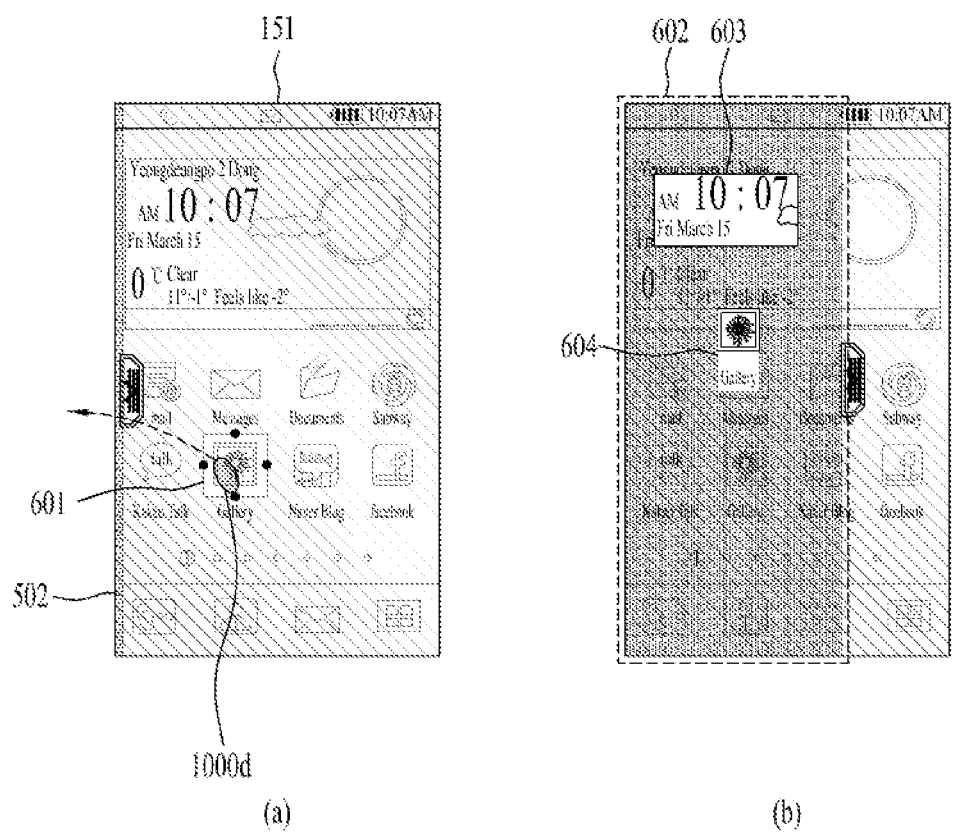
FIG. 7 is a diagram illustrating one example of an operation of saving a content in a clipboard additionally in continuation with the former operation shown in FIG. 6 according to one embodiment of the present invention.

FIG. 7 is a diagram illustrating one example of an operation of saving a content in a clipboard additionally in continuation with the former operation shown in FIG. 6 according to one embodiment of the present invention.

According to one embodiment of the present invention, if a specific object is included in a designated predetermined region, when the controller 180 performs a copy operation on the designated predetermined region, the controller 180 proposes to save a content related to the specific object together (or to save the content related to the specific object by matching the content and a capture screen of the designated predetermined region).

In this instance, the object may include an application activation icon, a text, an image and the like. According to one embodiment of the present invention, the reason for saving the content related to the specific object, when performing the copy operation while the specific object is included in the designated predetermined region, is to input the content by changing a paste type depending on a location for performing a paste operation. For instance, if the controller 180 receives a command for inputting a specific content onto a home screen through a paste operation, the controller 180 can input the specific content in form of an activation icon capable of directly activating the specific content on the home screen, which will be described in detail with reference to FIG. 14 and FIG. 15. Moreover, when receiving an input of pasting a specific content on a text memo pad, the controller 180 can input the specific content in a text type (e.g., representing a title information on the specific content as a text type, representing a URL (uniform resource locator) information of the specific content as a text type, etc.).

FIG. 7 (*a*) is a state diagram of the content copy mode mentioned in the foregoing description. In addition, an activation icon of 'gallery application' exists inside the region designating indicator 601. Thus, while the region is designated, assume that a command 1000*d* for saving the designated region is received. If so, the controller 180 can save the activation icon 604 of the gallery application in the clipboard 602 (FIG. 7 (*b*)). When the activation icon 604 of the gallery application is saved, the controller 180 can save a content related to the gallery application together. In this instance, the content related to the gallery application may include an identification information or a title information of the gallery application.

In particular, assume that the content related to the gallery application is saved, as shown in FIG. 7 (*a*), together with the activation icon 604. Thereafter, if the controller 180 receives an input of pasting the activation icon 604 on the home screen is received from a user, the controller 180 can input the corresponding content to the home screen in form of the activation icon of the gallery application. If the controller 180 receives an input of pasting the activation icon 604 on a text memo pad from a user, the controller 180 can input the corresponding content in form of a text data 'gallery' that is the title of the corresponding content.

FIG. 7 (*b*) is a diagram illustrating one example of the clipboard 602 that can be output by the controller 180 after performing the copy operation shown in FIG. 6 and FIG. 7 (*a*). Referring to the clipboard 602 shown in FIG. 7 (*b*), the first capture screen 603 saved by the copy operation in FIG. 6 and the activation icon 604 saved by the copy operation shown in FIG. 7 (*b*) are included in a content list. Thus, the controller 180 can facilitate the currently copy operation performed content list to be provided to a user through the clipboard 602.

So far, the copy operation and the clipboard for checking a content saved by the copy operation are described with reference to FIGS. 5 to 7. In the following description, a paste operation shall be described in detail with reference to the accompanying drawings.

Copy Operation

Figure 8:
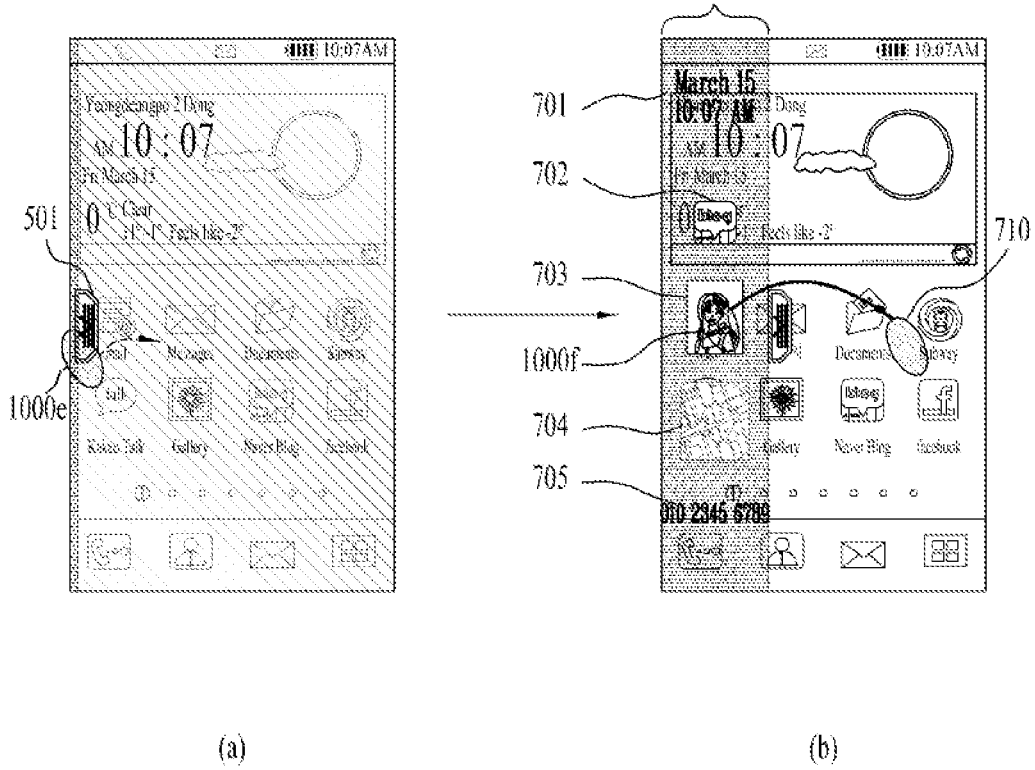

FIG. 8 and FIG. 9 are diagrams illustrating examples of a paste operation according to one embodiment of the present invention. In particular, FIG. 8 is a state diagram of when a clipboard 602 occupies a prescribed region of a screen, whereas FIG. 9 is a state diagram of when a clipboard 602 occupies a full screen.

According to one embodiment of the present invention, after a specific content has been input through a paste operation, a copy & paste operation and a cut & paste operation can be discriminated from each other depending on whether the specific content continues to be saved in the clipboard 602.

First of all, the copy & paste corresponds to an operating mode in which the specific content continues to be saved in the clipboard 602 after the paste operation. Secondly, the cut and paste corresponds to an operating mode in which the specific content is deleted from the clipboard 602 after the paste operation. According to one embodiment of the present invention, the discrimination between the copy & paste operation and the cut & paste operation can be made based on a touch input from a user.

In particular, if the controller 180 receives a command (i.e., a first touch input) for copying and pasting a prescribed content saved in the clipboard 602 from a user, the controller 180 inputs the prescribed content to a prescribed location and can also maintain the prescribed content saved in the clipboard 602 as it is. Moreover, if the controller 180 receives a command (i.e., a second touch input) for cutting and pasting a prescribed content saved in the clipboard 602 from a user, the controller 180 inputs the prescribed content to a prescribed location and can also delete the prescribed content saved in the clipboard 602.

According to another embodiment of the present invention, although the modes of operations can be discriminated from each other by the above touch inputs, they may be discriminated from each other by configurations. In particular, if the controller 180 receives a paste command, the controller 180 determines a mode of a configured paste operation and can then perform one of a copy & paste and a cut & paste depending on the determined mode.

In order to perform a paste operation, a content is selected, which is to be input through a paste operation, from a plurality of contents included in the clipboard 602. Hence, according to one embodiment of the present invention, in mode (hereinafter named a paste mode) for performing a paste operation, the controller 180 can display the clipboard 602. In addition, it can discriminate when the clipboard 602 occupies a prescribed region of the entire touchscreen 151 (FIG. 8) from when the clipboard 602 occupies the entire touchscreen 151 (FIG. 9).

FIG. 8 (a) is a state diagram of the paste mode described with reference to FIG. 6. In this state, if the controller 180 receives a command 1000e for paging the clipboard 602, referring to FIG. 8 (b), the controller 180 can output the clipboard 602. As one example of the command 1000e for paging the clipboard 602, there is an input performed by touching the clipboard handler 501, moving the touched clipboard handler 501 in a predetermined distance by maintaining the touch, and then removing the touch. In addition, a region of the clipboard 602 can be determined by the moving distance of the clipboard handler 501.

In the clipboard 602 shown in FIG. 8 (b), first to fifth contents 701 to 705 are included. If the clipboard 602 occupies one prescribed region of the screen only, as shown in FIG. 8 (b), the controller 180 can receives a selection of a prescribed location 710, on which a paste operation will be performed, from a user. As one example of the location selection, an input 1000f of a touch to a target content of a paste operation is received and the touch input is then shifted to a prescribed location by maintaining the corresponding touch. If the corresponding touch is removed from the prescribed location 710, the controller 180 can input the corresponding content to the prescribed location by a paste operation.

FIG. 9 (a) shows when the clipboard 602 occupies a full screen of the touchscreen 151. According to one embodiment of the present invention, when the clipboard 602 occupies a full screen, as shown in FIG. 9 (a), if the controller 180 receives an input 1000g of selecting a specific content to paste, the controller 180 can stop displaying the clipboard 602 (FIG. 9 (b), FIG. 9 (c)). The reason for this is described as follows. First of all, the controller 180 should keep receiving a designation of a location for inputting the selected specific content from a user. However, since the clipboard 602 occupies the full screen, it may interrupt the designation from the user.

As one example of the input 1000g of selecting the specific content, there may be an input performed by touching the specific content and then maintaining the touch over prescribed duration. In the example shown in FIG. 9 (a), if the controller 180 receives an input 1000g of selecting a third content 703, the controller 180 stops displaying the clipboard 602 except the third content 703 and receives an input of a designation of a prescribed location 710 for a paste operation from a user. As an example of the input of receiving the designation of the prescribed location 710, there may be an input performed by moving to the prescribed location 710 by maintaining the touch of the aforementioned input 1000g and then removing the touch. Thus, the controller 180 can shift a location of displaying the selected third content 703, which is shifted while the touch is maintained, depending on the location of the moving touch (FIG. 9 (c)).

In the following description, an operation of the aforementioned paste mode shall be explained in detail.

FIG. 10 is a diagram illustrating one example of a method of facilitating a switching between active applications in paste mode for displaying a clipboard 602 on a prescribed region of a touchscreen 151. In FIGS. 10 (a) to 10 (c), the clipboard 602 is currently output from one prescribed region of the touchscreen 151. In FIG. 10 (a), a home screen is currently output to a background as well as the clipboard 602 is currently output.

The controller 180 can intactly apply an operation on an existing home screen to the currently output home screen except a region of the home screen blocked by a layer of the clipboard 602.

Assume that a screen switching can be performed between a plurality of home screens by a flicking action performed on an existing home screen in a left or right direction. If a flicking action in a left or right direction is input to the home screen except a region blocked by the layer of the clipboard 602 like the existing home screen in FIG. 10 (a), the controller 180 can switch a plurality of the home screens. If the controller 180 receives an input of selecting an activation icon of an application on the home screen except the region blocked by the layer of the clipboard 602, the controller 180 can activate the selected application.

According to embodiments of the present invention, in order to perform a copy operation and a paste operation in various applications (or various environments), an environment for facilitating a switching between applications active on a background is provided. In this instance, the application active on the background means an application currently active despite not being displayed on the touchscreen 151.

While the home screen is currently output in FIG. 10 (a), if an application switching input 1000h is received, the controller 180 can output a screen of a most recently activated application together with the clipboard 602 of a prescribed region. If the controller 180 receives an additional switching input 1000h, the controller 180 can consecutively switch outputs between applications in order of recently activated order (FIG. 10 (c)).

Figure 11A:
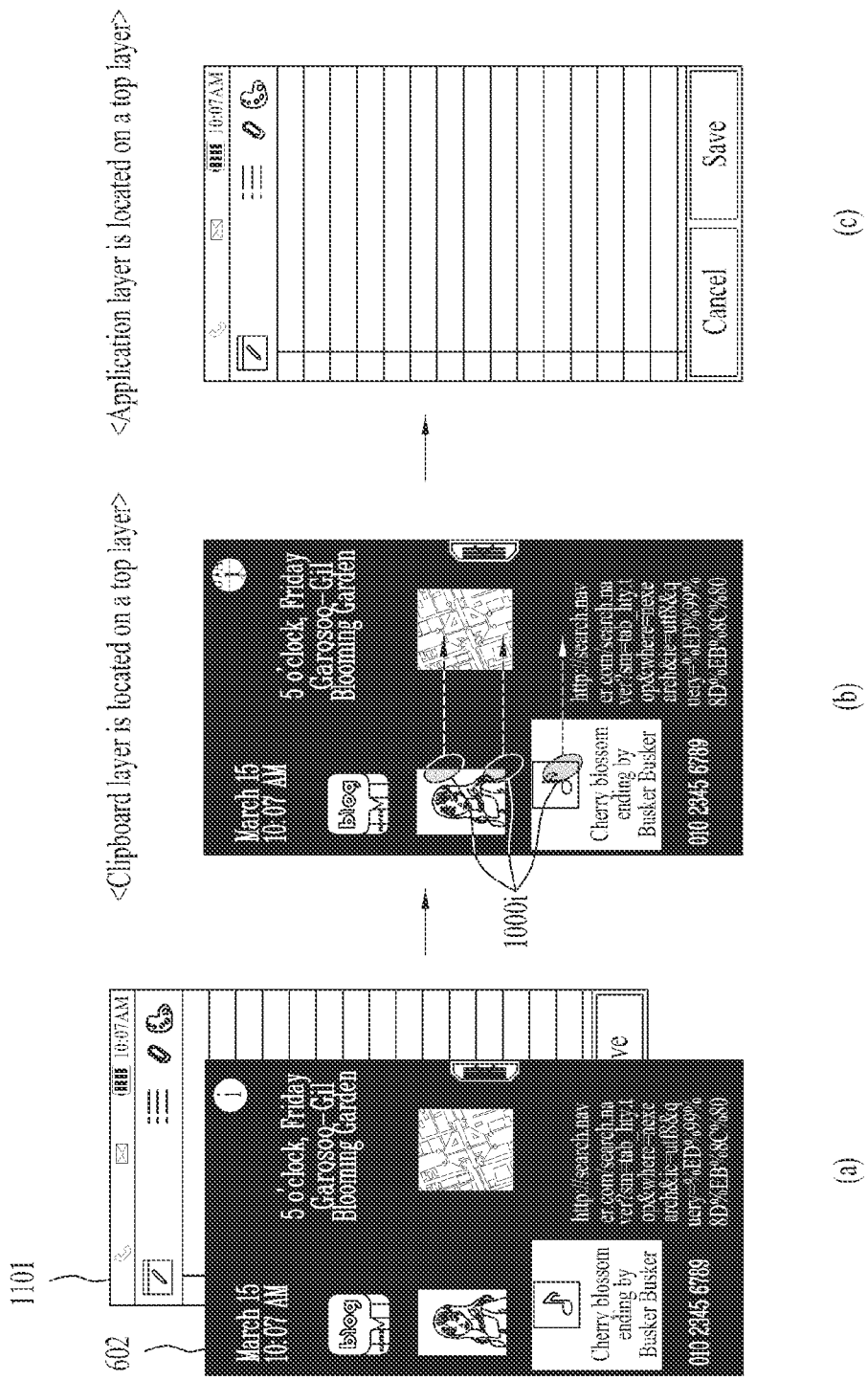

Operations in paste mode for outputting the clipboard 602 through a full screen of the touchscreen 151 are described in detail with reference to FIG. 11A and FIG. 11B as follows. FIG. 11A and FIG. 11B are diagrams illustrating one example of a method of performing a switching between a clipboard layer and an application layer in paste mode according to one embodiment of the present invention.

Referring to FIG. 11A (a), structures of a layer of a clipboard 602 and an application layer 1101 are illustrated. The controller 180 can control the two layers 602 and 1101 to be displayed through a single touchscreen 151 by overlaying each other. When the two layers are output by overlaying each other, the controller 180 can control the two layers to be displayed together in a manner that the layer displayed on a top layer is processed into a semi-transparent layer.

FIG. 11A (b) shows one example of displaying a clipboard layer and an application layer 1101 on a top layer and a bottom layer according to one embodiment of the present invention, respectively. As mentioned in the foregoing description, the controller 180 can control the clipboard layer displayed on the top layer to be displayed by being processed into a semi-transparent layer.

In the state shown in FIG. 11A (b), if a layer switching input 1000i is received, the controller 180 can switch the layer displayed on the top layer and the layer displayed on the bottom layer to each other (i.e., switching to the state shown in FIG. 11A (c)). As one example of the layer switching input 1000i, there is a flicking input in a right direction of a multi-touch (e.g., a triple touch in FIG. 11A). Referring to FIG. 11A (c), the application layer 1101 previously displayed on the bottom layer is displayed on the top layer and the layer of the clipboard 602 is displayed on the bottom layer.

FIG. 11B shows one example of a method of returning to the state shown in FIG. 11A (b) according to one embodiment of the present invention. Referring to FIG. 11B (a), like FIG. 11A (c), the controller 180 outputs the application layer 1101 and the layer of the clipboard 602 to the top layer and the bottom layer, respectively.

According to one embodiment of the present invention, in the state shown in FIG. 11B (a), if a layer switching input 1000kk is received, the controller 180 can switch the layer displayed on the top layer and the layer displayed on the bottom layer to each other (i.e., switching to the state shown in FIG. 11B (b)). In this instance, the layer switching input 10001kk may include a flicking input in a left direction of a multi-touch (e.g., a triple touch in FIG. 11B). In the switched state shown in FIG. 11B (b), the controller 180 can output the layer of the clipboard 602 and the application layer 1101 to the top layer and the bottom layer, respectively.

Meanwhile, when the layer of the clipboard 602 is located on the top layer, as shown in FIG. 11A (b), a method of performing a paste operation has been described in the foregoing description with reference to FIG. 9. When the application layer 1101 is located above the layer of the clipboard 602, as shown in FIG. 11A (c), a method of performing a paste operation is described in detail with reference to FIG. 12 as follows.

Figure 12:
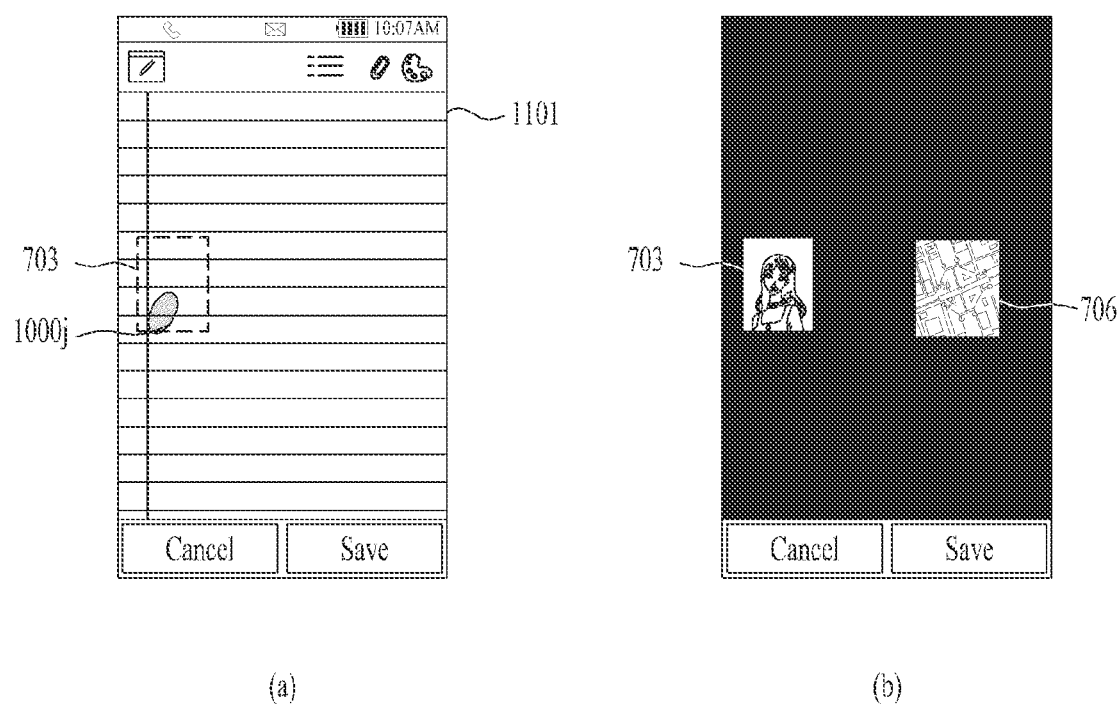
FIG. 12 is a diagram illustrating one example of a paste operation when a clipboard layer is located on a lower layer according to one embodiment of the present invention.

FIG. 12 is a diagram illustrating one example of a paste operation when a layer of a clipboard 602 is located on a lower layer according to one embodiment of the present invention. Referring to FIG. 12 (a), a clipboard layer 602 is located on a bottom layer and a memo application layer 1101 is located on a top layer.

Assume a situation that a user attempts to input a third content 703 among the contents included in the clipboard 602 to the memo pad. According to one embodiment of the present invention, a paste command is received through the memo application layer 1101.

If a paste input 1000j on the memo application layer 1101, through which the third content is viewable, is received, the controller 180 can input the third content 703 to a corresponding location of the memo application (FIG. 12 (b)). For example, the paste input 1000j on the memo application layer 1101 may include an input 1000j performed by touching the third content 703 viewable through the memo application layer 1101 and then maintaining the touch over a prescribed duration.

Meanwhile, in a method according to another embodiment of the present invention, if the aforementioned paste input 1000j is received, the controller 180 controls all contents having the same property of a corresponding content to be input to the application layer 1101.

In particular, in the example shown in FIG. 12, assume that both of the third content 703 and the sixth content 706 selected by the user are image contents. Both of the third content 703 and the sixth content 706 can have the common property as an image. Hence, according to one embodiment of the present invention, if the controller 180 receives a paste input of the third content 703, the controller 180 can control the sixth content 706 to be input to the application layer 1101 as well as the third content 703.

Meanwhile, according to another embodiment of the present invention, when the layer of the clipboard 602 is located behind the application layer 1101, a method of performing a copy operation is proposed. This method shall be described in detail with reference to FIG. 13 as follows.

Figure 13:
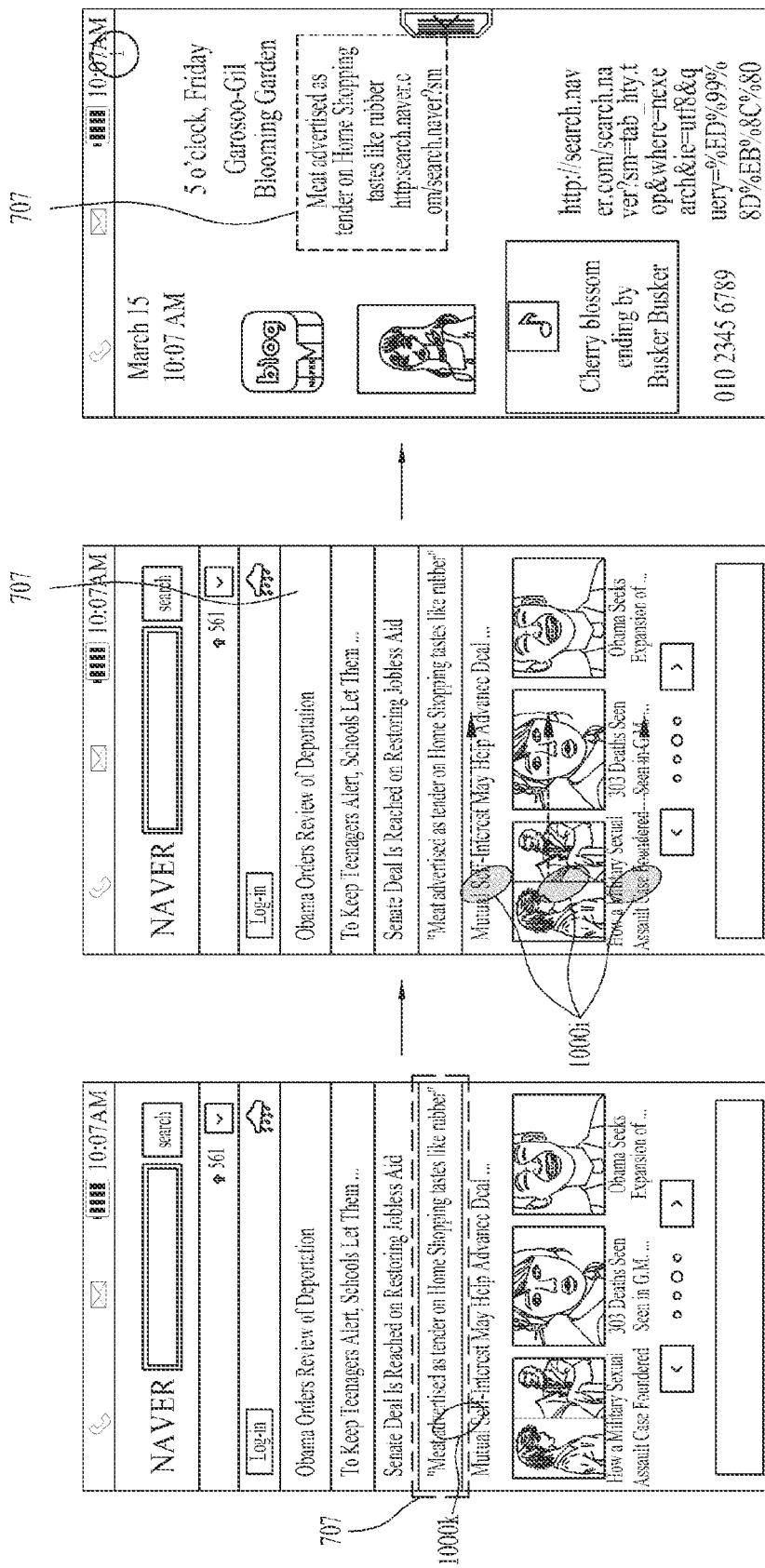
FIG. 13 is a diagram illustrating one example of performing a copy operation when a clipboard layer and an application layer are arranged on a lower layer and an upper layer, respectively, according to one embodiment of the present invention.

FIG. 13 is a diagram illustrating one example of performing a copy operation when a layer of a clipboard 602 and an application layer 1101 are arranged on a lower layer and an upper layer, respectively, according to one embodiment of the present invention. Referring to FIG. 13 (a), a web browser application layer 1101 is arranged above a layer of a clipboard 602. In addition, the web browser application layer 1101 arranged on the top layer is processed into a semi-transparent layer.

The former operation described with reference to FIG. 12 includes the paste operation when arranging the layer of the clipboard 602 on the bottom layer. However, a copy operation under the same condition as shown in FIG. 12 is described with reference to FIG. 13. While a user uses a web browser application, assume that the user attempts to save a specific content (hereinafter named a seventh content) 707 on the web browser application in the clipboard 602.

If the controller 180 receives a command 1000k for performing a copy operation of the seventh content 707 on the web browser application layer 1101, the controller 180 can control the seventh content 707 to be included in the clipboard 602 arranged on the bottom layer (FIG. 13 (b)). For instance, the command 1000k for performing the copy operation may include an input 1000k performed by touching the seventh content 707 and then maintaining the touch over a prescribed time.

As mentioned in the foregoing description with reference to FIG. 11, if an inter-layer switching input 1000i is received, the controller 180 can arrange the layer of the clipboard 602, which was arranged on the bottom layer in FIG. 13 (b), to be arranged on the top layer (FIG. 13 (c)). If the clipboard layer arranged on the top layer is referred to, it can check the seventh content 707 added in FIG. 13 (a).

Meanwhile, as mentioned in the foregoing description of the copy operation, according to one embodiment of the present invention, in inputting a content to a prescribed location through a paste operation, it is proposed that the content is input by modifying a paste type of the content in accordance with an property of the prescribed location. The paste operation performed location can include one of various locations of various applications. Hence, if contents are uniformly input to the locations, it may be inefficient or in appropriate.

For instance, since a home screen output by the controller 180 generally includes a screen provided when an initial entry into the mobile terminal, the home screen can be configured with an activation icon of an application. In inputting a content to a prescribed location of the above-mentioned home screen, if a simple text or image is input instead of an activation icon, it may be inappropriate. Moreover, in inputting a content to a search window of a search engine, if an image data, an audio data or the like is input, it may be inappropriate.

Therefore, according to one embodiment of the present invention, when inputting the content through a paste operation, proposed is a method of determining a property of the prescribed location and then modifying a paste type of the content depending on the determined property. Properties of prescribed locations and modifiable input forms are described in detail with reference to the accompanying drawings as follows.

Figure 14:
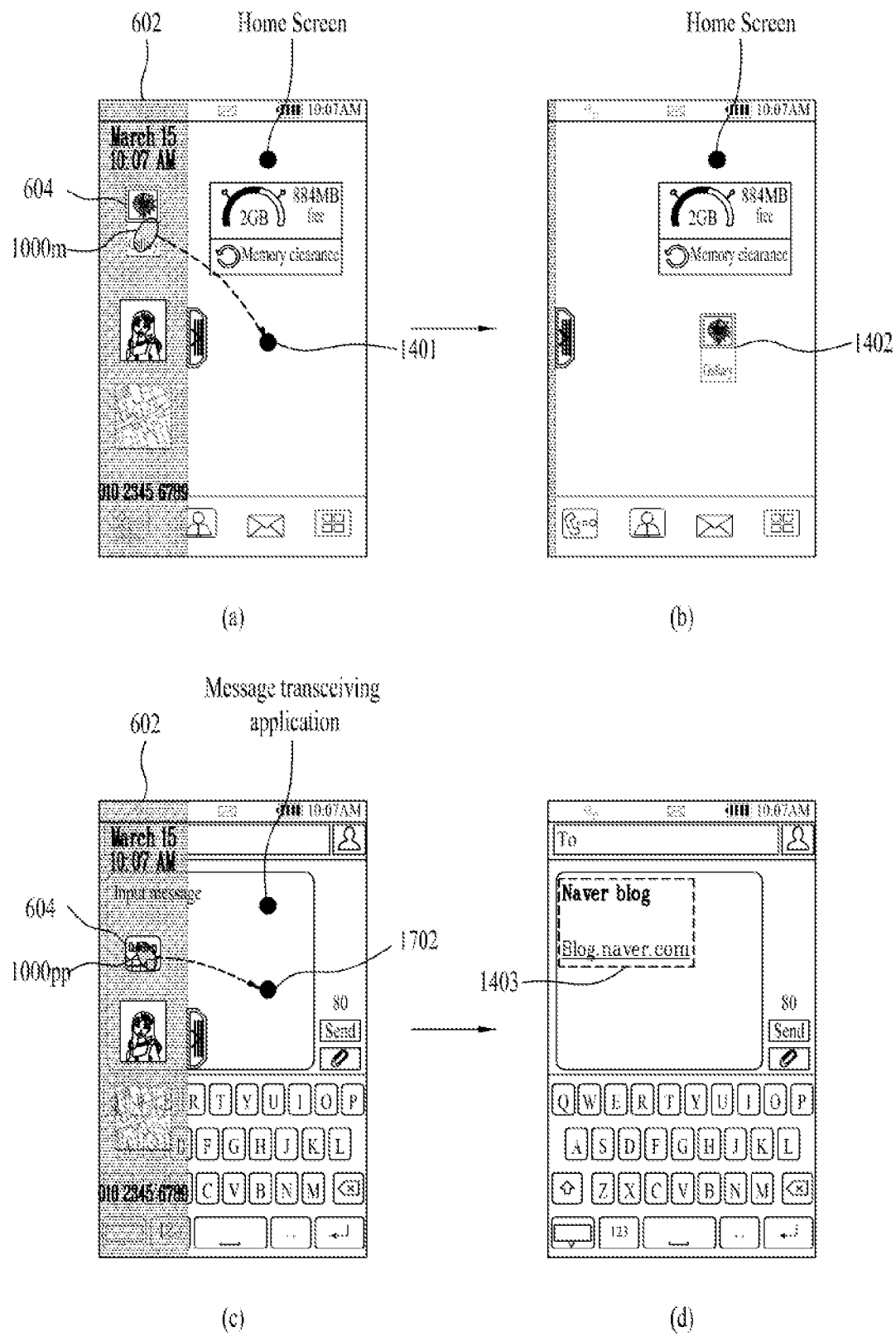
FIG. 14 and FIG. 15 are diagrams illustrating one example of a method of inputting a content when performing a paste operation on a prescribed location on a home screen according to one embodiment of the present invention.
Figure 15:
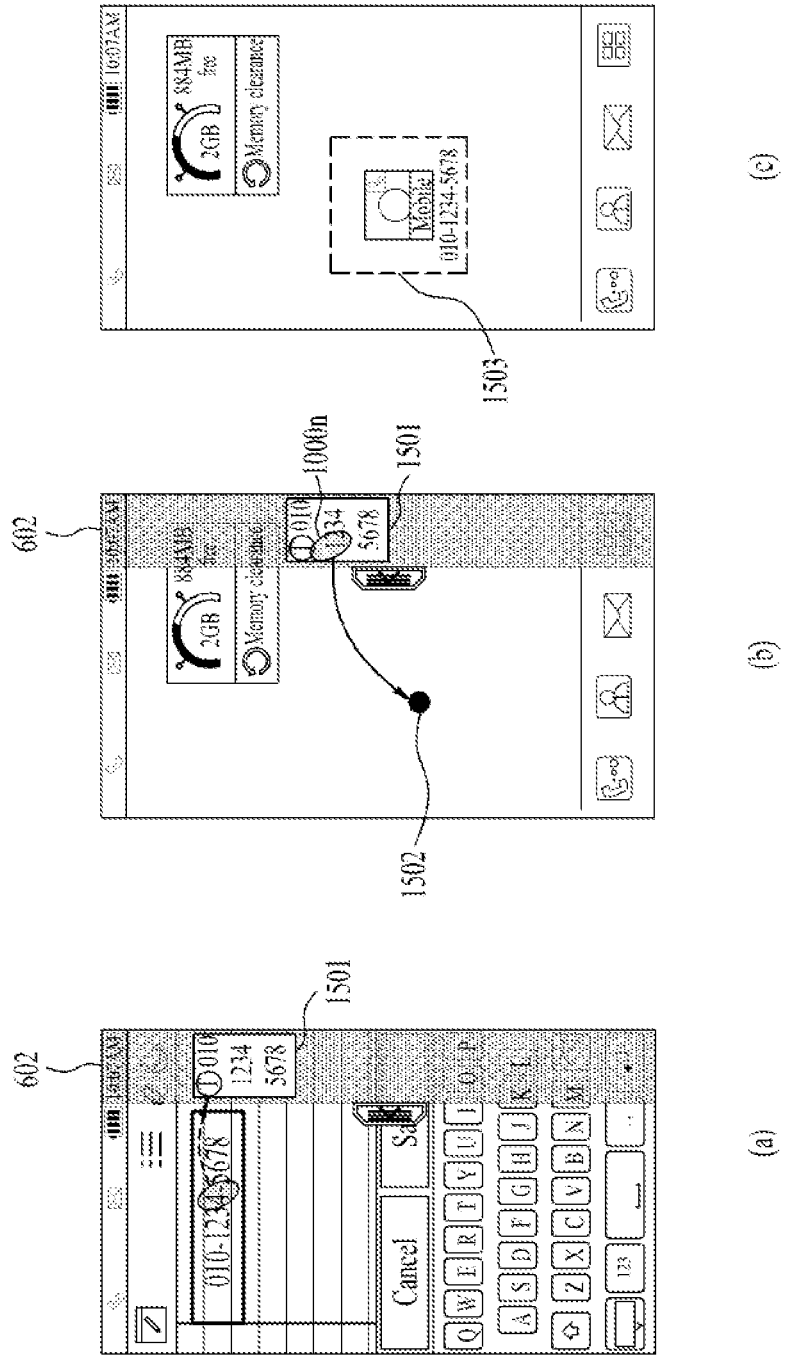

FIG. 14 and FIG. 15 are diagrams illustrating one example of a method of inputting a content when performing a paste operation on a prescribed location on a home screen according to one embodiment of the present invention.

As mentioned in the foregoing description, an activation icon (or a widget icon) of an application arranged on a home screen is efficient and appropriate. Hence, according to one embodiment of the present invention, when the controller 180 receives a paste command for pasting a prescribed content on a prescribed location, if a property of the prescribed location is capable of creating, arranging or deleting an activation icon (or a widget icon) of an application, the prescribed content is input in form of an activation icon.

FIG. 14 (*a*) shows one example of inputting the activation icon 604 described with reference to FIG. 7 to a prescribed location on a home screen through a paste operation. Several contents are included in the clipboard 602. When the activation icon 604 is saved in the clipboard 602, assume that a content related to 'gallery application' is saved in the memory 160 by corresponding to the activation icon 604 (refer to the detailed description with reference to FIG. 7). In this instance, the content related to the gallery application may include an identification information of the gallery application or a title of an application.

In particular, although the activation icon 604 is displayed on the clipboard 602 only, assume that contents corresponding to the activation icon 604 are saved in the memory 160 as well. When a paste operation is performed in order for the activation icon 604 to be input to a prescribed location 1401 on a home screen, the controller 180 can control the activation icon 604 to be input in form of an activation icon 1402 of an application. Thus, the controller 180 identifies the application based on the application identification information among the contents related to the activation icon 604 and can create the icon 1402 for the identified application from the prescribed location 1401 (FIG. 14 (*b*)).

FIG. 14 (*c*) and FIG. 14 (*d*) are diagrams illustrating one example of pasting the activation icon 604 on a message transceiving application screen according to one embodiment of the present invention. Referring to FIG. 14 (*c*), a screen of a message transceiving application is output as a background and a clipboard 602 is displayed on a prescribed left region of the touchscreen. In addition, assume that an activation icon 604 of an application 'Naver Blog' is saved in the clipboard 602.

If the controller 180 receives a command 1000*pp* for pasting the activation icon 604 on a region 1702 for inputting a message to send, the controller 180 inputs the activation icon 604 by modifying a paste type of the activation icon 604 into a URL form (FIG. 14 (*d*)). The URL form may include a URL information related to the activation icon 604, and more particularly, a URL information 1403 for downloading a corresponding application from an application market. In particular, after a counterpart mobile terminal has received a corresponding message, if an input for selecting a URL of the received message is received, the counterpart mobile terminal can switch a current screen to a screen for downloading a corresponding application in direct.

FIG. 15 (*a*) shows an operation of copying numeral data in text data. This numeral data is assumed as a phone number '010-1234-5678' of a mobile phone. In addition, a numeral content 1501 created by the copy operation is included in a clipboard 602 currently displayed on a prescribed right region.

Referring to FIG. 15 (*b*), a home screen is currently output as a background image and a clip board 602 and a numeral content 1501 are currently output to a prescribed region of the screen as well. If the numeral content 1501 is selected through the clipboard 602 by a user and the selected numeral content is input to a prescribed region 1502 of the home screen, the controller 180 can input the corresponding numeral content by changing a form of the numeral content into an activation icon 1503 (particularly, an icon for activating an outgoing call to a phone number). In particular, if the controller 180 receives an input of selecting the activation icon 1502 from a user, the controller 180 can make a phone call to the phone number '010-1234-5678'.

Meanwhile, when the numeral content is input to an active screen of another application other than the home screen, the numeral content itself can be input instead of an activation icon. In comparison with the paste type shown in FIG. 15, inputting a numeral content itself is described with reference to FIG. 16 as follows.

Figure 16:
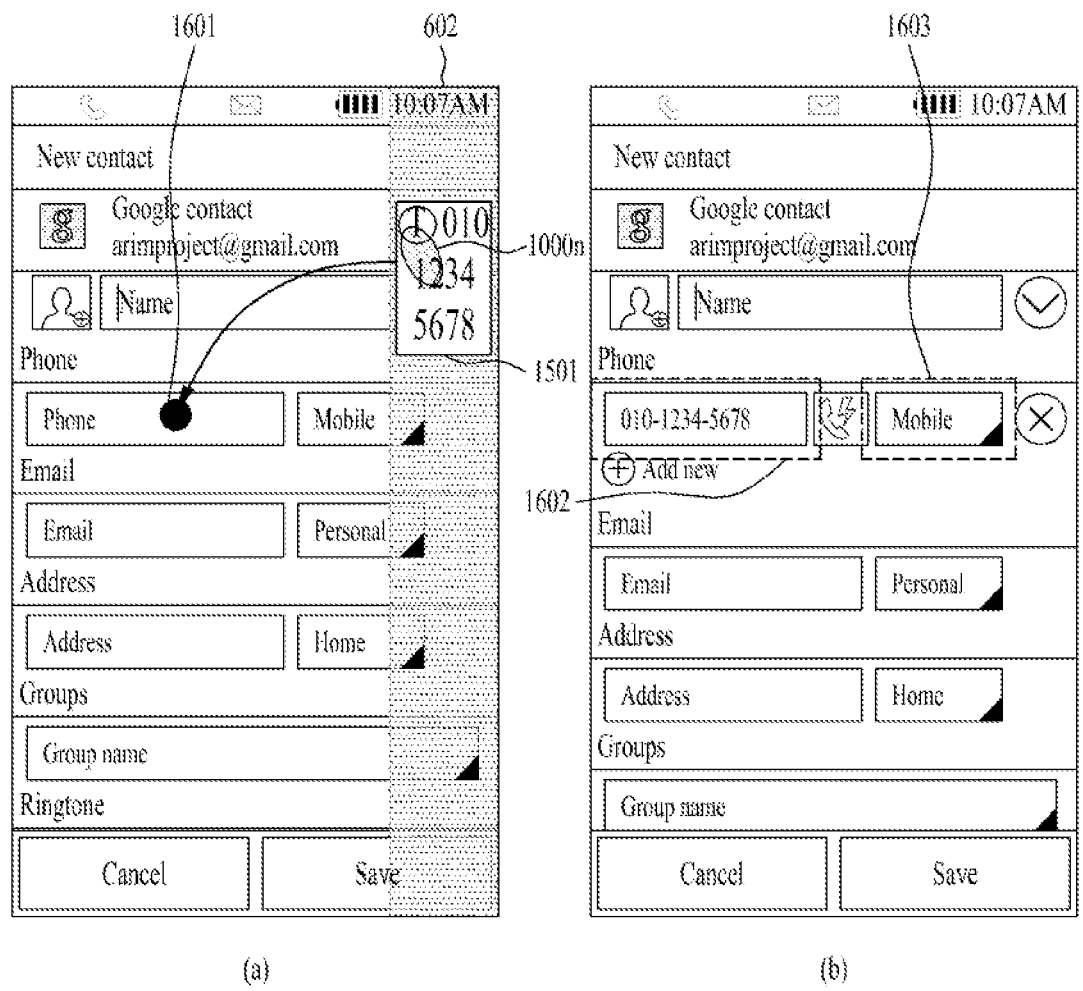
FIG. 16 is a diagram illustrating one example of when a paste type is not changed, when a numeral content is input through a paste operation, according to one embodiment of the present invention.

FIG. 16 is a diagram illustrating one example of when a paste type is not changed, when a numeral content is input through a paste operation, according to one embodiment of the present invention. Referring to FIG. 16 (*a*), a contact adding screen is currently output to a background, a clipboard 602 is currently displayed on a prescribed right region of a screen, and the numeral content 1501 as shown in FIG. 15 is currently displayed on the clipboard 602 as well.

In the example shown in FIG. 16, assume that a user intends to add a phone number included in the numeral content 1501 to contacts. Hence, the user can apply an input 1000*n* for performing a paste operation of pasting the numeral content 1501 on a prescribed region.

In response to the input 1000*n* for performing the paste operation, when the numeral content 1501 is input to a prescribed location on a contact adding screen, the controller 180 can input the numeral data itself included in the numeral content 1501. In particular, when the controller 180 performs the paste operation on the prescribed location at which text data can be input, edited or deleted, the controller 180 applies the corresponding input by modifying a content type into a text data type. This can be compared to the case of the modification into an icon type on applying an input to a home screen.

Moreover, according to one embodiment of the present invention, when the numeral content 1501 is input to the contact adding screen, a following process is proposed. First of all, a contact type indicated by the corresponding numeral content 1501 is analyzed. Secondly, a type (e.g., home, mobile, work, etc.) of a contact is automatically designated based on a result of the analysis. For instance, assume that the numeral content 1501 saved in the clipboard 602 shown in FIG. 16 (*a*) is a phone number '010-1234-5678' of a mobile phone. Hence, the controller 180 analyzes a type of a contact indicated by the numeral content 1501 into a mobile phone based on the number '010-1234-5678' and can then further apply a designation 1603 of the analyzed type to the contact adding screen.

Comparing the embodiments shown in FIG. 15 and FIG. 16 to each other, if the same content of the numeral content 1501 is input to the home screen (FIG. 15) or the contact adding screen (FIG. 16), the paste type is changed. Meanwhile, although FIG. 15 or FIG. 16 shows one example of saving the phone number itself as the numeral content 1501, one embodiment of the present invention can be extended and applied to an operation of contact data (e.g., counterpart name information, counterpart phone number information, counterpart email information, counterpart address information, etc.). Such an embodiment shall be described with reference to FIG. 17 as follows.

Figure 17:
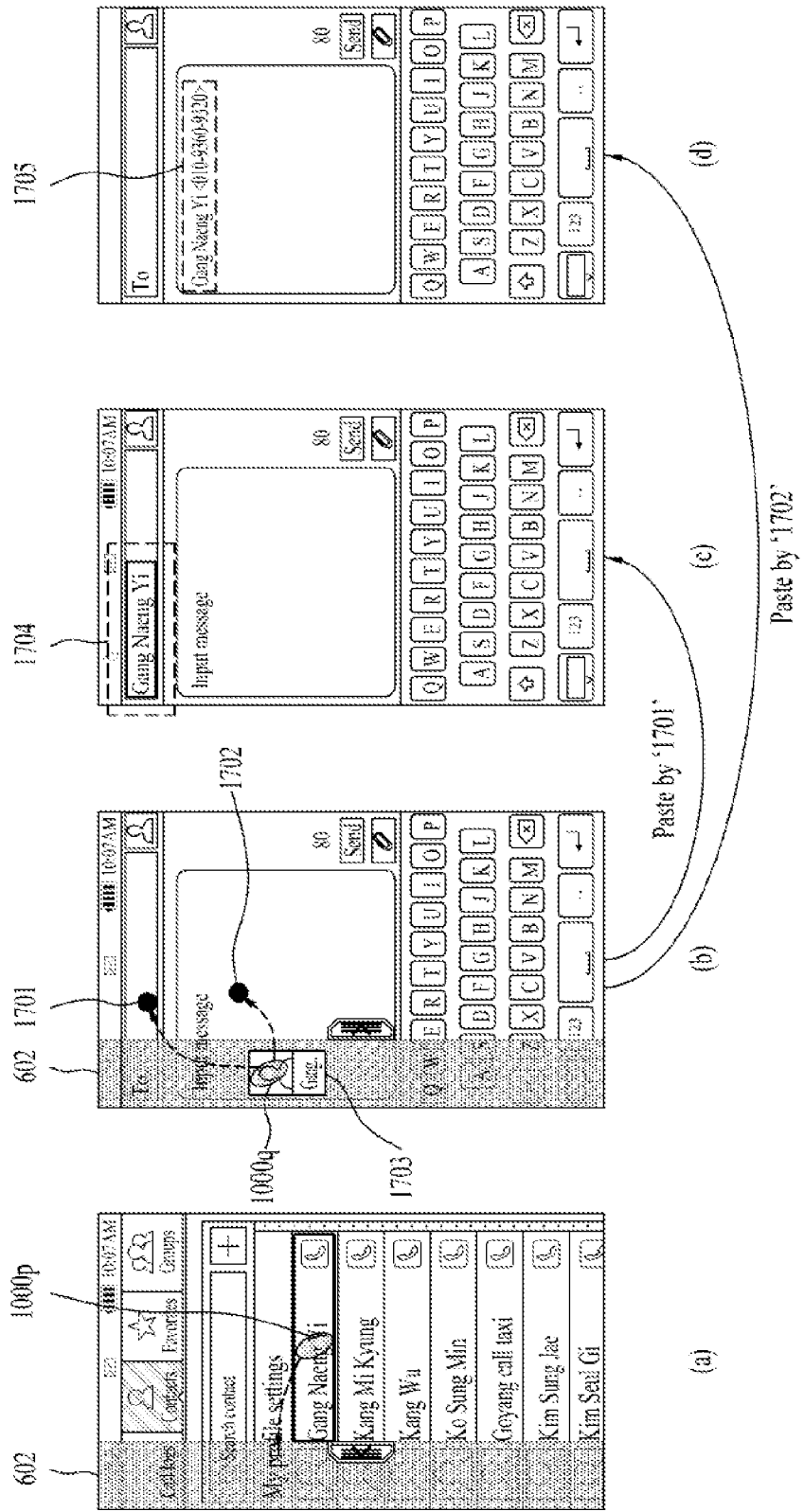
FIG. 17 is a diagram illustrating one example of copying or pasting a contact content according to one embodiment of the present invention.

FIG. 17 is a diagram illustrating one example of copying or pasting a contact content according to one embodiment of the present invention. Referring to FIG. 17 (*a*), the controller 180 receives an input 1000*p* for copying a contact of a counterpart 'Karig Naeng Yi' on a clipboard 602. Subsequently, the controller 180 saves a contact content 1703 on the clipboard 602 and can display the contact content 1703 together with the clipboard 602 (FIG. 17 (*b*)).

Meanwhile, according to one embodiment of the present invention, when the controller 180 saves the contact content in the clipboard 602, as shown in FIG. 17 (*a*), the controller 180 can control the contact content to be saved in the memory 160 together with a content (e.g., a name of a counterpart, a phone number of a counterpart, an email information on a counterpart, an address of a counterpart, etc.) related to the corresponding contact by being matched to the content.

According to another embodiment of the present invention, when the controller 180 saves the contact content 1703 in the clipboard 602, the controller 180 saves an identification information of a contact counterpart together with the contact content 1703 by matching the identification information and the contact content 1703 and can then perform a paste operation using the saved identification information.

Referring to FIG. 17 (*b*), a screen of a message transceiving application is currently output to a background. In addition, the clipboard 602 can be displayed on a prescribed region of a touchscreen by overlaying the screen. In the drawing, the screen of the message transceiving application can include a region 1701 for designating a message receiving counterpart and a region 1702 for inputting a message to be sent.

According to one embodiment of the present invention described with reference to FIG. 17, a following process is proposed. First of all, a paste type of a paste target content is modified depending on a fact that a paste operation is performed on which location in an active screen of an application. In particular, if the contact content 1703 is input through a paste operation performed on the region 1701 for designating a reception counterpart, a contact information for designating a counterpart is input.

However, if the contact content 1703 is input to the region 1702 for inputting a message to be sent, an additional content related to the corresponding contact content 1703 may be preferably included. Therefore, according to one embodiment of the present invention, when a specific contact content 1703 is input through the above paste operation, methods for further providing an additional content related to the contact content 1703 are provided.

A reception counterpart can be designated in a manner that a phone number of the reception counterpart is input to the region 1701 for designating the reception counterpart. Alternatively, if a contact is previously saved in the memory 160, a reception counterpart can be designated in a manner that a contact name or title is input to the region 1701 for designating the reception counterpart. On the other hand, according to one embodiment of the present invention, when a specific contact content 1703 is already saved in the clipboard 602, if an input 1000*q* of the corresponding contact content 1703 is applied to the reception counterpart designating region 1701 through a paste operation, the controller 180 can designate a message receiving counterpart as a counterpart of the contact content 1703.

In particular, according to one embodiment of the present invention, when a phone number is saved in the memory 160 together with the contact content 1703 by being matched to the contact content 1703, the controller 180 can designate the phone number as the message receiving counterpart. According to another embodiment of the present invention, the controller 180 can perform a designation 1704 of a message receiving counterpart based on a contact identification information saved together with the contact content 1703 on the clipboard 602.

Meanwhile, when an input 1000*q* of a paste operation on the contact content 1703 is applied to the region 1702 for inputting a message to be sent in the message transceiving application screen, when the contact content 1703 is input, the controller 180 can perform the corresponding input by modifying a paste type into a text type. If the paste type of the contact content 1703 is modified into the text type, the controller 180 can input a text 1705, which includes at least one of a name, phone number and email information of a contact counterpart saved together with the contact content 1703 by being matched to the contact content 1703, to the region 1702 for inputting a message to be sent.

Figure 18:
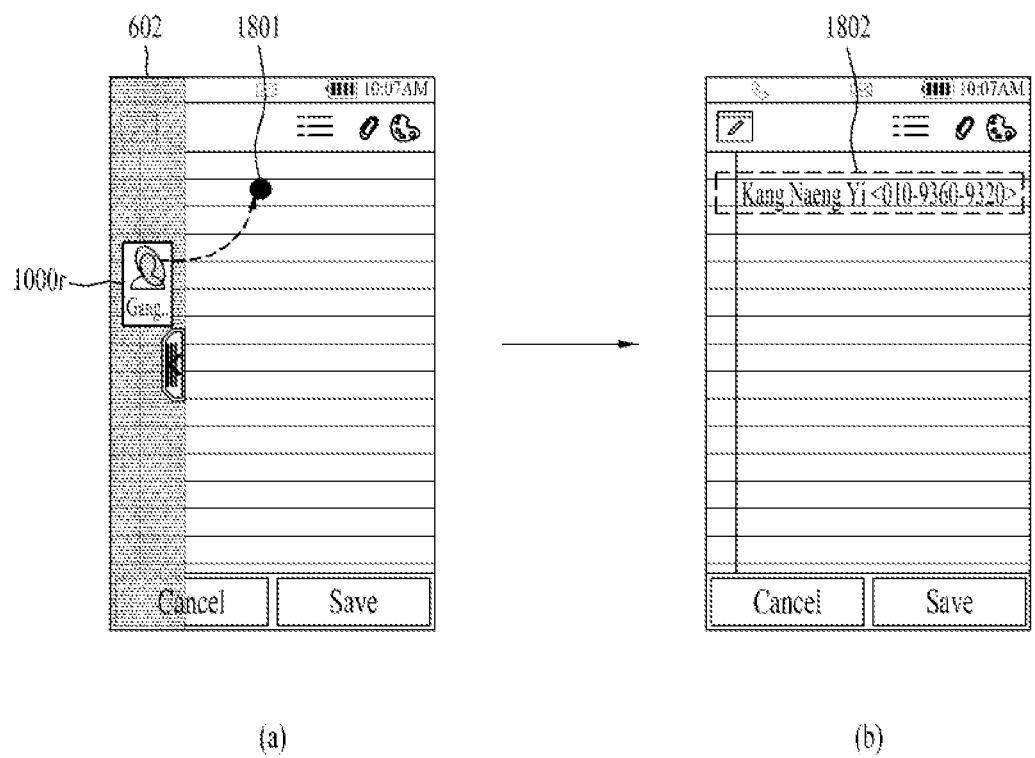
FIG. 18 is a diagram illustrating another example of copying or pasting a contact content according to one embodiment of the present invention.

FIG. 18 is a diagram illustrating another example of copying or pasting a contact content according to one embodiment of the present invention. Referring to FIG. 18 (*a*), assume that the controller 180 saves a contact content 1703 of a counterpart 'Kang Naeng Yi' in a clipboard 602, which is identical to the former assumption in FIG. 17 (*a*). The controller 180 currently outputs a screen of a memo application as a background to the touchscreen 151 as well as displays the clipboard 602 on the touchscreen 151.

In addition, assume that the controller 180 receives a command 1000*r* for inputting a contact content 1703 to a prescribed location 1801 of the memo application. If so, in response to the command 1000*r*, when the contact content 1703 is input to the memo application, the controller 180 can apply an input 1802 by modifying a paste type into a text type (FIG. 18 (*b*)).

Figure 19:
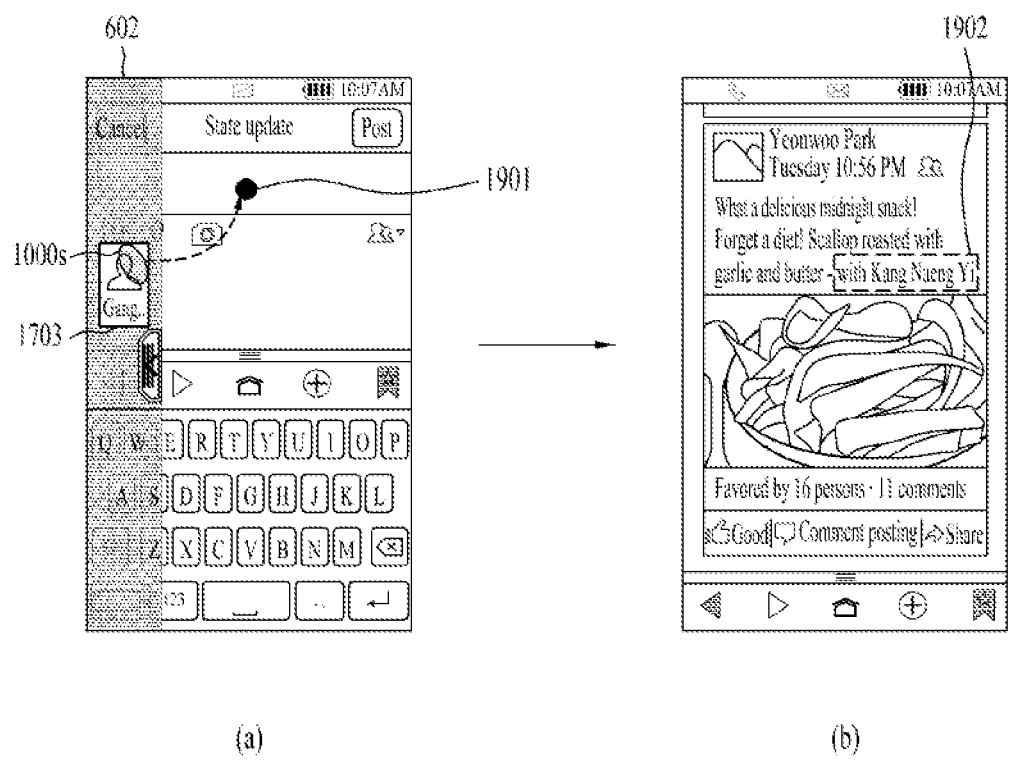
FIG. 19 is a diagram illustrating further example of copying or pasting a contact content according to one embodiment of the present invention.

FIG. 19 is a diagram illustrating further example of copying or pasting a contact content according to one embodiment of the present invention. Referring to FIG. 19 (*a*), assume that the controller 180 saves a contact content 1703 for a counterpart called 'Kang Naeng Yi', which is identical to the former assumption in FIG. 17 (*a*). The controller 180 currently outputs a screen of an SNS (social network service) application as a background to the touchscreen 151 as well as displays the clipboard 602 on the touchscreen 151. In addition, assume that the controller 180 receives a command 1000*s* for inputting the contact content 1703 to a prescribed location 1901 of the SNS application.

The SNS is defined as an online service that establishes and shows a reciprocal relation network or reciprocal relationship among persons sharing interests or activities with each other. The SNS application is the application used to provide the SNS. The SNS application is provided to enable a user to register a posting to use the SNS. In addition, the SNS application is provided to read a posting registered by another user. In a method of registering a posting, the SNS application enables the posting to be registered by designating (or tagging) a specific place or a specific counterpart.

According to one embodiment of the present invention, when a posting is registered through the above-mentioned SNS application, in designating a specific counterpart or a specific place, a content saved in a clipboard 602 is proposed to be used. In particular, based on the contact content 1703 for the counterpart 'Kang Naeng Yi' displayed on the clipboard 602, it is proposed to designate a specific counterpart of the posting in the SNS application.

If the controller 180 receives a command 1000s for inputting the contact content 1703 to a prescribed location 1901 of the SNS application, the controller 180 can compose a posting that performs a designation 1902 of a specific counterpart corresponding to the contact content 1703 in the composed posting (FIG. 19 (b)).

A method of designating a specific place in uploading a posting through an SNS application is described in detail with reference to FIG. 22 as follows.

Figure 20A:
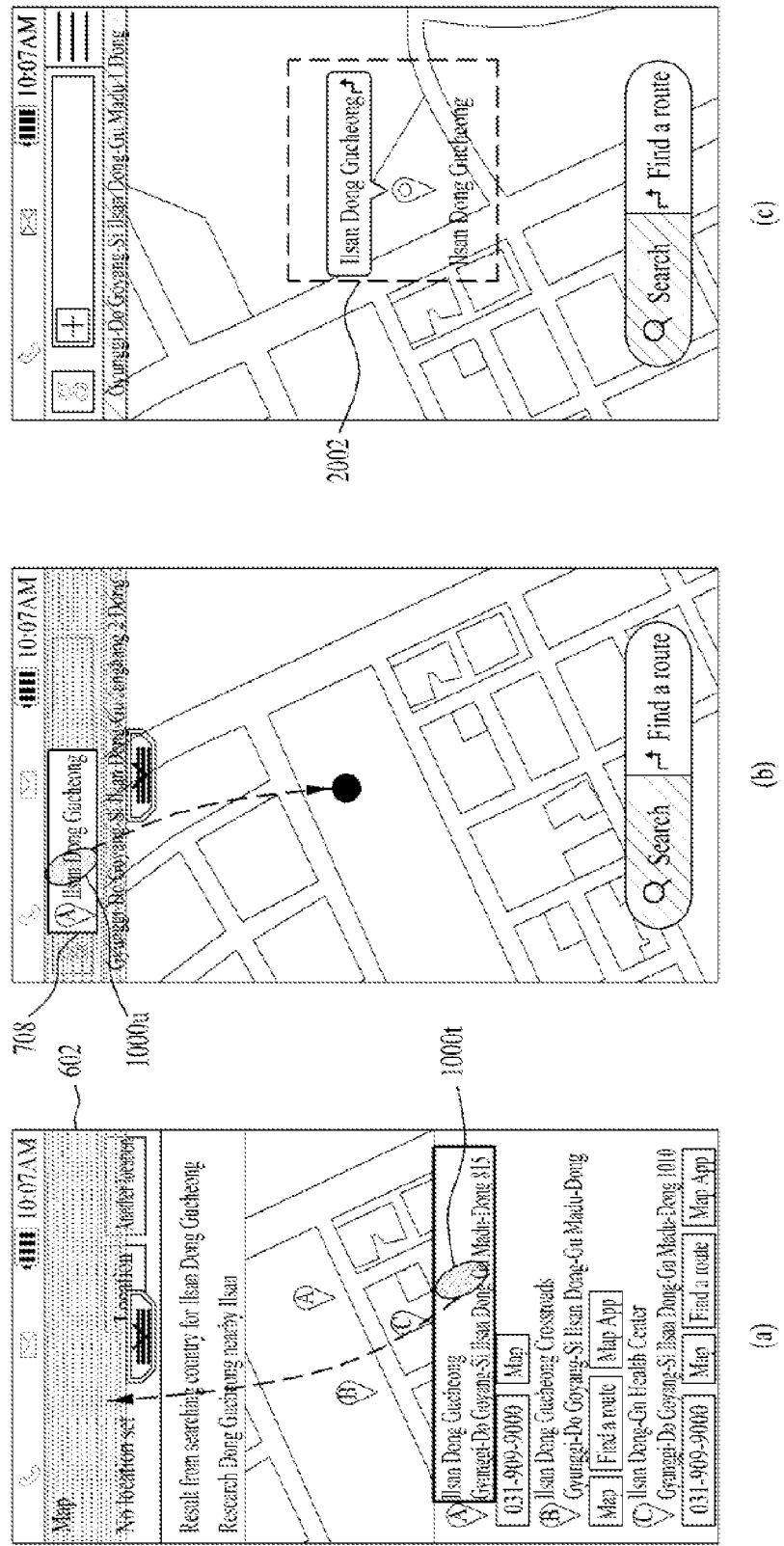
FIGS. 20A, 20B, 21, 22A and 22B are diagrams illustrating examples to describe a copy and/or paste operation for a location information content according to one embodiment of the present invention.
Figure 20B:
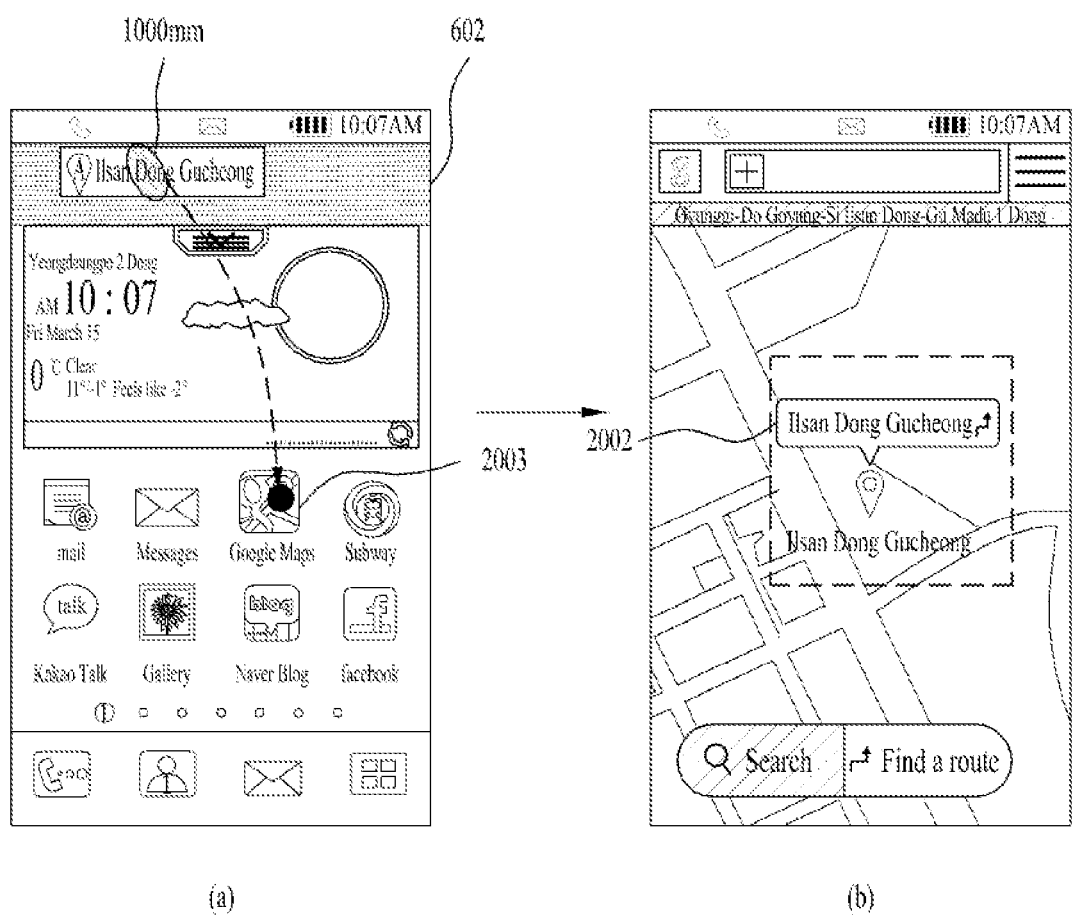
Figure 21:
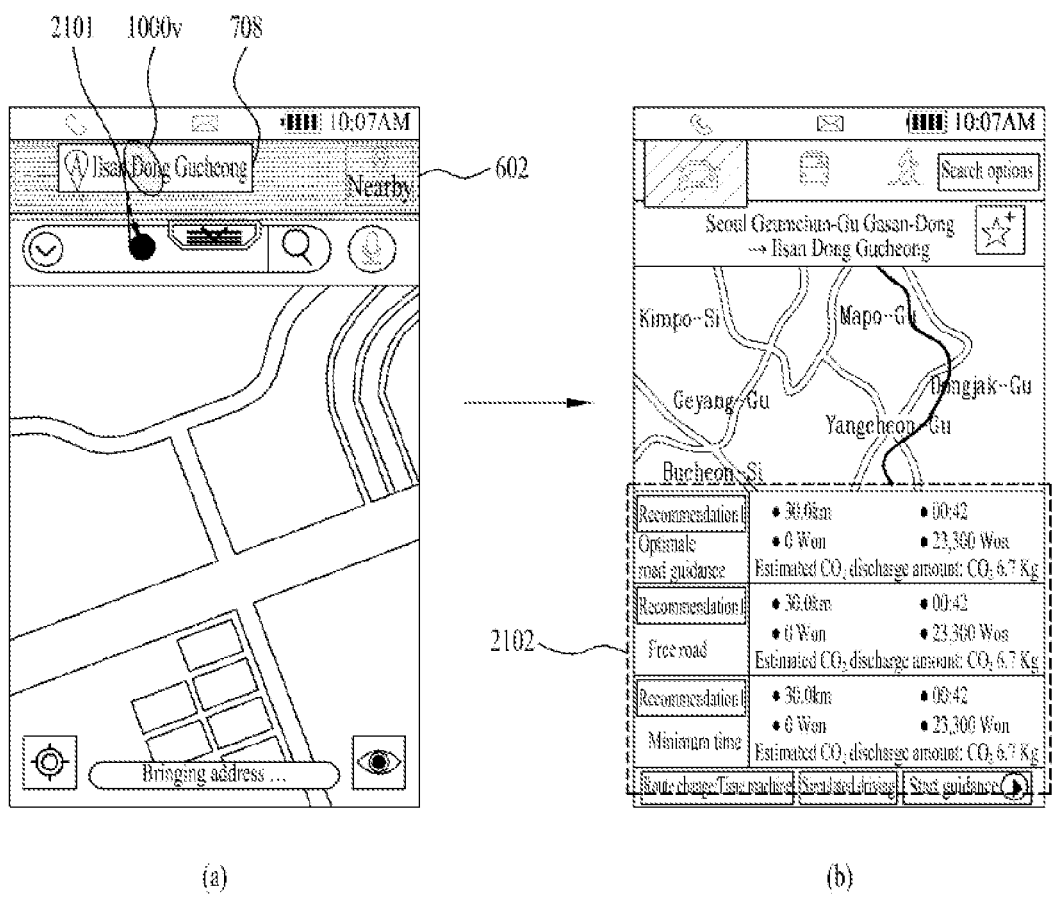

FIGS. 20 to 22 are diagrams illustrating example to describe a copy and/or paste operation for a location information content according to one embodiment of the present invention. FIG. 20A (a) shows one example of saving a content for a specific geographical location. Referring to FIG. 20A (a), the controller 180 currently outputs a screen of a map application as a background and also outputs a clipboard 602 to a prescribed region in a manner that the clipboard 602 overlays the screen of the map application.

If the controller 180 receives a copy command 1000t for copying a geographical location found (or specified) through the map application to the clipboard 602, the controller 180 can save a location information content 708 for the corresponding geographical location in the clipboard 602 (FIG. 20A (b)). In this instance, the saved location information content 708 may include at least one of a coordinate information, an address information and a GPS location information.

If the controller 180 receives a command 1000u for inputting the location information content 1703 to a prescribed location 2001 of the map application, the controller 180 modifies the location information content 1703 into a location information type and can then input it to the map application. If so, the map application can provide an output 2002 on the basis of the input location information so that a point on the map corresponding to the location information can be identified. In particular, in order for the modified and input location information to be identified on the map, the controller 180 can output a location indicator 2002 (or a pin indicator). Such an operation shall be named a pinning operation.

A user can input a geographical location information to a map application through a search or the like. According to one embodiment of the present invention, it is proposed that a geographical location information is input through a paste operation. If the controller 180 receives a command for pasting a specific content 1703 on a prescribed location, the controller 180 determines a property of the corresponding prescribed location. If the determined property of the corresponding prescribed location is the property capable of controlling a geographical location information, it is proposed that the controller 180 inputs the specific content 1703 by modifying a paste type of the specific content 1703 into a geographical location information type.

FIG. 20A shows the example of a method for inputting a location information while a map application is active. On the other hand, according to another embodiment of the present invention, although a map application is not active, it is proposed that a location information is input by performing a paste operation on an activation icon of the map application (FIG. 20B).

Referring to FIG. 20B (a), the controller 180 currently outputs a home screen as a background and also outputs a clipboard 602 to a prescribed top region of the touchscreen 151. An activation icon 2003 of a map application (e.g., Google Maps) is currently output to the home screen. In addition, assume that the same location information content 708 shown in FIG. 20A is saved in the clipboard 602.

According to one embodiment of the present invention, if the controller 180 receives a command 1000mm for pasting the location information content 7608 on the activation icon 2003 of the map application, the controller 180 automatically activates the map application and can also provide a display 2002 so that a place corresponding to the location information content 708 can be identified on the map.

Referring to FIG. 21 (a), the controller 180 currently outputs a screen of a map application (or a navigation application) as a background and also outputs a clipboard 602 on a prescribed region in a manner that the clipboard 602 overlays the screen of the map application. In addition, assume that the same location information content 708 as shown in FIG. 20 is saved in the output clipboard 602.

In order to describe one embodiment of the present invention, assume that the map application provides a search window 2101 for a specific point. In addition, assume that traffic information on the found specific point can be provided through the search window 2101. According to one embodiment of the present invention, proposed is to search for a specific point through a copy operation for copying the location information content 1703 to a location of the search window 2101.

In particular, referring to FIG. 21 (a), if the controller 180 receives a command 1000v for pasting the location information content 708 on the search window 2101 of the map application, the controller 180 searches for a geographical point corresponding to the location information content 708 and can then provide a traffic information 2102 (e.g., an information on a traffic route to the found geographical point, etc.) on the found geographical point. Thus, the controller 180 can automatically perform a search & guidance of information on a traffic route having the corresponding geographical point set to a destination.

Moreover, according to another embodiment of the present invention, although a navigation application is not activated, it can input a location information by performing a paste operation on an activation icon of the navigation application. If a command for pasting a location information content 708 on the activation icon of the navigation application is received, the navigation application is automatically activated, a location information is input, and a search & guidance 2102 of such an information of a traffic route as an optimal route information having the input location information set to a destination and the like can be performed.

Generally, in order to search for a specific point through the aforementioned search window 2101, a user should type to input a title or keyword for the specific point. However, according to one embodiment of the present invention, the corresponding typing input can be replaced by a paste operation.

Figure 22A:
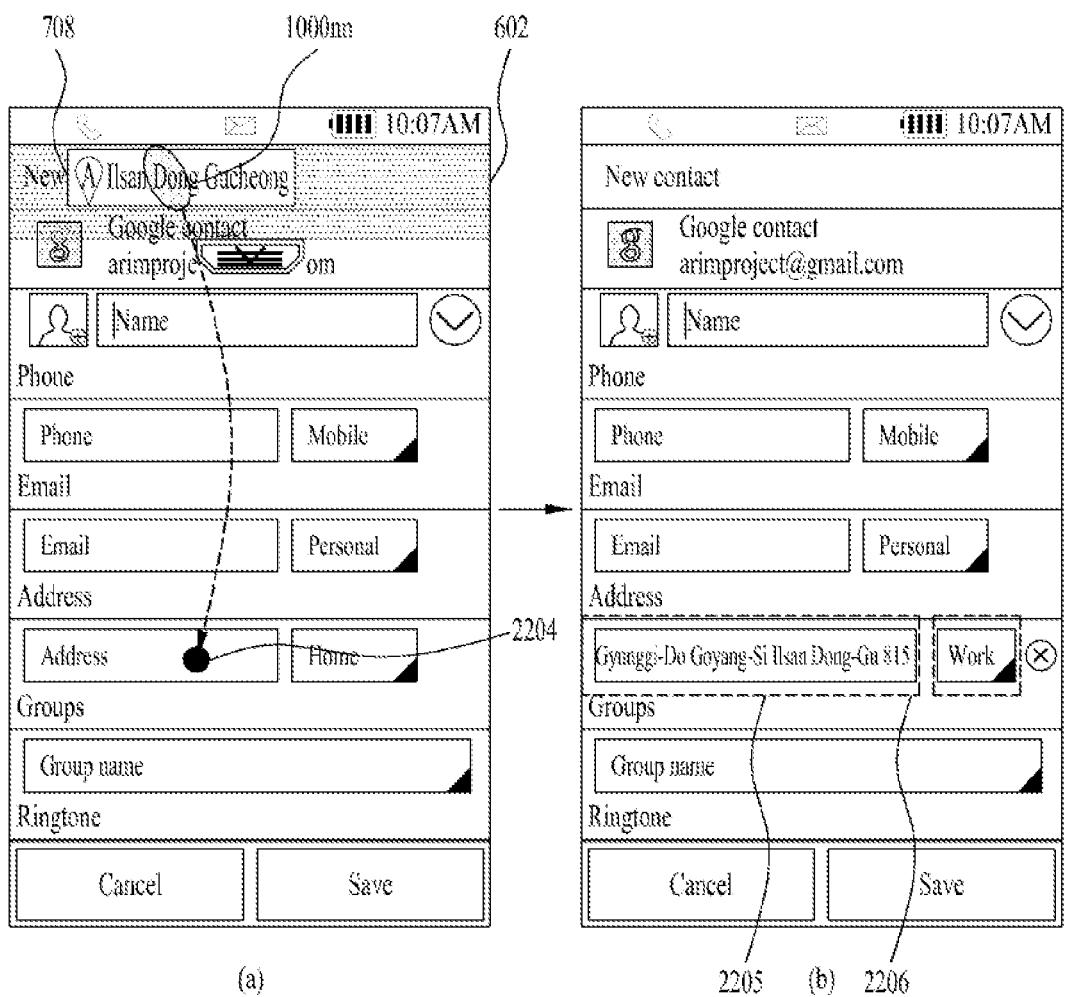

Referring to FIG. 22A (a), the controller 180 currently outputs a contact adding screen as a background and also outputs a clipboard 602 on a prescribed region in a manner that the clipboard 602 overlays the contact adding screen. In addition, assume that the same location information content 708 as shown in FIG. 20 is saved in the output clipboard 602.

If the controller 180 receives a command 1000nn for inputting the location information content 708 to a prescribed location 2204 on the contact adding screen, the controller 180 can automatically input an address of the location information content 708. Moreover, the controller 180 can automatically designate a type 2206 (e.g., company, XXX apartments, home, etc.) of the address by analyzing features (e.g., a building name, a firm name, a shop name, etc.) of the corresponding address.

Figure 22B:
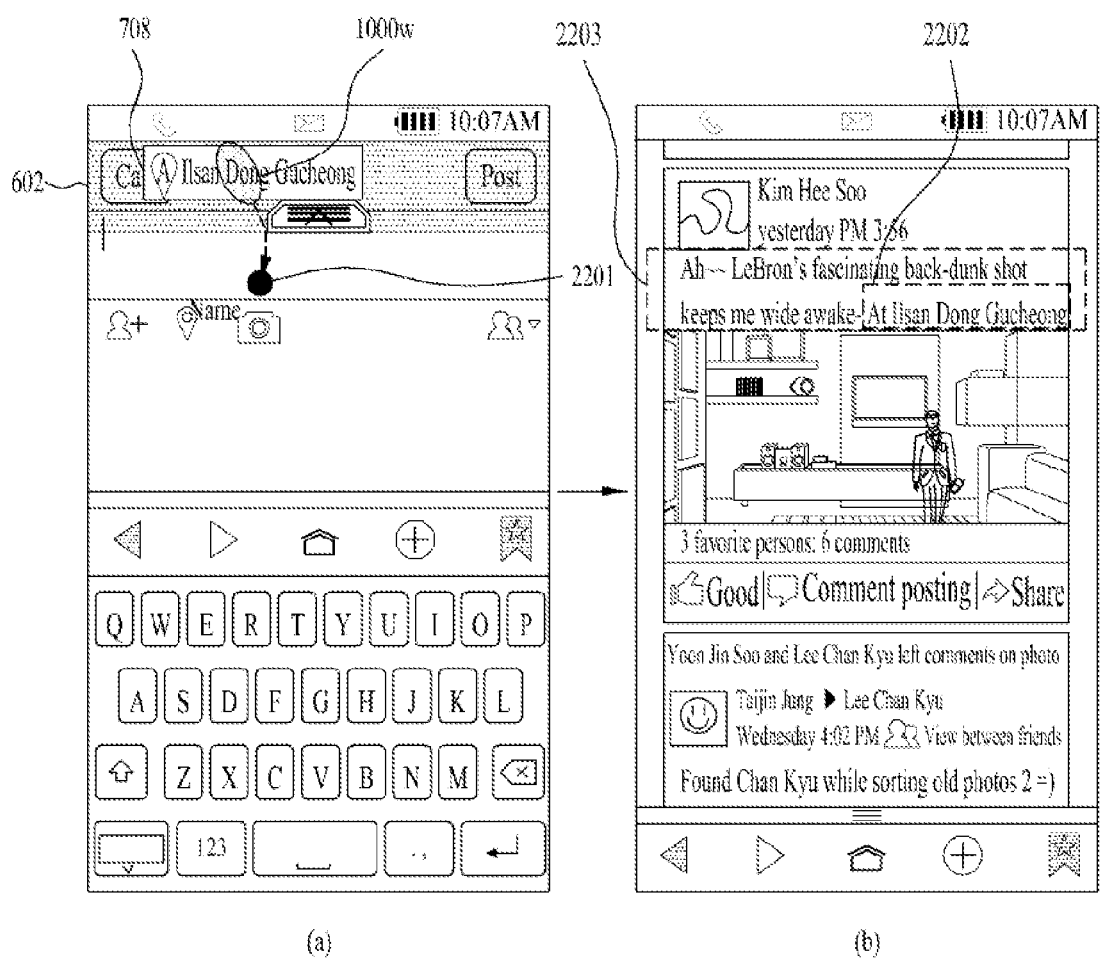

Referring to FIG. 22B (a), the controller 180 currently outputs a screen of an SNS application as a background and also outputs a clipboard 602 to a prescribed region in a manner that the clipboard 602 overlays the screen of the SNS application. In addition, assume that the same location information content 708 as shown in FIG. 20 is saved in the output clipboard 602.

Figure 23:
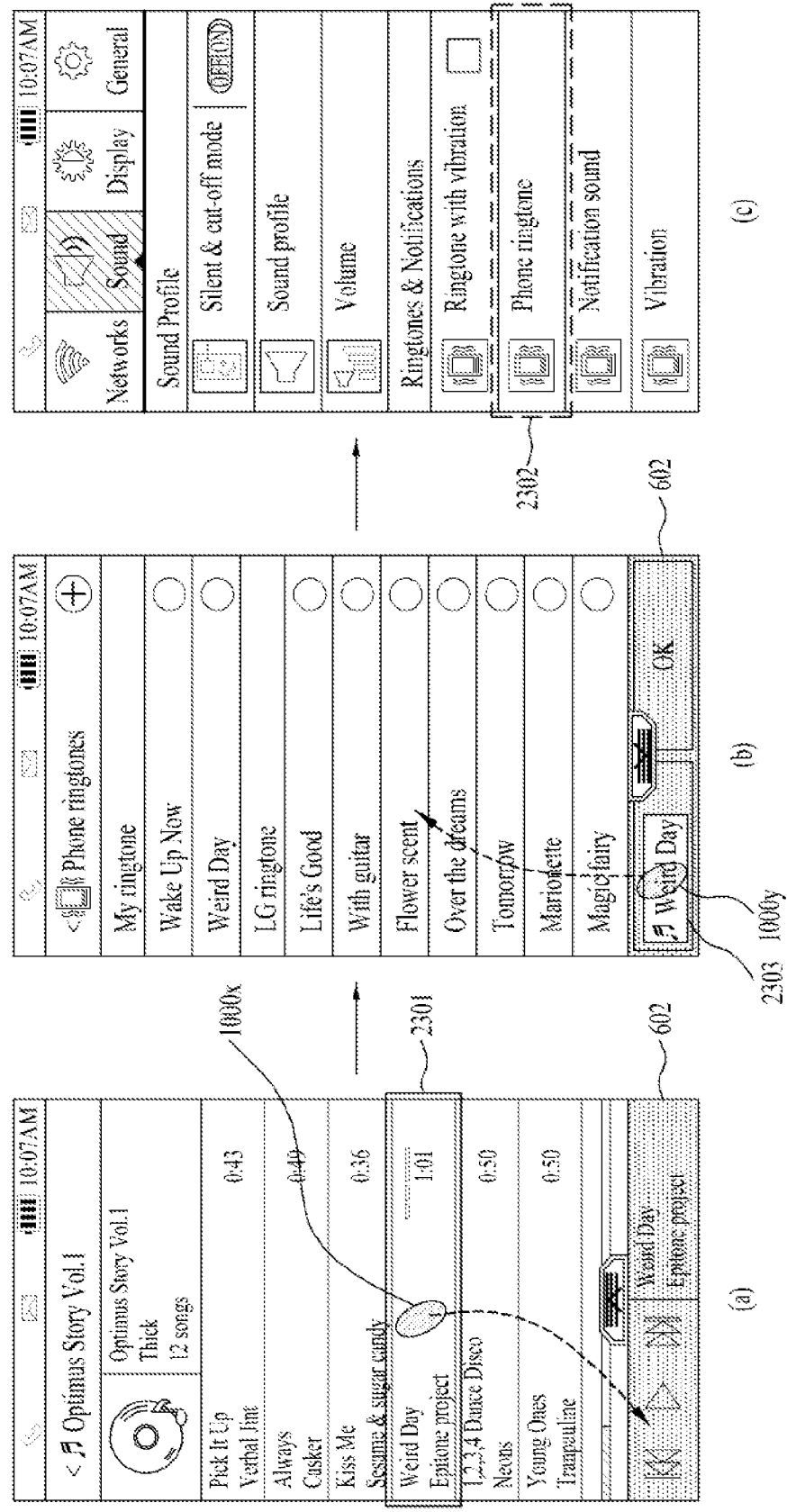
FIGS. 23, 24, 25 and 26 are diagrams illustrating examples to describe a copy and/or paste operation for a sound content according to one embodiment of the present invention.

If the controller 180 receives a command 1000w for inputting the location information content 708 to a prescribed location 2201 on the SNS application, the controller 180 recognizes a GPS location information of the location information content 708 and can then compose a posting 2203 for putting a tag 2202 on a specific place corresponding to the recognized location (FIG. 23 (b)). If the specific place is tagged, the tagged place can be displayed together with the posting 2203. If a user selects the tagged place, the user can further check additional information on the tagged place. Moreover, if the tagged place is selected, a map application is activated and a location indicator 2202 can be further displayed at the tagged place on the activated map application.

FIGS. 23 to 26 are diagrams illustrating example to describe a copy and/or paste operation for a sound content according to one embodiment of the present invention. Referring to FIG. 23 (a), the controller currently outputs a music play application as a background and also displays a clipboard 602 on a prescribed region of the touchscreen 151. According to one embodiment of the present invention, a sound content is saved in the clipboard 602 and the sound content saved in the clipboard 602 is proposed to be input to another location. The sound content saved in the clipboard 602 may include a data previously saved in the memory 160. If the sound content is saved in the clipboard 602, it may mean that an identification information of the sound content is saved.

If the controller 180 receives a command 1000x for copying a song 'Weird Day' 2301, which is included in a music application list of the state diagram shown in FIG. 23 (a), to the clipboard 602, the controller 180 can save a sound content 'weird Day' 2302 in the clipboard 602 (FIG. 23 (b)).

Referring to FIG. 23 (b), a setting screen for designating a ringtone is currently output as a background and a clipboard 602 is also output together with the setting screen. The setting screen for designating a ringtone is the screen provided to designate a sound that notifies a call signal received from an unspecific or specific counterpart. In this setting screen, it can set a ringtone to a song data randomly saved by a user as well as to a default notification sound. Generally, in order to save a song data as a ringtone, a user searches for the corresponding song data and then sets up a ringtone based on the found song data. According to one embodiment of the present invention, it can specify a song data based on the sound content 2302 saved in the clipboard 602.

Referring to FIG. 23 (b), if the controller 180 receives a paste command 1000y for pasting the sound content 2302 saved in the clipboard 602 on the ringtone setting screen, the controller 180 can set the corresponding sound content 2302 as a ringtone. This set ringtone can be checked in the manner shown in FIG. 23 (c).

Figure 24:
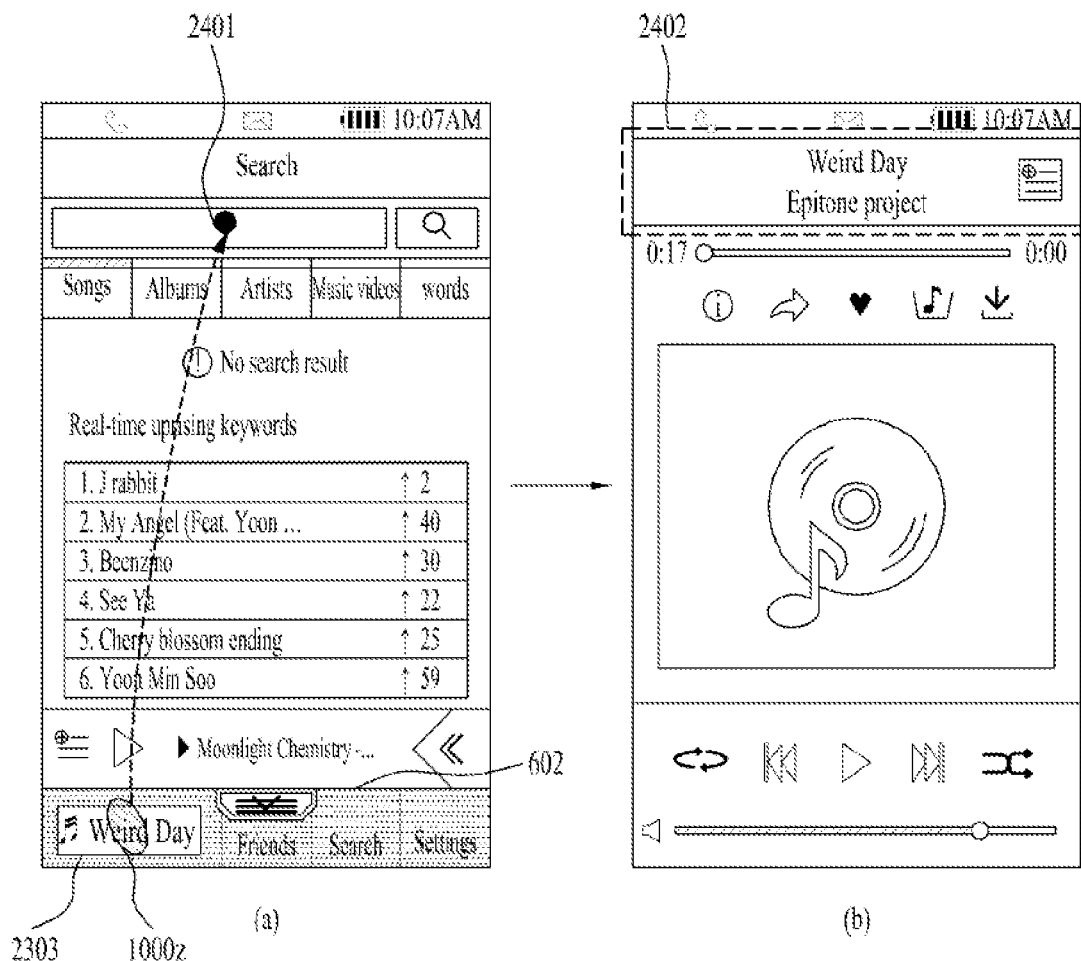

FIG. 24 is a diagram illustrating an embodiment of inputting a sound content 2303 saved in a clipboard 602 to a search window 2401 of a music play application (or a music search application). In this instance, the search window 2401 of the music play application (or the music search application) is the input window provided to search for a specific music. Generally, if a search keyword (e.g., an album title, a singer name, a song title, etc.) is input to the search window 2401, a result from the search keyword input can be output. According to one embodiment of the present invention, proposed is to input a search keyword by a paste operation of pasting the sound content 2303 on the specific search window 2401 instead of typing the search keyword.

If the controller 180 receives a command 1000z for pasting a sound content 'Weird Day' 2303 saved in the clipboard 602 on the search window 2401, the controller 180 can input a search formula related to the sound content 2303 to the search window 2401.

Thus, if the controller 180 receives the command 1000z for pasting the sound content 2303 on the search window 2401, the controller 180 inputs a search keyword resulting from modifying a paste type of the sound content 2030 into a text type. In this instance, the search keyword can be set to include at least one of an artist information, album information and song title of the sound content 2303. Thus, since the search window 2401 handles the search keyword, it can have the property capable of inputting, editing or deleting a text. If a paste operation is performed on a prescribed location having the property capable of inputting, editing or deleting a text like the search window 2401, the controller 180 can input a target content 2402 by modifying a paste type of the target content into a text type.

Moreover, according to one embodiment of the present invention, proposed is a method of setting a ringtone for a specific counterpart by a paste operation of a sound content 2303 saved in a clipboard 602.

Figure 25:
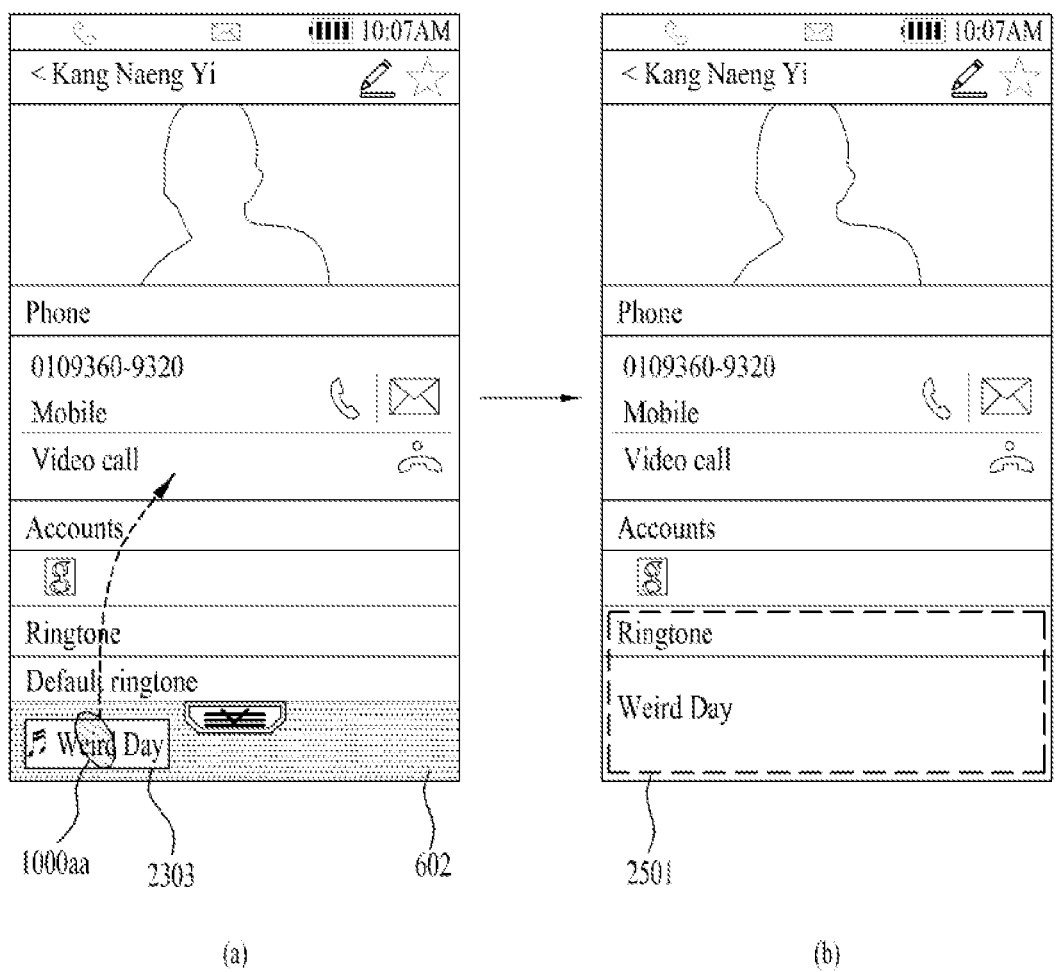

Referring to FIG. 25 (a), a screen of a contact of a specific counterpart (i.e., a counterpart named 'Kang Naeng Yi') is displayed. In addition, a clipboard 602 is displayed on a prescribed region of the screen by overlaying the contact screen. In addition, assume that a sound content 'Weird Day' 2303 is saved in the clipboard 602.

If the controller 180 receives a command 1000aa for pasting the sound content 2303 on the contact of the specific counterpart, the controller 180 can set the sound content 2303 as a ringtone for the specific counterpart. Thus, if the ringtone is set by a paste operation, a user can perform the setting 2501 of the ringtone for the specific counterpart more conveniently, thereby being provided with convenience. Moreover, according to one embodiment of the present invention, proposed is a method of attaching a sound content 2303 to an outgoing message by a paste operation for the sound content 2303.

Figure 26:
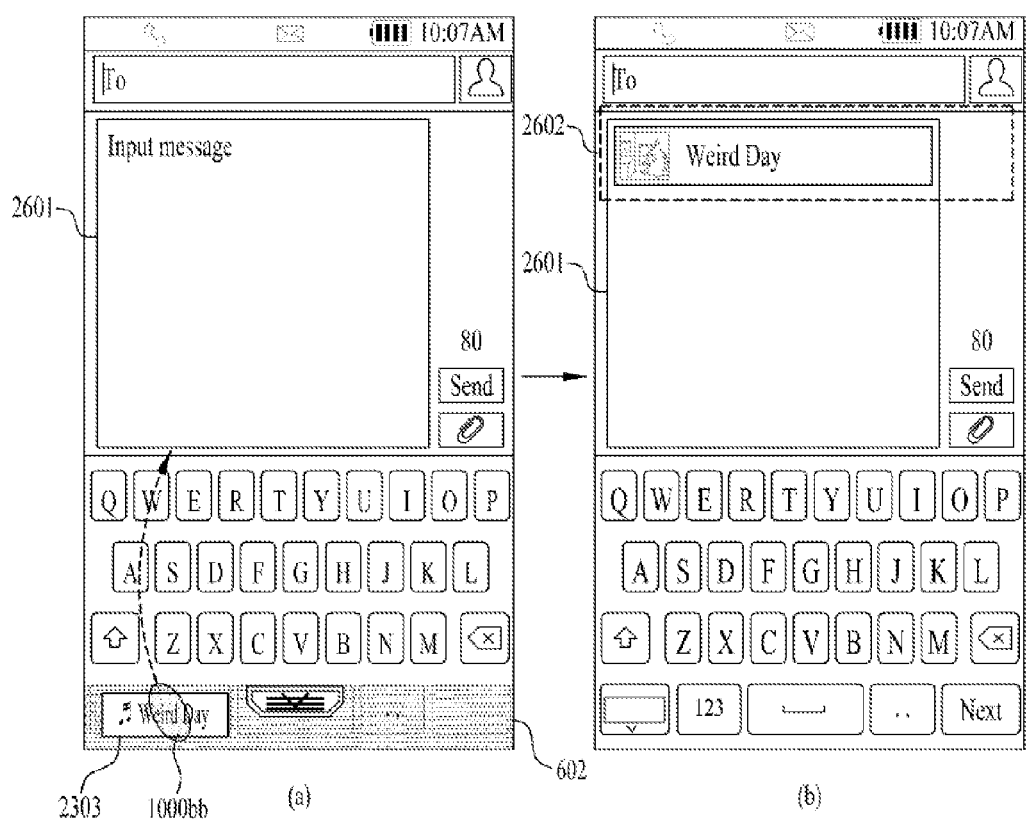

Referring to FIG. 26 (a), a screen of a message transceiving application. In addition, a clipboard 602 is displayed on a prescribed region of the screen by overlaying the screen. In addition, assume that a sound content 'Weird Day' 2303 is saved in the clipboard 602.

If the controller 180 receives a command 1000bb for pasting the sound content 2303 on an outgoing message 2601 for a specific counterpart, the controller 180 can perform an attachment 2602 by attaching the sound content 2303 to the outgoing message 2601. Thus, if the sound content 2303 is attached, when the controller 180 sends the corresponding message, the controller 180 can send the sound content 2303 together.

According to one embodiment of the present invention, it can easily input a search keyword using a content copied to a clipboard 602. This embodiment shall be described in detail with reference to FIG. 27 and FIG. 28 as follows.

Figure 27:
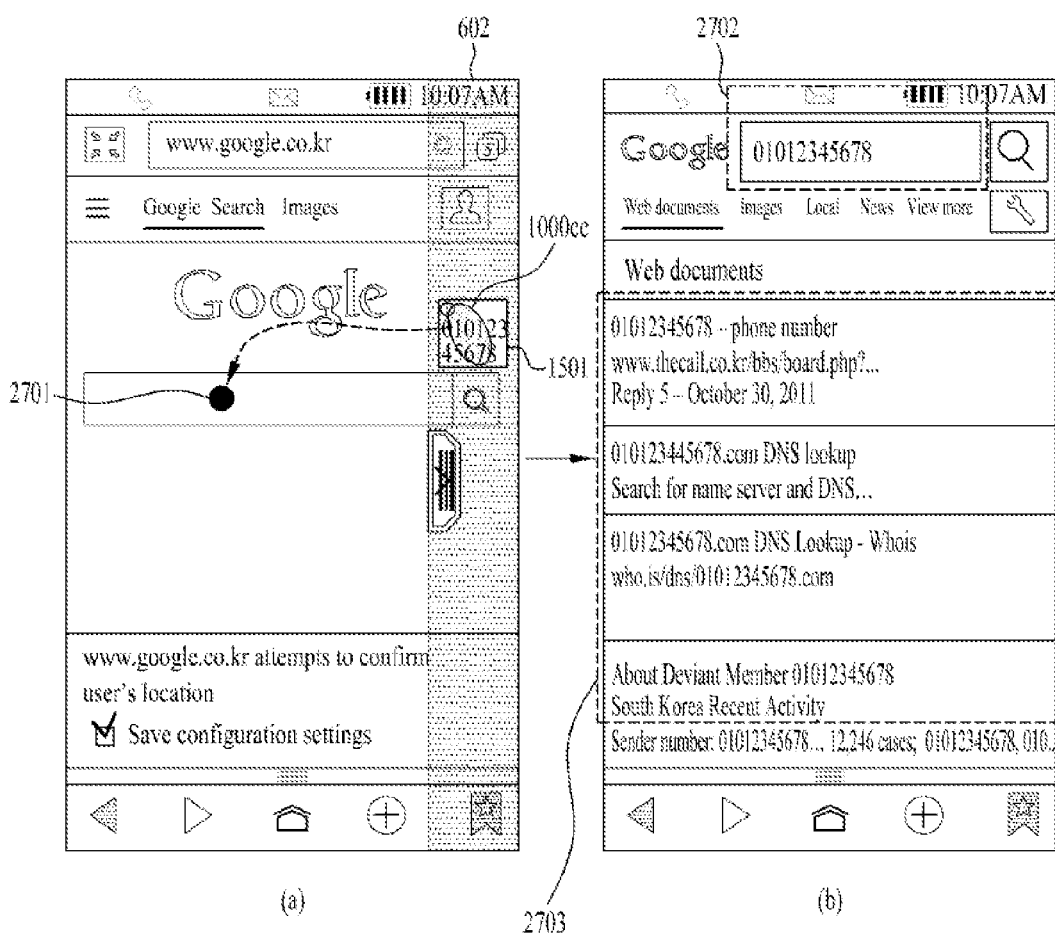
FIG. 27 is a diagram illustrating one example of a method of inputting a search keyword according to one embodiment of the present invention.

FIG. 27 is a diagram illustrating one example of a method of inputting a search keyword according to one embodiment of the present invention. Referring to FIG. 27 (*a*), a search window 2701 (or a search window of a search site activated in a web browser application) is currently output. In addition, a clipboard 602 is displayed on a manner of overlaying a prescribed region of a screen.

Assume that the saved numeral content 1501 described with reference to FIG. 15 is saved in the clipboard 602. According to one embodiment of the present invention, if the controller 180 receives a command 1000*cc* for pasting the numeral content 1501 on a search window 2701, the controller 180 can provide a search result 2703 having the numeral content 1501 set as a search keyword 2072 (FIG. 27 (*b*)).

Figure 28:
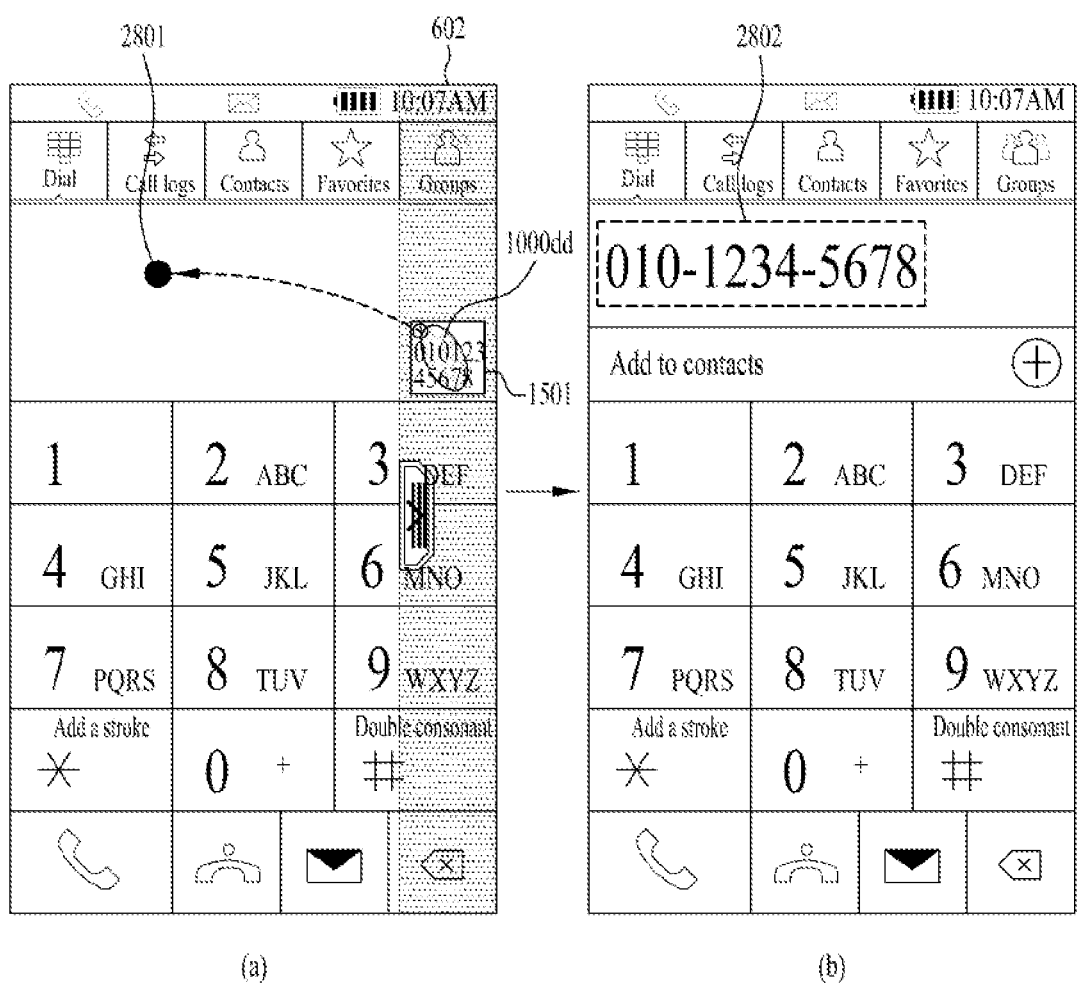
FIG. 28 is a diagram illustrating one example of a method of inputting a phone number to save a contact according to one embodiment of the present invention.

FIG. 28 is a diagram illustrating one example of a method of inputting a phone number to save a contact according to one embodiment of the present invention. Referring to FIG. 28 (*a*), a contact saving screen (keypad for inputting a contact included) is currently output. In addition, a clipboard 602 is displayed on a manner of overlaying a prescribed region of the screen.

Assume that the saved numeral content 1501 described with reference to FIG. 15 is saved in the clipboard 602. According to one embodiment of the present invention, if the controller 180 receives a command 1000*dd* for pasting the numeral content 1501 on a contact input box 2801 in the contact saving screen, the controller 180 can automatically input the numeral content 1501 to the input box 2801 (FIG. 28 (*b*)). If so, a user can easily save the contact based on the automatically input numeral content 1501.

Meanwhile, according to one embodiment of the present invention, a following method is proposed. First of all, a login information on a specific site that requires a login is saved by the copy operation mentioned in the foregoing description. Secondly, the saved login information is input to a login information input box by a paste operation. This method shall be described in detail with reference to FIG. 29 and FIG. 30.

Figure 29:
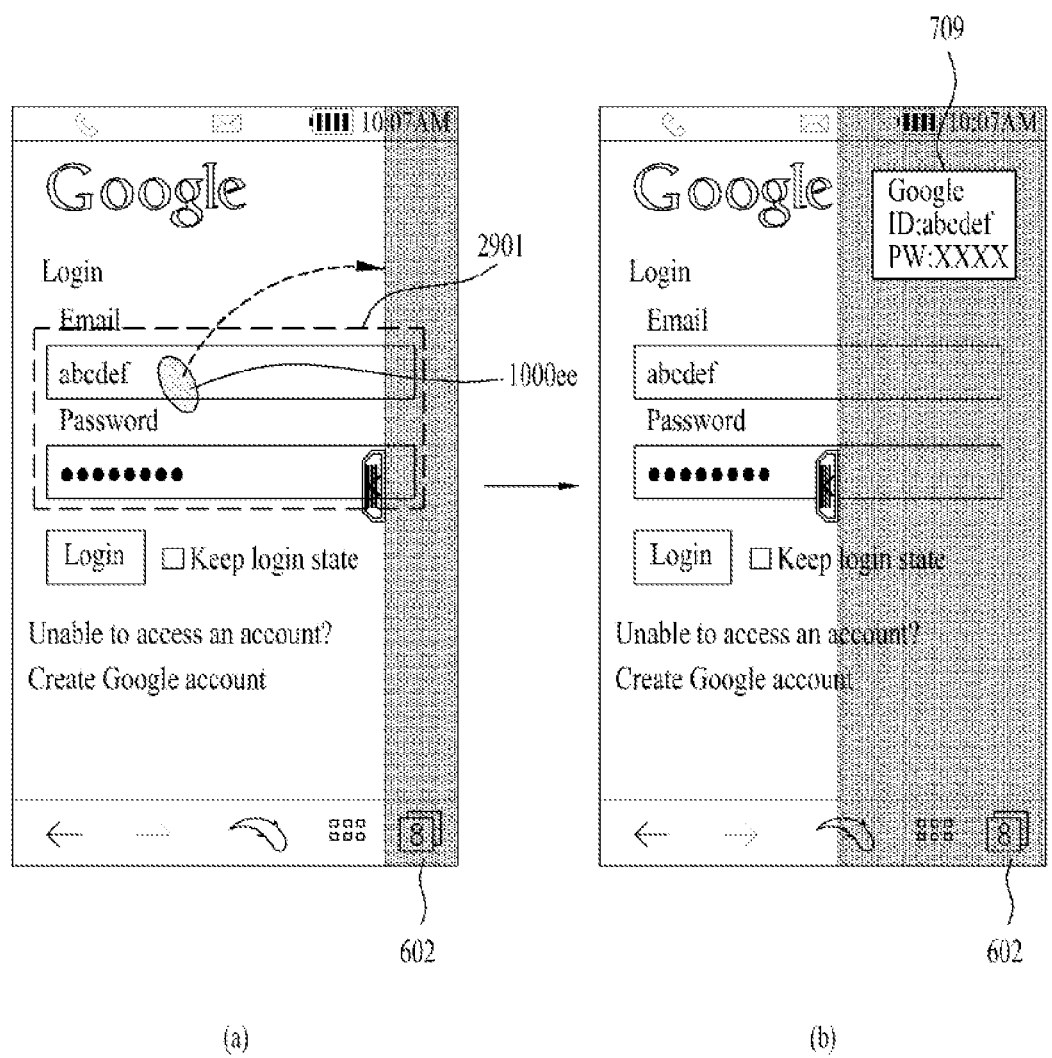
FIG. 29 is a diagram illustrating one example of a method of copying a login information according to one embodiment of the present invention.

FIG. 29 is a diagram illustrating one example of a method of copying a login information according to one embodiment of the present invention. Referring to FIG. 29 (*a*), a login information input screen of a site 'Google' is currently output as a background. In addition, a clipboard 602 is displayed on a prescribed region of a screen. According to one embodiment of the present invention, proposed is to apply a copy & paste operation on a login information 2901 (e.g., at least one of ID, email address and password) for each specific site. In particular, by inputting the saved login information 2901 through a paste operation later, a user can be provided with a user interface capable of inputting the complicated login information easily and quickly.

When the controller 180 save the login information 2901 on the specific site, the controller 180 can control an ID information (or email information) and a password to be saved by matching each other. Moreover, the controller r180 can save an information for identifying the specific site together as well.

If the controller 180 receives a copy command 100033 for copying the login information 2901, the controller 180 can control the login information 2901 to be saved as a login information content 709 in the clipboard 602 (FIG. 29 (*b*)). A paste operation for the login information content 709 is described in detail with reference to FIG. 30 as follows.

Figure 30:
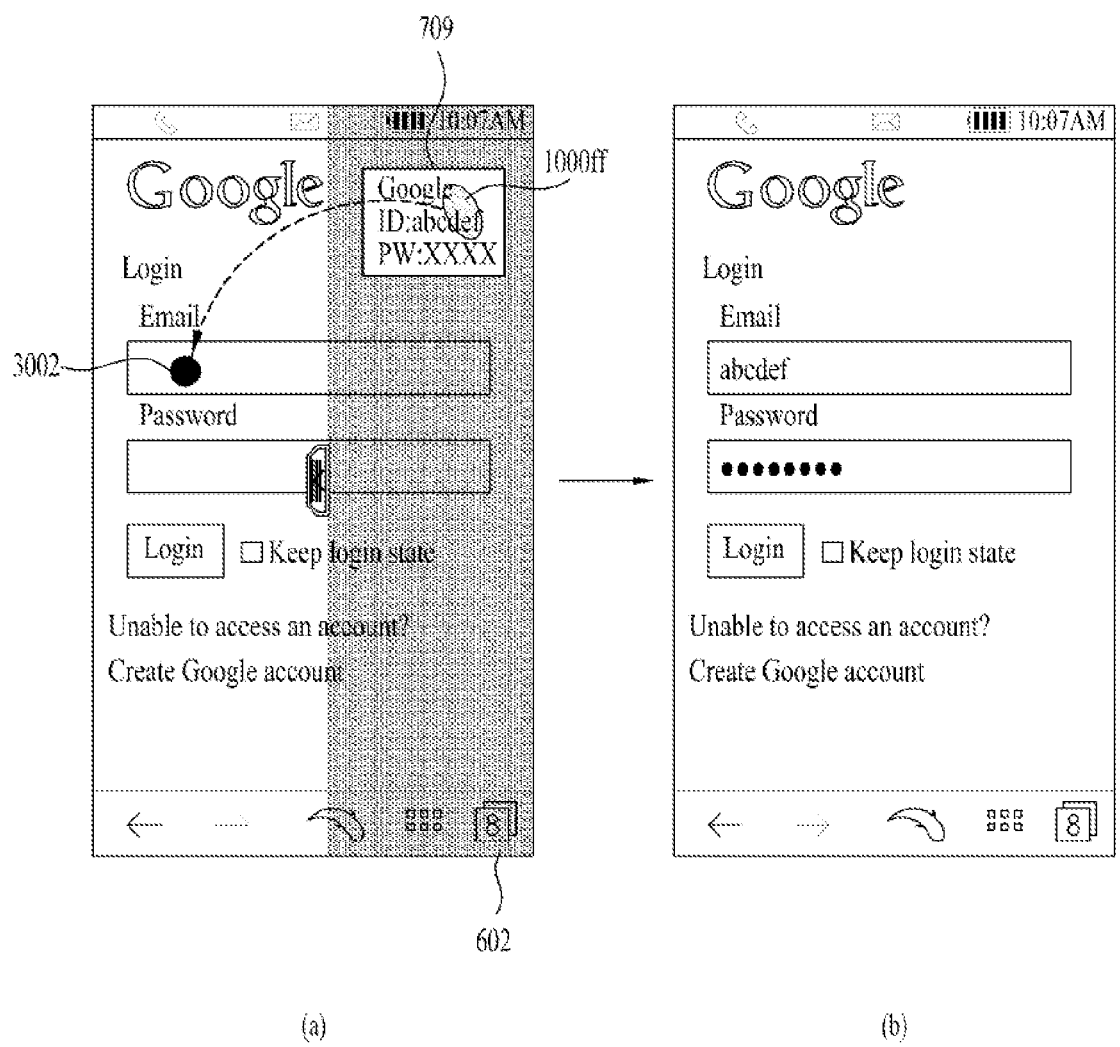
FIG. 30 is a diagram illustrating one example of applying a paste operation for a login information content 709 according to one embodiment of the present invention.

FIG. 30 is a diagram illustrating one example of applying a paste operation for a login information content 709 according to one embodiment of the present invention. Referring to FIG. 30 (*a*), the controller 180 currently outputs a login information input screen and also displays a clipboard 602 on a prescribed region of the screen. Currently, a login information has not been input to the login information input screen shown in FIG. 30 (*a*).

According to one embodiment of the present invention, when the login information is input, proposed is to input the login information by a paste operation instead of a user's typing action. Assume that a login information content 709 for a site 'Google' is saved in the clipboard 602.

If the controller 180 receives a command 1000*ff* for pasting the login information content 709 on a login input box 3002 (an ID input box and a password box included), the controller 180 can individually input the login information content 709 to the ID input box and the password box of the login input box 3002. In particular, according to one embodiment of the present invention, proposed is a method of inputting an ID information and a password information required for a login by a single paste operation at a time.

Meanwhile, since login information 2901 for various sites is generally maintained identical, according to another embodiment of the present invention, the above-mentioned paste operation of pasting the login information content 709 is not limited to a specific site but may be applicable various sites.

Figure 31:
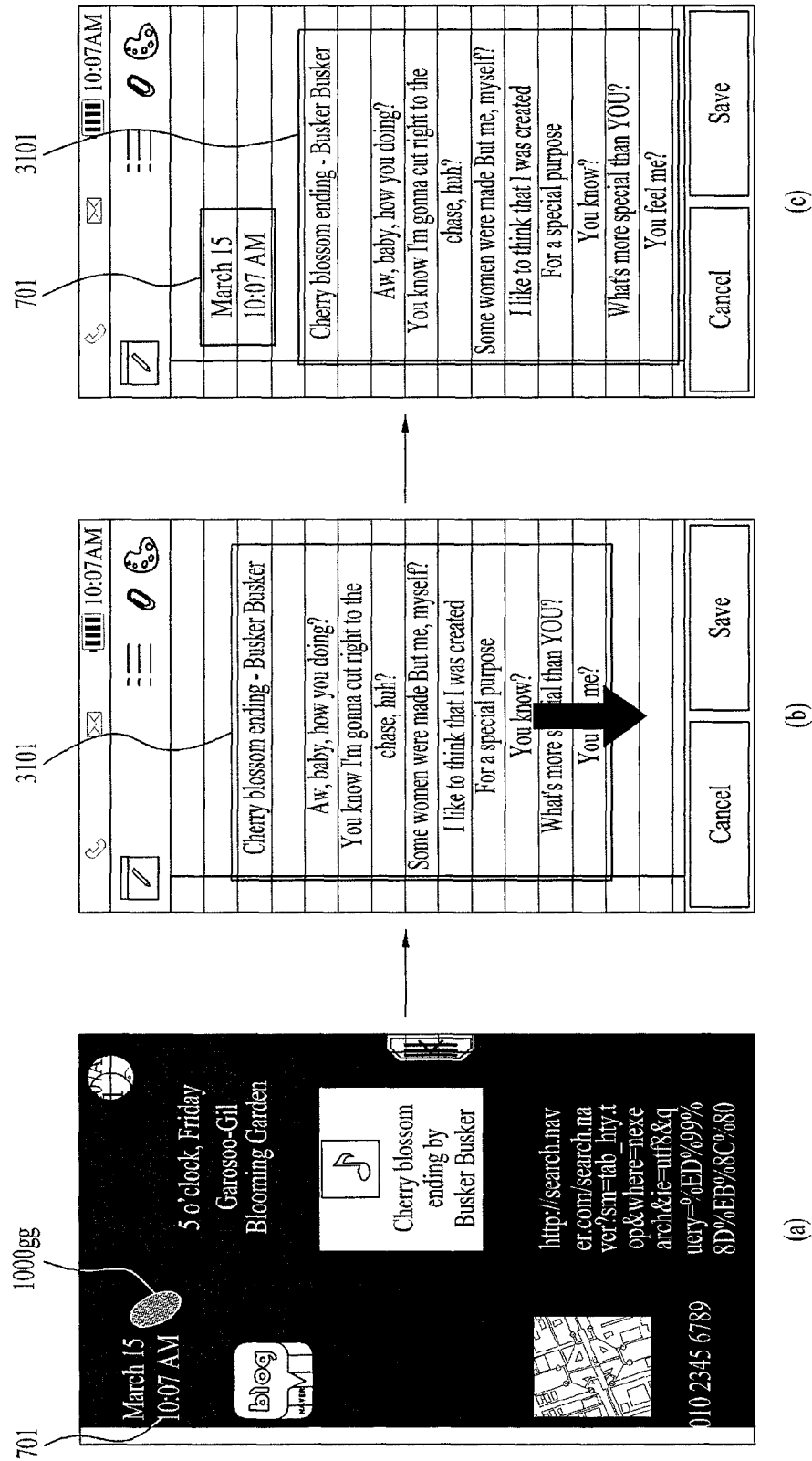
FIG. 31 is a diagram illustrating one example to describe an operation when a clipboard 602 occupies a full screen.

FIG. 31 is a diagram illustrating one example to describe an operation when a clipboard 602 occupies a full screen. Referring to FIG. 31 (*a*), the controller 180 currently outputs a memo application layer to a bottom layer as a background and also outputs a layer of a clipboard 602 to a top layer. Thus, assume that a command 1000*gg* for pasting a first content 701 on the memo application layer located on the bottom layer is received.

Referring to FIG. 31 (*b*), when a state diagram of a current output screen of the memo application, since a memo content 3101 is input to a memo application screen overall, if a paste operation of pasting a content is performed in response to the above command 1000*gg*, it may cause a problem that the corresponding content may contend (or overlap) with the currently input memo content. Therefore, according to one embodiment of the present invention, if a contention occurs between an existing content already input to a screen and a content input by a paste operation, the controller 180 is proposed to move the existing content (FIG. 31 (*b*), FIG. 31 (*c*)).

In particular, referring to FIG. 31 (*c*), in order to prevent the first content 701 input in response to the paste command 1000*gg* from overlapping the memo content 3101, the controller 180 can display the memo content 3101 by moving the memo content 3101 toward a bottom end of the screen by a prescribed distance.

So far, the paste operation of pasting a content saved in the clipboard 602 has been described. In the following description, a method of editing contents saved in a clipboard 602 is explained.

Clipboard Editing Operation

Figure 32:
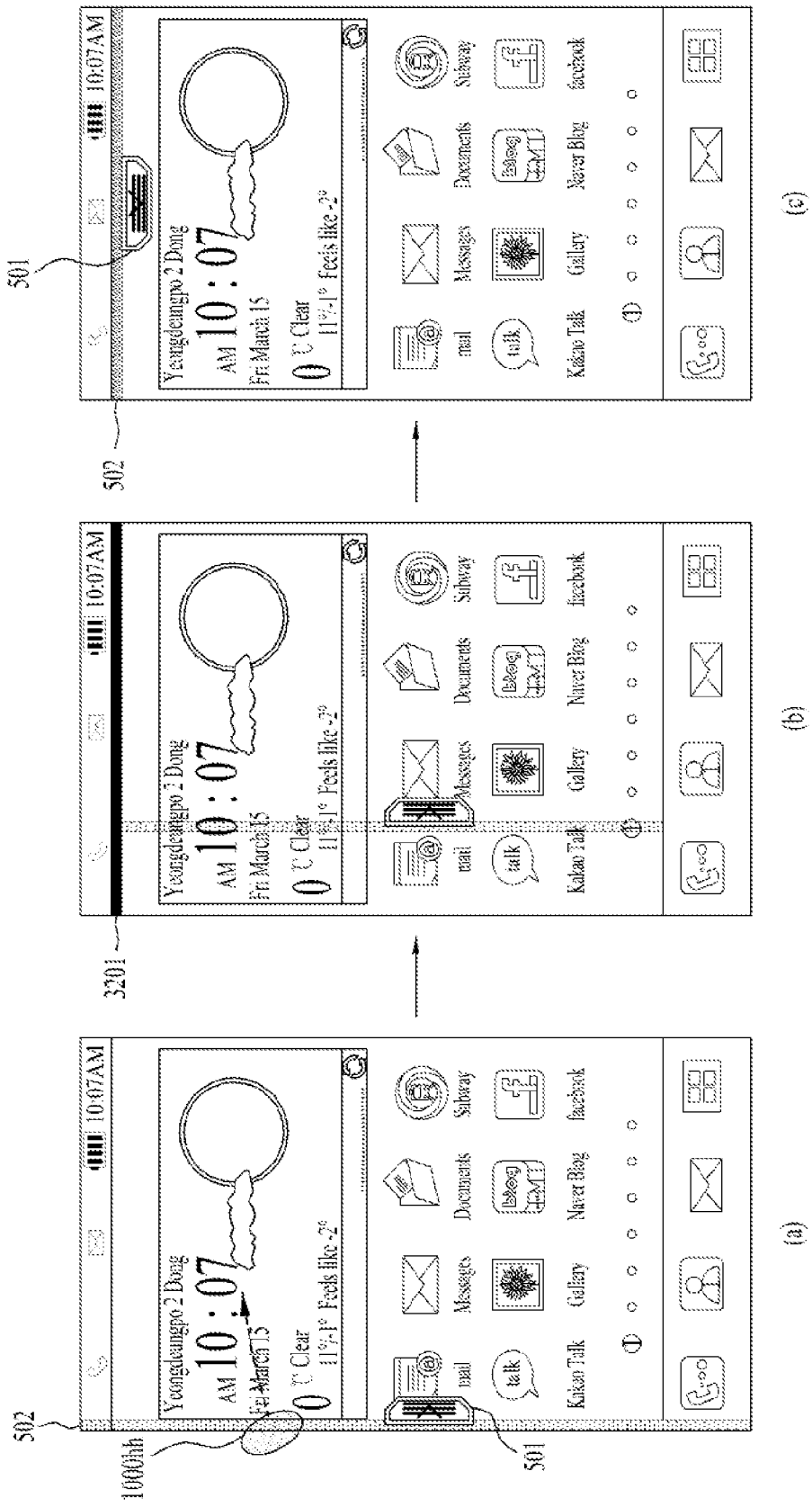
FIG. 32 is a diagram illustrating one example of a method of changing locations of a clipboard handler 501 and a bar indicator 502 according to one embodiment of the present invention.

FIG. 32 is a diagram illustrating one example of a method of changing locations of a clipboard handler 501 and a bar indicator 502 according to one embodiment of the present invention.

In order to change a location of a clipboard handler 501 and a location of a bar indicator 502, the controller 180 can enter a location change mode. In particular, if a command (e.g., an input of touching the bar indicator 502 over prescribed duration) for entering the location change mode is received, the controller 180 can enter the location change mode.

Referring to FIG. 32 (a), assume when while the location change mode is entered, a location of the bar indicator 502 is changed. The clipboard handler 501 and the bar indicator 502 are currently located on a left edge of the touchscreen 151. In addition, assume when a user intends to locate the clipboard handler 501 and the bar indicator 502 on a top edge of the touchscreen 151.

If the controller 180 receives a touch drag input 1000hh to the bar indicator 502, the controller 180 can control the bar indicator 502 to be displayed by being shifted to a touch dragged location (FIG. 32 (b)). Subsequently, if a direction of the touch drag is turned toward a top end of the touchscreen 151, the controller 180 can output an indicator 3201 indicating that the bar indicator 502 can be positioned at the top end.

While the indicator 3201 is output, if the controller 180 receives an input of cancelling the touch of the touch drag input 1000hh, the controller 180 can arrange a location of the bar indicator 502 at the top end of the touchscreen 151 (FIG. 32 (c)). Meanwhile, the bar indicator 502 can be located or positioned on each of 4 edges of the touchscreen 151 in the same manner and may be shifted depending on user's position settings.

Figure 33:
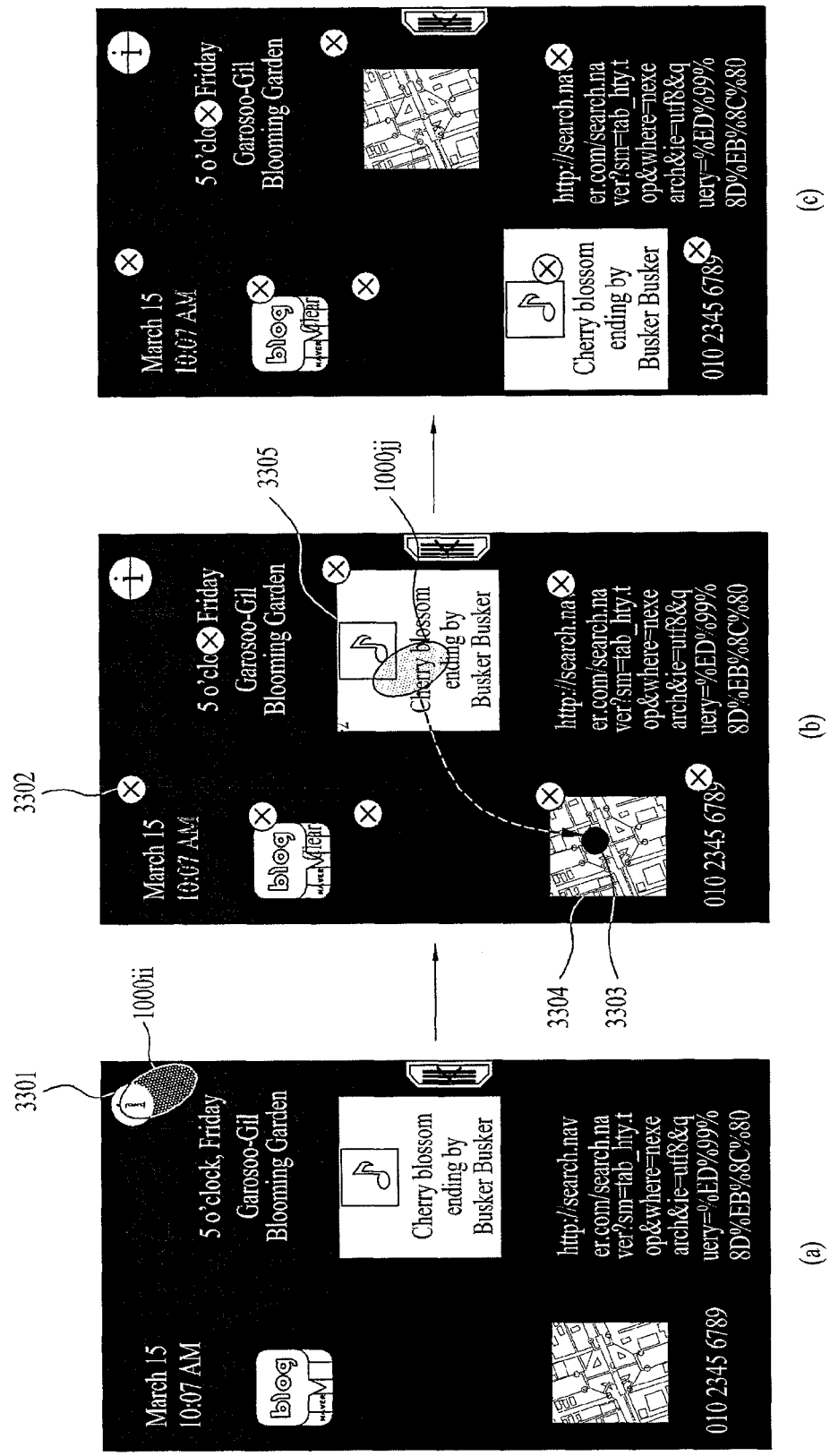
FIG. 33 is a diagram illustrating one example of a method of deleting or editing a content saved in a clipboard 302 according to one embodiment of the present invention.

FIG. 33 is a diagram illustrating one example of a method of deleting or editing a content saved in a clipboard 302 according to one embodiment of the present invention. When many contents are saved in the clipboard 602, it is necessary to delete or edit the many contents. Therefore, according to one embodiment of the present invention, provided is a content editing mode for editing contents saved in the clipboard 602.

Thus, according to one embodiment of the present invention, the controller 180 displays the clipboard 602 and also outputs an icon 3301 provided to enter the content editing mode. If the controller 180 receives a command 1000ii for entering the content editing mode, the controller 180 can switch a current mode to the content editing mode. In this instance, the command 1000ii may include an input of touching the aforementioned icon 3301.

FIG. 33 (b) shows a content editing mode. Referring to FIG. 33 (b), the controller 180 currently outputs a content delete icon 3302 to each content of a clipboard 602. If the controller 180 receives a command 1000jj for shifting a first content 3305 to a prescribed location 3303 on a second content 3304, the controller 180 can switch a location of the first content 3305 and a location of the second content 3304 to each other. Thus, the command 1000jj may include an input performed by touching the first content 3305, dragging the touched first content 3305 to the second content 3304 by maintaining the corresponding touch, and then removing the corresponding touch.

If the controller 180 receives a command for deviating from the content editing mode, the controller 180 can return to a previous state by deviating from the content editing mode. This command may include an input performed by retouching the aforementioned icon 3301.

Figure 34:
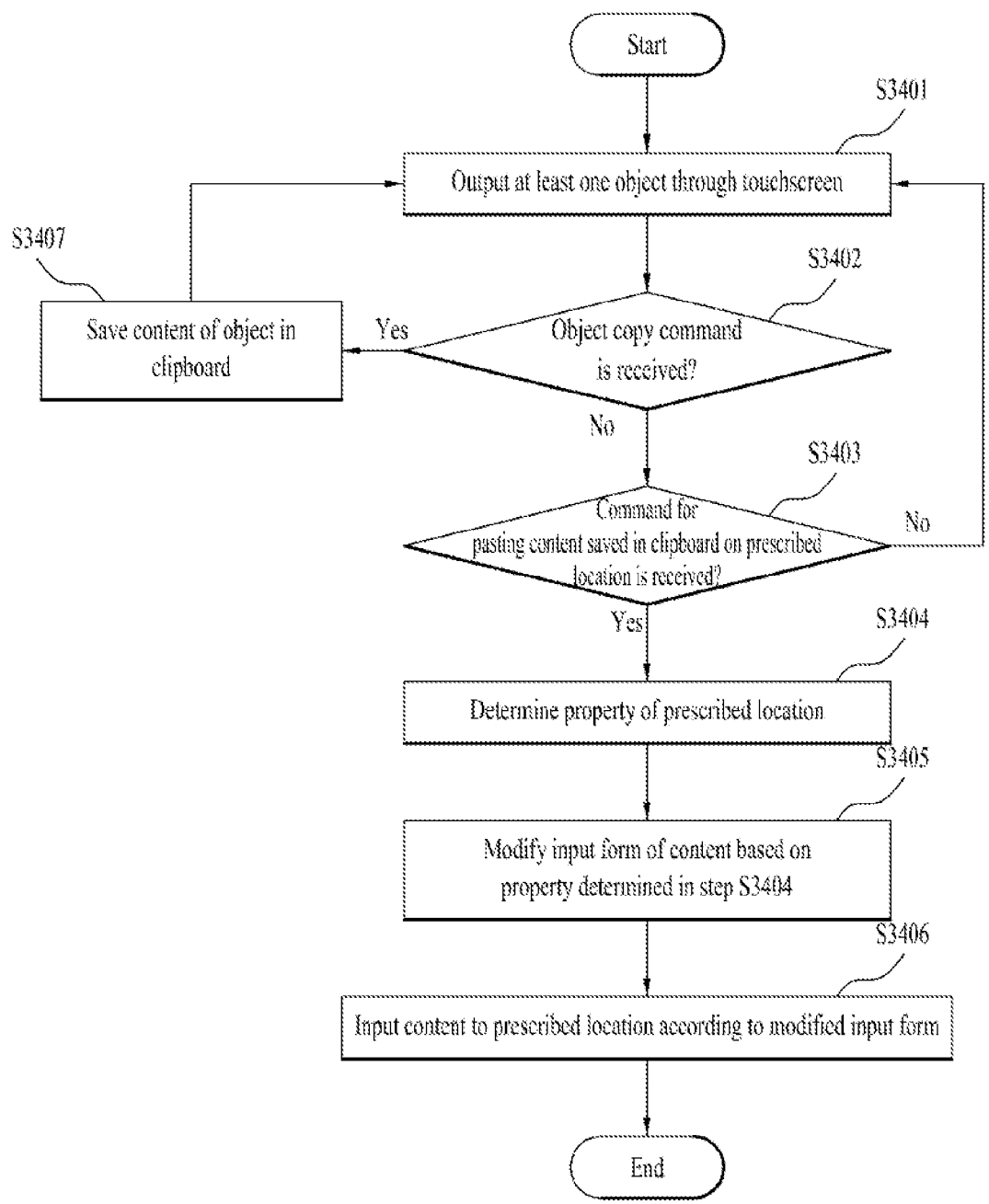
FIG. 34 is a flowchart illustrating a method of controlling a mobile terminal according to one embodiment of the present invention.

FIG. 34 is a flowchart illustrating a method of controlling a mobile terminal according to one embodiment of the present invention. Referring to FIG. 34, in a step S3401, the controller 180 can output at least one object through the touchscreen. In this instance, the object may include at least one of an activation icon of an application, a text data (numeral data included), a contact data, a sound data and a location (or position) data.

In a step S3402, if the output object copying command is received, the controller 180 can go to a step S3407. In the step S3407, the controller 180 can save a content of the output object in the clipboard 602 mentioned in the foregoing description. If the output object copying command is not received in the step S3402, the controller 180 can go to a step S3403. In the step S3403, the controller 180 determines whether a paste command for pasting on a prescribed location exists. If the paste command exists in the step S3403, the controller 180 can go to a step S3404. If the paste command does not exist in the step S3403, the controller 180 can return to the step S3401.

In the step S3404, the controller 180 can determine a property of the prescribed location. In a step S3405, the controller 180 modifies a paste type of the content through a paste based on the determined property. Finally, in a step s3406, the controller 180 can input the content to the prescribed location in accordance with the content having the paste type modified.

So far, according to the embodiment mentioned in the foregoing description, a controlling method of utilizing a clipboard in copying and pasting a specific content has been described. According to another embodiment of the present invention, a controlling method of performing a copy & paste operation using a touch path of a user's touch drag input is described as follows.

First of all, an operation of copying an image is described as follows.

Using Touch Path—Copy Operation

Figure 35:
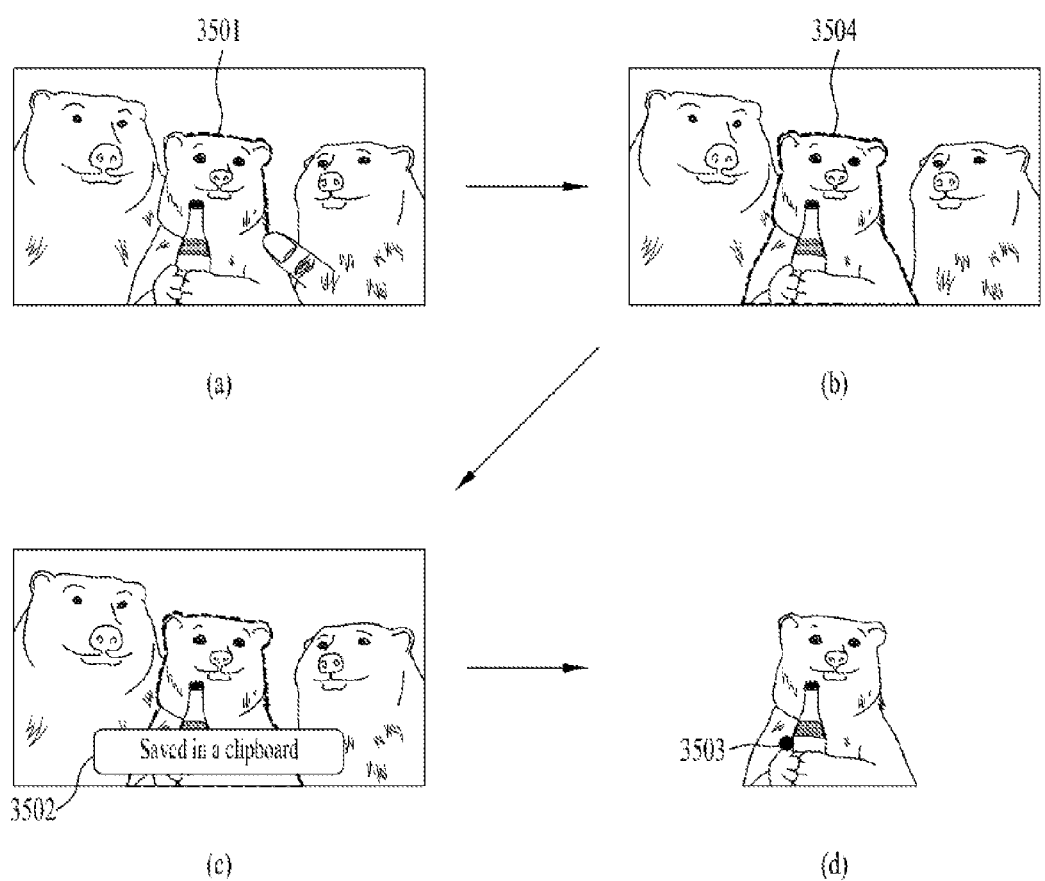
FIG. 35 is a diagram illustrating one example of a touch input for performing a copy operation in a mobile terminal 100 according to one embodiment of the present invention.

FIG. 35 is a diagram illustrating one example of a touch input for performing a copy operation in a mobile terminal 100 according to one embodiment of the present invention.

Assume that FIG. 35 is a state diagram when a copy mode for supporting a copy operation is entered in an active screen of a gallery application for viewing photos. As an example of an input for entering a copy mode for a prescribed photo, there is an input performed by while a prescribed photo is viewed using a gallery application, touching & pressing a prescribed region of the prescribed photo.

Referring to FIG. 35 (a), in order to copy a prescribed region of a photo in copy mode, according to one embodiment of the present invention, a touch drag input is used. In particular, if there is a region intended to be copied, a user can use a touch path established by a touch drag input in designating an outline figure of the corresponding region. The controller 180 can output a path identifier 3501 for identifying the touch path established by the touch drag input.

On the other hand, according to embodiments of the present invention, touch inputs inputtable to the touchscreen 151 include a touch input performed through various inputtable tools such as a stylus pen and the like as well as a touch input through user' finger(s).

Referring to FIG. 35 (b), if a first closed curve 3504 is formed by the touch path, the controller 180 can save a capture screen of a screen output within the first closed curve

3504. In addition, the controller 180 can output a guidance text 3502 indicating that the capture screen has been saved (FIG. 35 (*c*)).

Referring to FIG. 35 (*d*), the capture screen (or capture image) output within the first closed curve 3504 may have an outline figure identical to that of the first closed curve 3504. Hence, in the following description, the outline figure formed by the closed curve may use the reference number identical to that of the corresponding closed curve. In addition, in the following description, the capture screen shall be named a first image 3503.

FIG. 36 is a diagram illustrating another example of a saved capture screen (or image) according to one embodiment of the present invention. In particular, FIG. 36 (*a*) and FIG. 36 (*b*) show examples of a copy operation according to one embodiment of the present invention. FIG. 36 (*a*) is a state diagram of a copy mode as well.

Referring to FIG. 36 (*a*), a second closed curve 3601 is formed on an outline of a cola cup in a currently output photo in response to a touch drag input. The controller 180 can save a second image 3603 of a screen, which is output within the second closed curve 3601, in the memory (or a clipboard).

In the descriptions of embodiments of the present invention, such a terminology as a clipboard can be used. In the embodiments of the present invention, the clipboard means a virtual storage space for temporary storage in order to perform a copy & paste operation. To discriminate the meaning of the storage in the clipboard (i.e., 'saving in the clipboard') in consideration that something is saved in the memory 160 included in the configuration of the mobile terminal 100 by being separately stored to perform the copy & paste operation, the terminology 'saving in the clipboard' is used.

FIG. 36 (*b*) is a state diagram of a copy mode as well. Referring to FIG. 36 (*b*), a third closed curve 3602 is formed on an outline of a cola cup in a currently output photo in response to a touch drag input. The controller 180 can save a third image 3604 of a screen, which is output within the third closed curve 3602, in the memory (or a clipboard).

Figure 37:
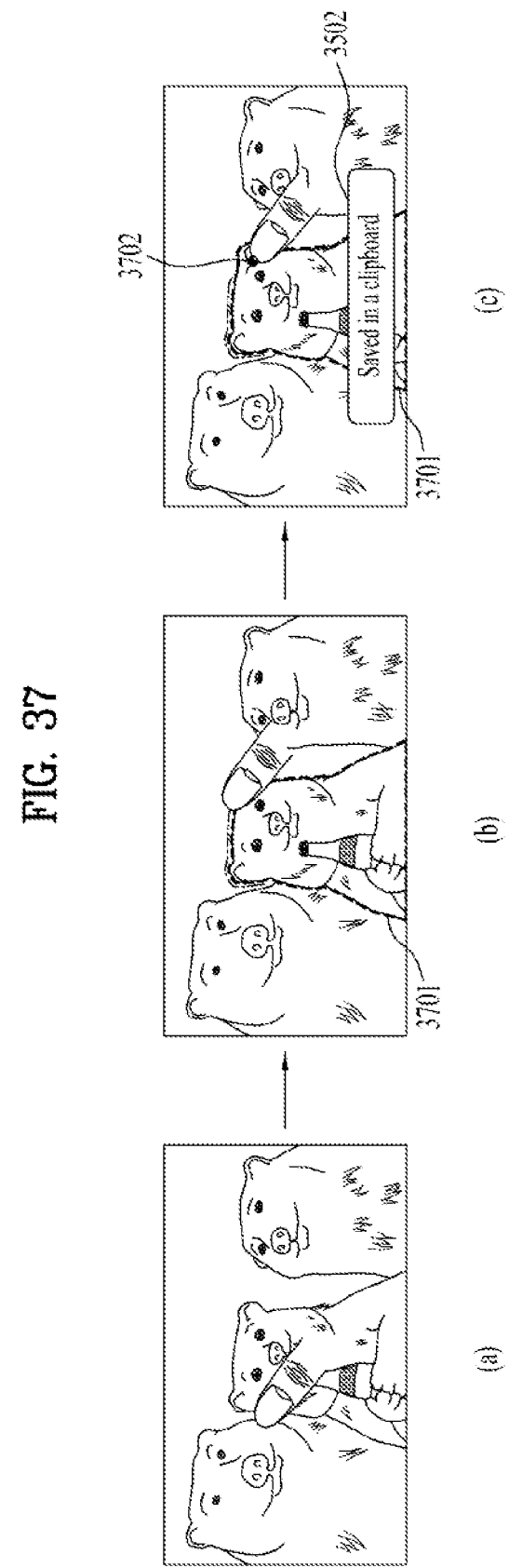
FIG. 37 is a diagram illustrating one example of a method of automatically forming a closed curve according to one embodiment of the present invention.

FIG. 37 is a diagram illustrating one example of a method of automatically forming a closed curve according to one embodiment of the present invention. Generally, in order to for a touch path to form a closed curve, the touch path should return to a touch starting point. However, if a touch drag input is performed along an outline of a specific object currently output to a photo, it is highly probable that a user's intention corresponds to a copy operation for the corresponding object. Therefore, according to one embodiment of the present invention, outline figures of objects for a photo are analyzed. If it is determined that a touch drag input is performed along an outline figure of a specific object, a closed curve in the corresponding outline figure is automatically designated.

FIG. 37 (*a*) is a state diagram of a copy mode according to one embodiment of the present invention. In this state diagram, three bears are displayed like the photo shown in FIG. 35. According to one embodiment of the present invention, the controller 180 analyzes outline figures of the three bears.

Referring to FIG. 37 (*b*), if the controller 180 receives a touch drag input matching the outline figure of the middle bear, the controller 180 can automatically output an outline figure 3701 for the middle bear. If the output outline figure 3701 coincides with a region on which a user intends to perform a copy operation, the user can give a command 3702 to perform the copy operation on the corresponding outline figure 3701. As an example of the command 3702, there may be a press input performed by touching a prescribed point on the outline figure 3701 and then maintaining the touch over a prescribed duration.

If the command 3702 is applied to the outline figure 3701, the controller 180 saves a capture screen of an image or screen currently output within the outline figure 3701 and can output a guidance 3502 that indicates that the copy operation has been performed. So far, one example of an input for performing a copy operation according to one embodiment of the present invention has been described. In the following description, examples of a paste operation according to one embodiment of the present invention shall be explained with reference to the accompanying drawings.

Using Touch Path—Paste Operation (first Embodiment)

Figure 38:
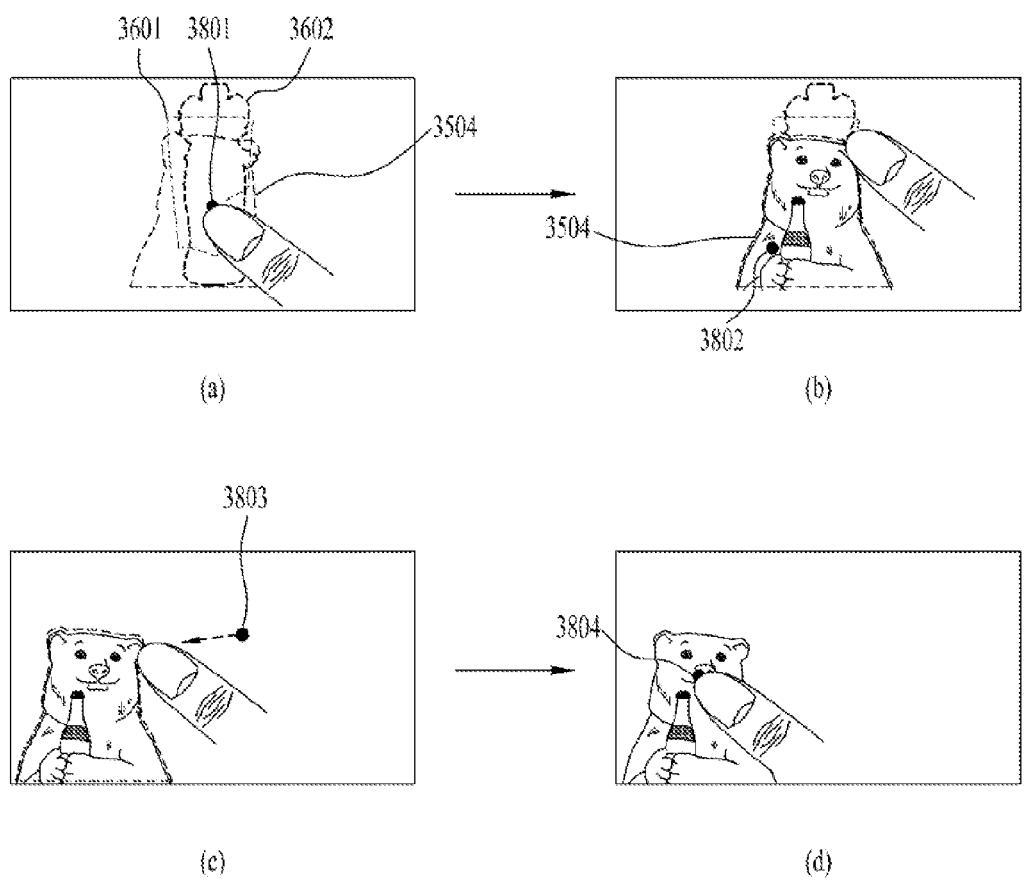
FIG. 38 is a diagram to describe a paste operation according to a first embodiment of the present invention.

FIG. 38 is a diagram to describe a paste operation according to a first embodiment of the present invention. In particular, FIG. 38 shows a state that a paste mode is entered according to one embodiment of the present invention. As an example of an input for entering a paste mode, there may be a press input to a prescribed point on an editing screen.

Referring to FIG. 38 (*a*), if a paste mode is entered, the controller 180 can output outline figures 3504, 3601 and 3602 of an image (capture screen) saved in the memory 160. The examples of the output outline figures 3504, 3601 and 3602 correspond to the outline figures of the saved capture screen shown in FIG. 35 or FIG. 36.

Referring to FIG. 38 (*b*), if the controller 180 receives an input (e.g., an input of touching an outline figure to select, etc.) of selecting a prescribed one of the output outline figures 3504, 3601 and 3602, the controller 180 can output an preview 3802 of an image corresponding to the selected outline figure 3504.

A user shifts the selected outline figure 3504 to a paste-intended location and can then perform a paste operation. In particular, the controller 180 changes the location of the selected outline figure 3504 and the location of the preview 3802 in response to a reception of the shift command 3803 for the selected outline figure 3504 and the preview 3802 (FIG. 38 (*c*)). In this instance, as an example of the location shift command 3803, there may be a touch drag input for shifting the selected outline figure 3504 to a desired location or position. Finally, if the controller receives a paste input 3804, the controller 180 can perform a paste operation of pasting an image corresponding to the preview 3802 on the corresponding location.

Using Touch Path—Paste Operation (second Embodiment)

FIG. 39 is a diagram to describe a paste operation according to a second embodiment of the present invention. According to a second embodiment, a user's touch path is recognized in paste mode. In addition, a paste operation is performed on an image having an outline figure identical/similar to the touch path. First of all, like FIG. 5, assume that a first image 3503 is saved in the memory 160 or a clipboard. In addition, assume that the state diagrams shown in FIG. 39 correspond to the state diagrams in paste mode.

Referring to FIG. 39, if the controller 180 receives a first touch path 3901 in response to a touch drag input from a user, the controller 180 searches an image having an outline figure corresponding to the first touch path 3901. In particular, referring to FIG. 39 (*a*), the first touch path 3901 has a figure corresponding to the outline figure of the first image 3503 described with reference to FIG. 35. Hence, the controller 180 searches for the first image 3503 and then pastes the found first image 3503 on the screen (FIG. 39 (*b*)).

Moreover, according to the second embodiment of the present invention, if a size of the figure formed by the touch path input by the user is large, the controller 180 enlarges and then pastes the corresponding image. If a size of the figure formed by the touch path input by the user is small, the controller 180 reduces and then pastes the corresponding image. In particular, the controller 180 can paste the corresponding image by adjusting the size of the corresponding image in proportion to the size of the touch path figure.

Referring to FIG. 39 (*c*), a figure of an input second touch path 3902 is identical to that of the first touch path 3901 but a size of the second touch path 3902 is smaller than that of the first touch path 3901. In particular, the controller 180 determines a size of a figure formed by the second touch path 3902 and can then paste the first image 3503 in proportion to the determined size. Hence, a size of the pasted first image 3503 shown in FIG. 39 (*d*) may be smaller than that of the pasted first image 3503 shown in FIG. 39 (*b*).

Moreover, according to the second embodiment of the present invention, the controller 180 recognizes a touch path until removing the touch for the touch drag input by real time and is proposed to output/filter a search result depending on a variation of the real-time recognized touch path.

Figure 40:
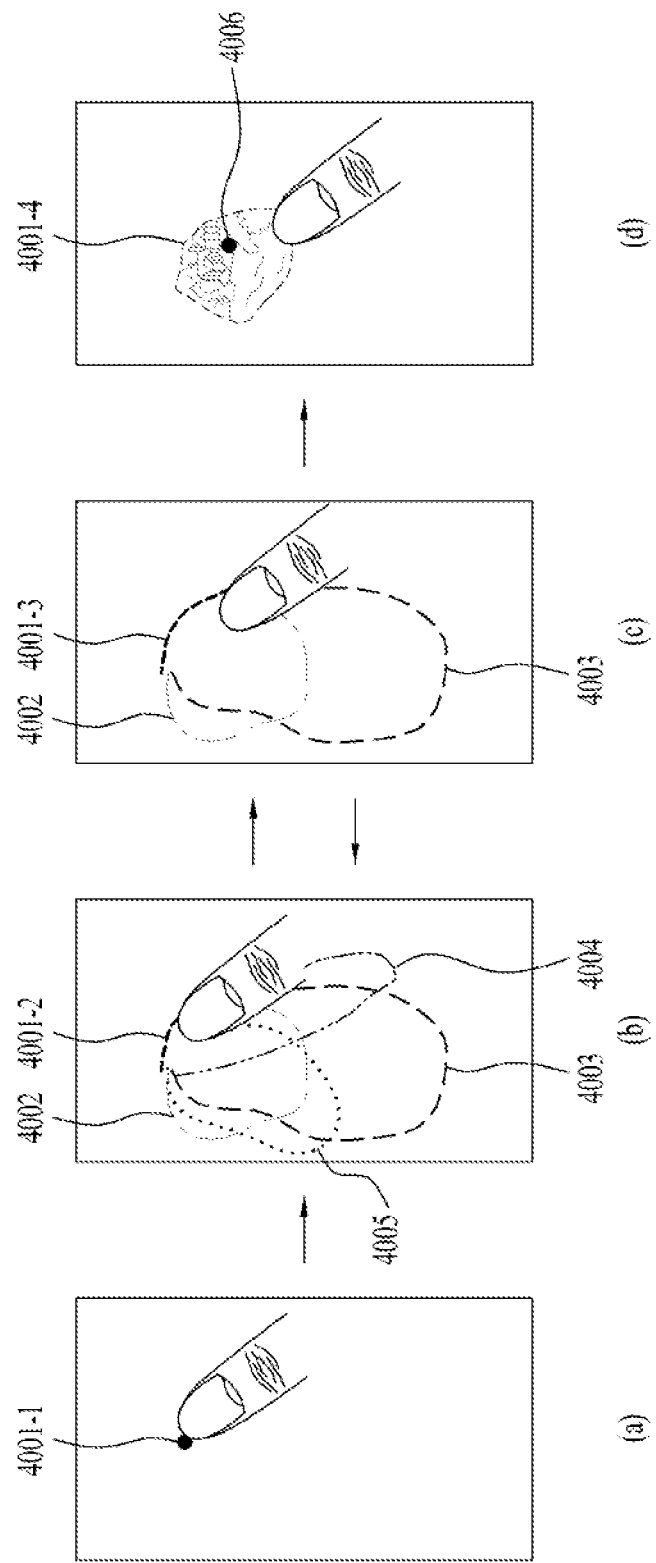
FIG. 40 is a diagram illustrating one example of an output and filtering of a search result in response to a real-time input of a touch path according to a second embodiment of the present invention.

FIG. 40 is a diagram illustrating one example of an output and filtering of a search result in response to a real-time input of a touch path according to a second embodiment of the present invention. In FIGS. 40 (*a*) to 40 (*d*), real-time varying states of a touch drag input (4001-1 to 4001-4) are indicated by reference numbers 4001-1 to 4001-4, respectively.

Referring to FIG. 40 (*a*), a state diagram of a paste mode is output. In addition, a touch for applying a touch drag input is initiated. If a state of an input touch path is changed into the state 4001-2 shown in FIG. 40 (*b*) by a user's touch drag action, the controller 180 searches for an image corresponding to the touch path in the state 4001-2 by real time. In particular, the controller 180 can search the images saved in the memory 160 (or clipboard) for the image having a portion of its outline figure that matches the touch path in the state 4001-2.

Since the input of the touch path is not completed yet, there may exist a plurality of images, each of which has a portion of its outline figure matching the touch path in the state 4001-2. The controller 180 can display a plurality of outline figures 4002 to 4005 for a plurality of the found images on the touchscreen. In this instance, a plurality of the outline figures 4002 to 4005 may include candidate items for an image a user intends to input.

The output candidate items can play roles as guide lines for a user to perform a touch drag input. As the user continues the touch drag input, the state of the touch path may be changed into the state 4001-3 (FIG. 40 (*c*)). As the touch path keeps being input, candidate items mismatching the outline figure can be filtered off. In particular, referring to FIG. 40 (*c*), the outline figure 4002 and the outline figure 4003 are output only but the rest of the outline figures may not be output by being filtered off.

FIG. 40 (*d*) shows a touch drag input completed state. In this instance, the touch path in the state 4001-4 is established. The rest of the outline figures except one are filtered off by the touch path in the state 4001-4. In this state, a user selects the corresponding outline figure (e.g., applying a press input to the corresponding outline figure) and can then perform a paste operation on the second image 4006 corresponding to the selected outline figure.

Using Touch Path—Paste Operation (second Embodiment)

Figure 41:
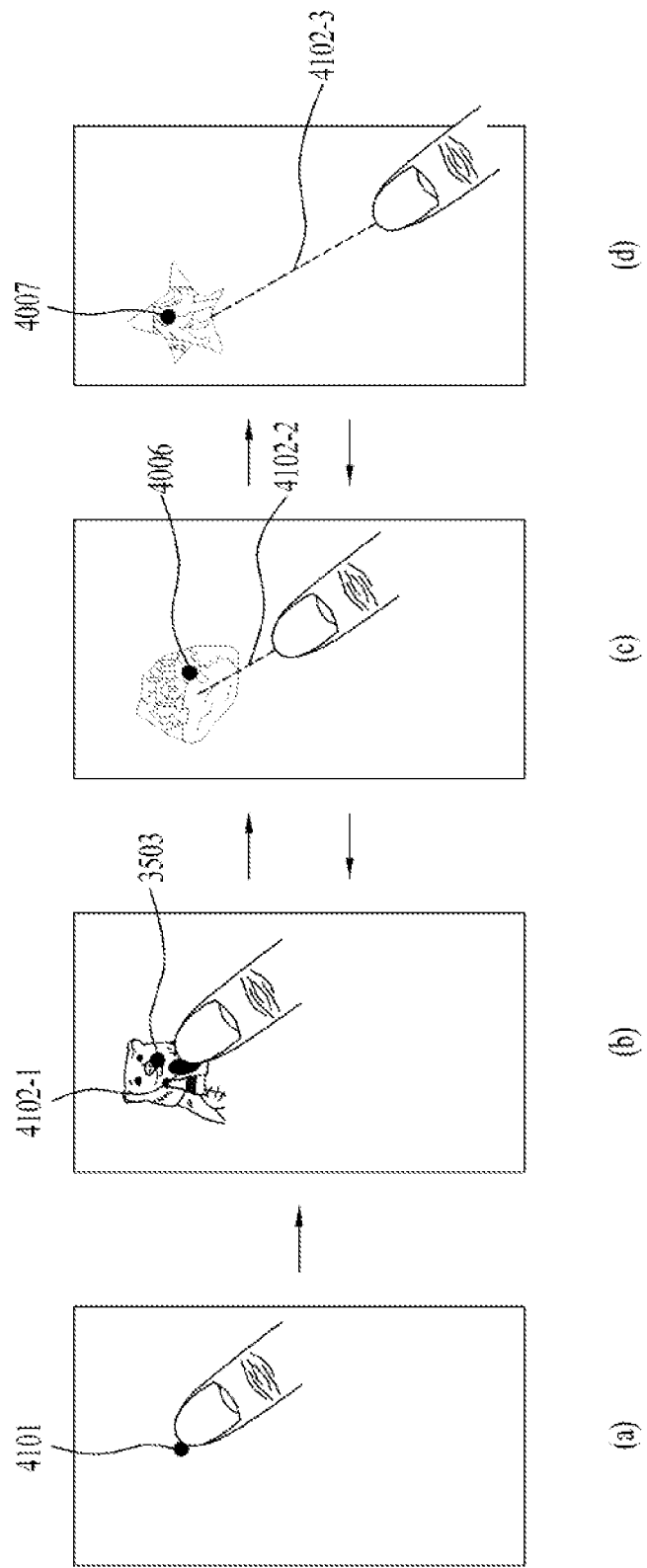
FIG. 41 is a diagram illustrating one example of a paste operation according to a third embodiment of the present invention.

FIG. 41 is a diagram illustrating one example of a paste operation according to a third embodiment of the present invention. According to a third embodiment of the present invention, a length change of a touch path of a touch drag input is detected. In addition, an image on which a paste operation will be performed is selected to correspond to the length.

FIG. 41 (*a*) shows one example of entering a paste mode in an editing screen. If the controller 180 receives a command 4101 for entering a paste mode in an editing screen, the controller 180 enters the paste mode. FIG. 41 (*b*) is a state diagram that a past mode is entered. If the paste mode is entered (a touch input is maintained, 4102-1), the controller 180 can output an image (e.g., a first image 3503 in the drawing) on which a copy operation has been performed most recently.

If a plurality of images are saved in the memory 160 (or a clipboard), one of a plurality of the images may correspond to an image on which a user intends to perform a paste operation. Hence, according to a third embodiment of the present invention, provided is an environment in which an image for performing a paste operation thereon can be selected in response to a length change of a touch path.

In particular, referring to FIG. 41 (*c*), if the controller 180 receives a touch drag input amounting to a length 4102-2, the controller 180 can output a second one (assumed as a second image 4006) of the recently copied images. Subsequently, referring to FIG. 41 (*d*), while the touch is maintained, if the controller 180 receives a touch drag input amounting to a length 4102-3, the controller 180 can output a third one (assumed as a third image 4007) of the recently copied images.

Meanwhile, while the touch drag input amounting to the length 4102-3 is received, if the controller 180 receives a drag input performed by being traced back along the touch path, the controller 180 can return to the state shown in FIG. 41 (*c*) or FIG. 41 (*b*).

Moreover, according to a third embodiment of the present invention, the controller 180 can differentiate an interval, in which a photo is changed and output, depending on a speed of a touch drag. For instance, if a touch drag speed is slow, an output image can be changed by 0.5 cm. If the touch drag speed is high, an output image can be changed by 0.2 cm.

As the output image is changed, if a user-desired image is output, a user selects the corresponding image and can then perform a paste operation thereon. Thus, as an example of an input for the selection, there may be an input of removing a currently maintained touch input. Hence, referring to FIG. 41 (*c*), after a touch drag input amounting to a length 4102-2 has been input, if the touch is removed, the controller 180 performs a paste operation on the second image 4006. Likewise, referring to FIG. 41 (*d*), after a touch drag input amounting to a length 4102-3 has been input, if the touch is removed, the controller 180 performs a paste operation on the third image 4007.

After the paste operation has been performed, the user can perform a paste operation by modifying a location or position of an image through a touch drag input for the pasted image. On the other hand, a paste operation according to a third embodiment of the present invention can differentiate an image output form. Thus, one example shall be described with reference to FIG. 42 as follows.

Figure 42:
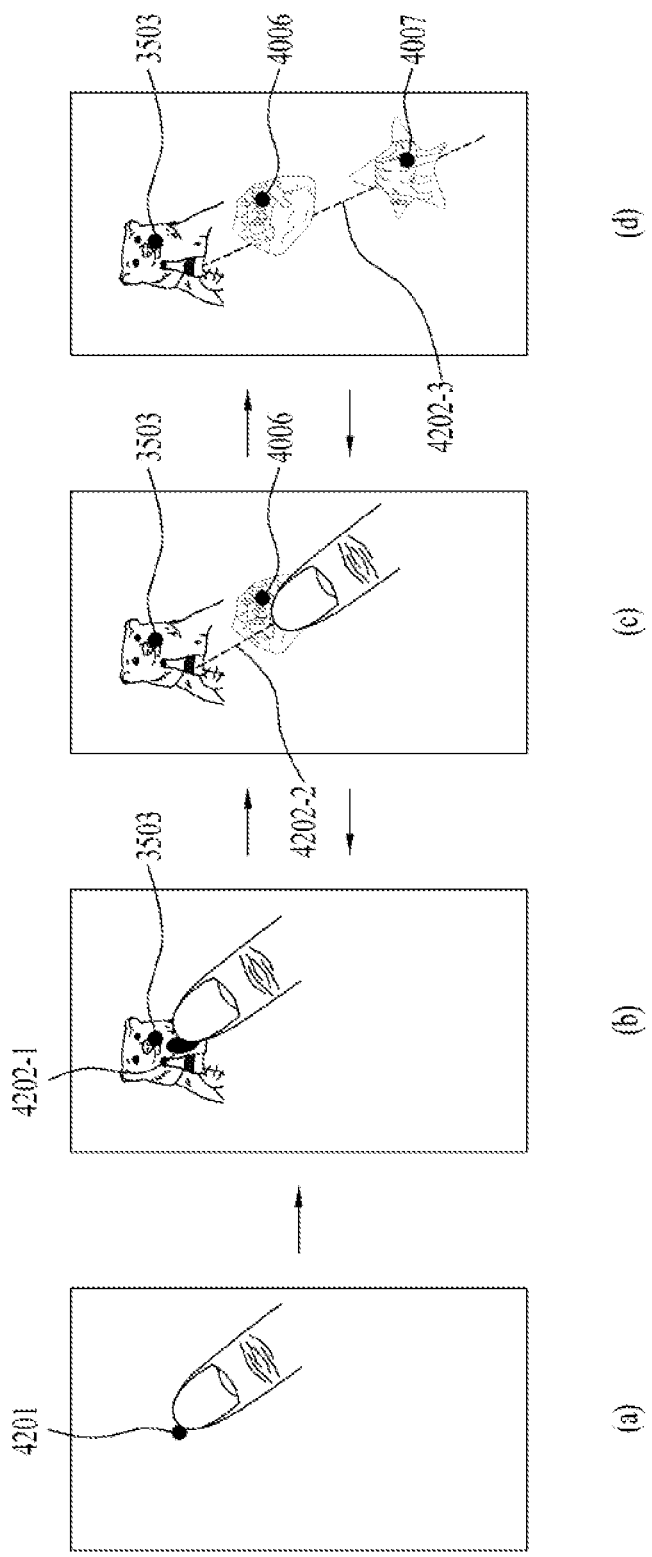
FIG. 42 is a diagram illustrating another example of a paste operation according to a third embodiment of the present invention.

FIG. 42 is a diagram illustrating another example of a paste operation according to a third embodiment of the present invention. FIG. 42 (*a*) shows another example of entering a paste mode in an editing screen. If the controller 180 receives a command 4201 for entering a paste mode in an editing screen, the controller 180 enters the paste mode.

FIG. 42 (b) is a state diagram that a past mode is entered. If the paste mode is entered, the controller 180 can output an image (e.g., a first image 3503 in the drawing) on which a copy operation has been performed most recently. In particular, referring to FIG. 42 (c), while the touch is maintained, if the controller 180 receives a touch drag input amounting to a length 4202-2, the controller 180 can further output a second one (assumed as a second image 4006) of the recently copied images. FIG. 42 differs from FIG. 41 in further outputting a new image instead of changing and outputting a previously output image.

Subsequently, referring to FIG. 42 (d), while the touch is maintained, if the controller 180 receives a touch drag input amounting to a length 4202-3, the controller 180 can further output a third one (assumed as a third image 4007) of the recently copied images. Meanwhile, while the touch drag input amounting to the length 4202-3 is received, if the controller 180 receives a drag input performed by being traced back along the touch path, the controller 180 can return to the state shown in FIG. 42 (c) or FIG. 42 (b).

Like FIG. 41, according to a third embodiment of the present invention, the controller 180 can differentiate an interval, in which a photo is changed and output, depending on a speed of a touch drag. For instance, if a touch drag speed is slow, an output image can be changed by 0.5 cm. If the touch drag speed is high, an output image can be changed by 0.2 cm.

As the output image is changed, if a user-desired image is output, a user selects the corresponding image and can then perform a paste operation thereon. Thus, as an example of an input for the selection, there may be an input of removing a currently maintained touch input. Hence, referring to FIG. 42 (c), after a touch drag input amounting to a length 4202-2 has been input, if the touch is removed, the controller 180 performs a paste operation on the second image 4006. Likewise, referring to FIG. 42 (d), after a touch drag input amounting to a length 4202-3 has been input, if the touch is removed, the controller 180 performs a paste operation on the third image 4007.

Using Touch Path—Application of Paste Operation

One example of a paste operation according to a second embodiment of the present invention is described as follows.

Figure 43:
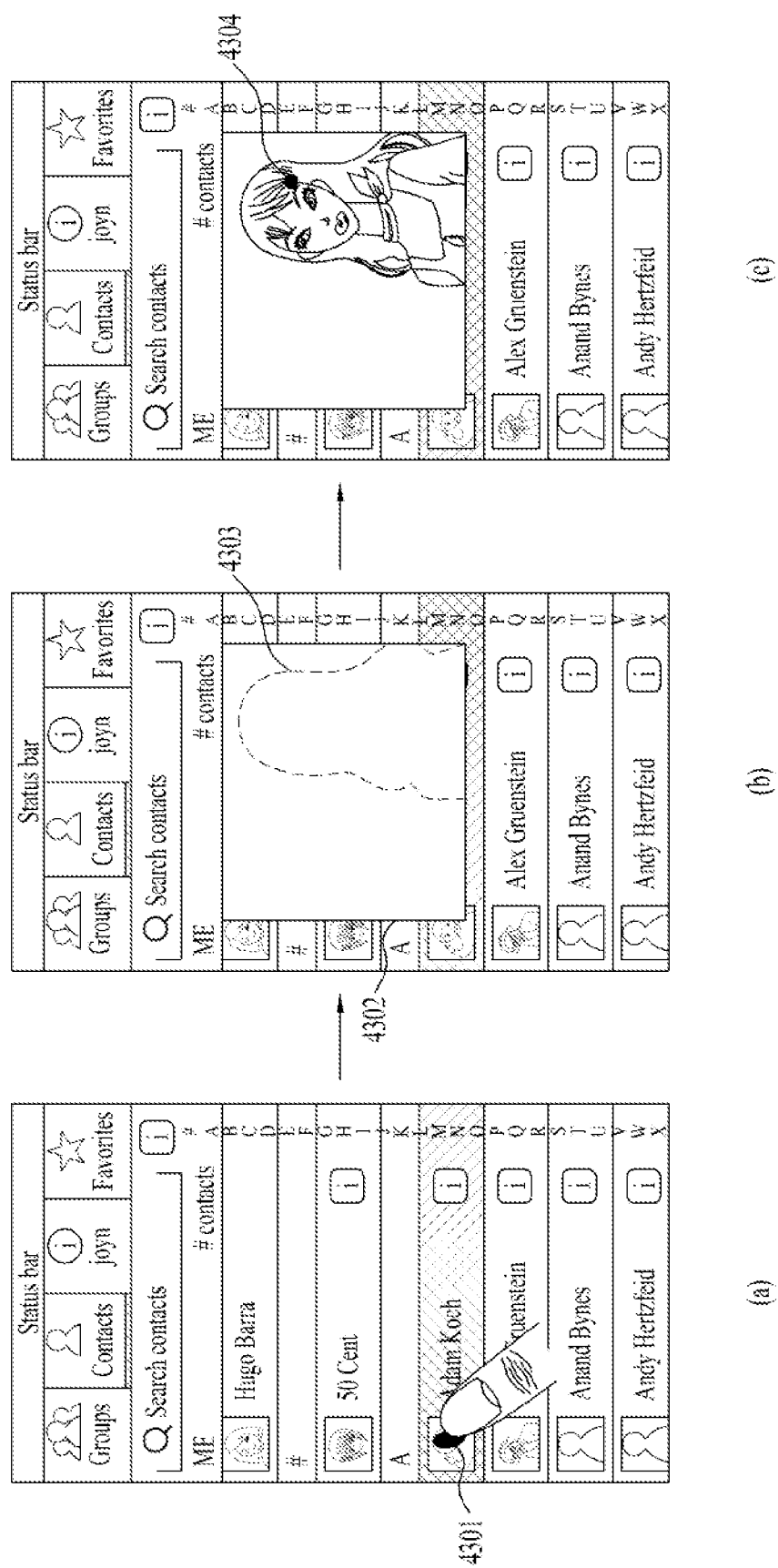
FIG. 43 is a diagram illustrating one example of a paste operation according to a second embodiment of the present invention.

FIG. 43 is a diagram illustrating one example of a paste operation according to a second embodiment of the present invention. FIG. 43 is a state diagram of an active screen of a contact application. Referring to FIG. 43 (a), a contact list saved in the mobile terminal 100 is displayed. A user selects a prescribed contact from the contact list and may then intend to register an image for the selected contact. If the controller 180 receives an input 4301 of selecting one of image screens output from the contact list, the controller 180 can output a touch reception popup window 4302 for receiving a touch drag input in response to the corresponding input 4301.

In this instance, the touch reception popup window 4302 is the popup window configured to receive an input of a touch path from a user and to search for an image based on the input touch path. In particular, if the controller 180 receives a touch path input 4303 through the touch reception popup window 4302, the controller 180 searches for an image 4304 by the searching method described with reference to FIG. 9 and can then output the found image 4304 (FIG. 43 (c)).

Thereafter, the controller 180 can save the found image 4304 as the image of the selected contact. So far, the copy & paste operation for an image has been described. Moreover, one embodiment of the present invention is applicable to a copy & paste operation for text data.

Copy & Paste Operation for Text Data

Figure 44:
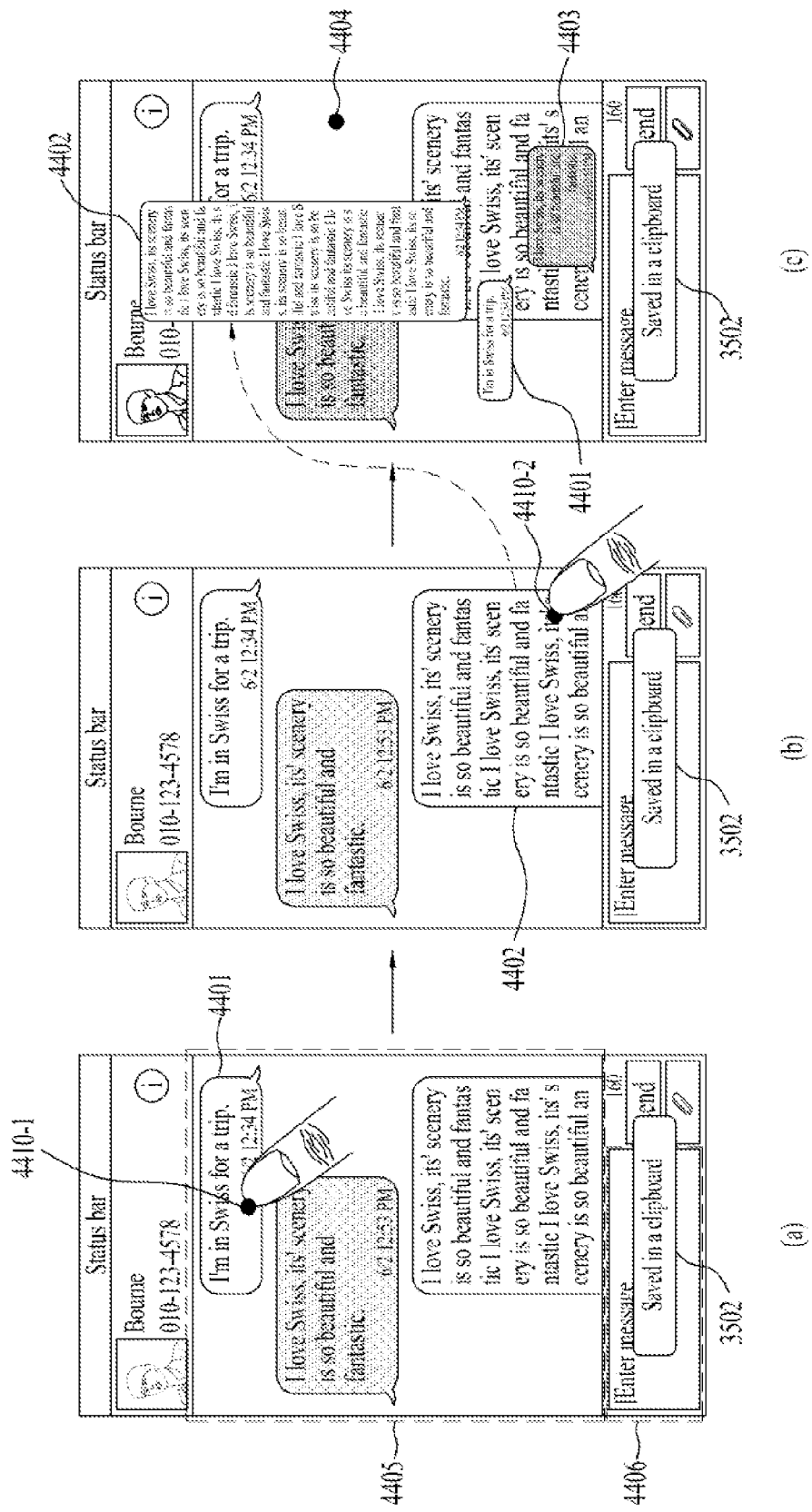
FIG. 44 is a diagram to describe an operation of copying text data according to one embodiment of the present invention.

FIG. 44 is a diagram to describe an operation of copying text data according to one embodiment of the present invention. FIG. 44 (a) shows a state diagram of a message transceiving application. The state diagram of the message application is similar to that of a general message application. Details of parts unnecessary for the description of embodiments of the present invention shall be omitted from the following description.

Referring to FIG. 44 (a), a message application can be mainly divided into two regions including a first region 4405 and a second region 4406. The first region s405 is the region for outputting a message transceived history. In the first region 4405, messages are output from a bottom end in order of recent message transceiving. In particular, in the drawing, a text data 4401 corresponds to a most recently transceived message.

The second region 4406 is an input window for inputting a message. In addition, a paste operation, which will be described later, can be performed on the second region 4406. A copy & paste operation described with reference to FIG. 44 is explained by taking a state diagram of a message application as one example and may be identically applicable to various applications capable of inputting and outputting text data.

Referring to FIG. 44 (a), if the controller 180 receives a copy command 410-1 for copying a first text data 4401, the controller 180 can save the first text data 4401 in the clipboard. In addition, the controller 180 can output a guidance text 3502 indicating that the first text data 4401 has been saved in the clipboard. Once the controller 180 saves the first text data 4401 in the clipboard, the controller 180 outputs to provide a clipboard layer 4404 to enable a user to check the text data saved in the clipboard (FIG. 44 (c)).

Meanwhile, according to one embodiment of the present invention, in saving text data, proposed is to save a word balloon form of the corresponding text data as well. If so, when a user performs a paste operation, the user can identify a prescribed text data owing to a size of shape of the word balloon form. Hence, text data output to the clipboard layer 4404 can be output together with the corresponding word balloon forms instead of being simply output as texts.

Referring to FIG. 44 (b), if the controller 180 receives a copy command 4410-2 for copying a second text data 4402, the controller 180 can save the second text data 4402 in the clipboard. In addition, the controller 180 can output a guidance text 3502 indicating that the second text data 4402 has been saved in the clipboard. Once the controller 180 saves the second text data 4402 in the clipboard, the controller 180 outputs to provide a clipboard layer 4404 to enable a user to check the text data saved in the clipboard (FIG. 44 (c)). On the other hand, if a content or substance of the text data saved in the clipboard is long, the content or substance of the text data can be displayed on the clipboard by being reduced (or in a manner that a letter font size is decreased) in order to be displayed on a single screen.

In the state diagram shown in FIG. 44 (c), the clipboard layer 404 is output by displaying the text data saved so far. Assume that the first to third text data 4401 to 4403 saved in the clipboard are output to the clipboard layer 4404. In addition, the controller 180 can control the clipboard layer 4404 to be output semi-transparently.

Examples of performing a paste operation on the copied data shown in FIG. 44 are described with reference to FIG. 45 as follows.

Figure 45:
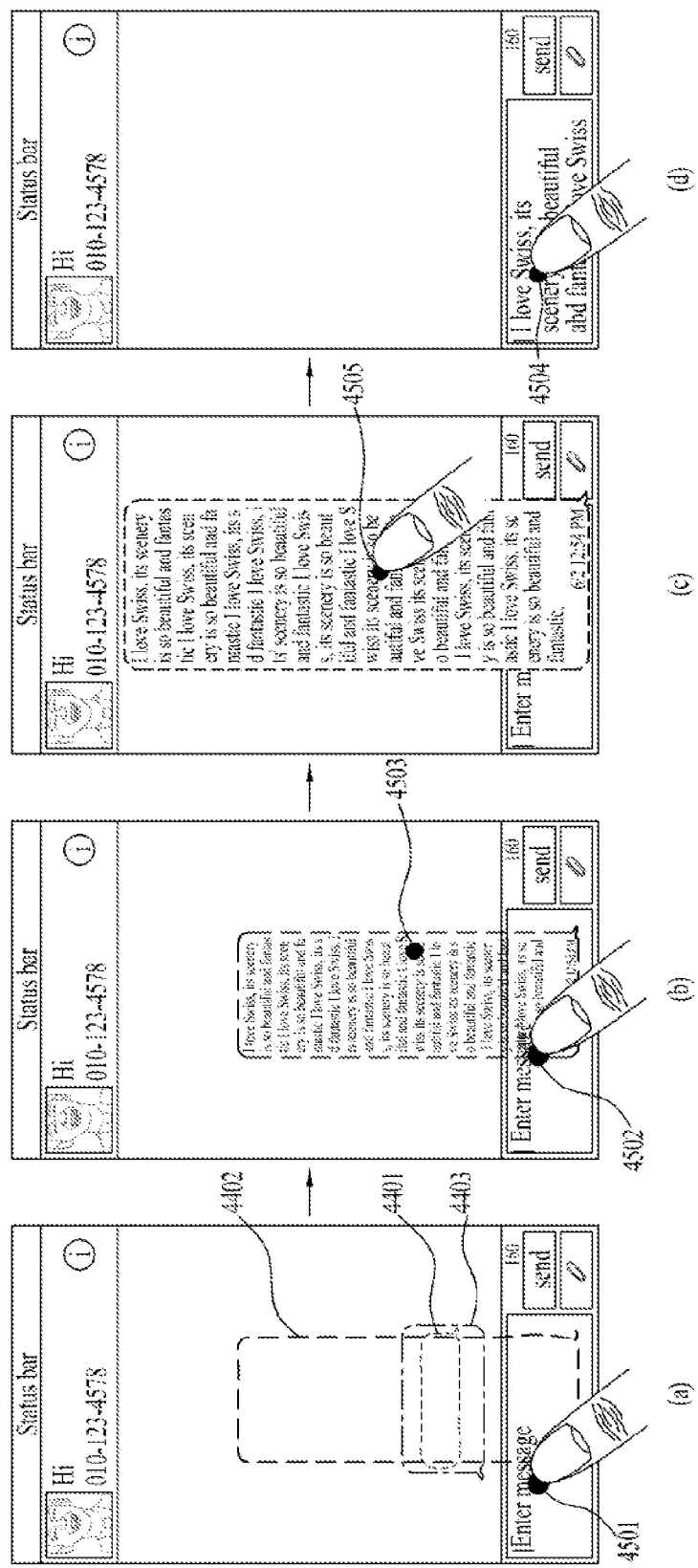
FIG. 45 is a diagram illustrating examples of performing a paste operation on the copied data shown in FIG. 44.

FIG. 45 is a diagram illustrating examples of performing a paste operation on the copied data shown in FIG. 44. FIG. 45 (a) shows a state diagram of a message application. Referring to FIG. 45 (a), the controller 180 receives a paste command 4501 for pasting on the second region 4406. As one example of the paste command 4501, there may be a touch & press input to the second region 4406.

If the controller 180 receives the paste command 4501, the controller 180 can output a plurality of word balloon forms corresponding to a plurality of text data saved in the clipboard, respectively. Thus, the output word balloon forms can have various sizes and shapes depending on the copied text data.

A user selects a prescribed word balloon form from a plurality of the output word balloon forms and can then perform a paste operation for the text data corresponding to the selected word balloon form. In particular, if the controller 180 receives an input 4502 of selecting a prescribed one of a plurality of the word balloon forms, the controller 180 can output a preview screen 4503 of the corresponding text data.

While the preview screen 4503 is output, if the controller 180 receives an input 4505 of enlarging the preview screen 4503, the controller 180 can enlarge and output the text data (FIG. 45 (c)). As one example of the enlarging input 4505, there may be a press input to the preview screen. If the controller 180 receives a paste command 4504 for pasting the selected text data, the controller 180 can perform a paste operation of pasting the selected text data on the second region 4406.

Discrimination between Text Pasting and Image Pasting

As mentioned in the foregoing description, the text data pasting and the image data pasting may differ from each other in operation. Therefore, according to one embodiment of the present invention, proposed is to determine whether to perform a text pasting or an image pasting prior to performing a paste operation.

Figure 46:
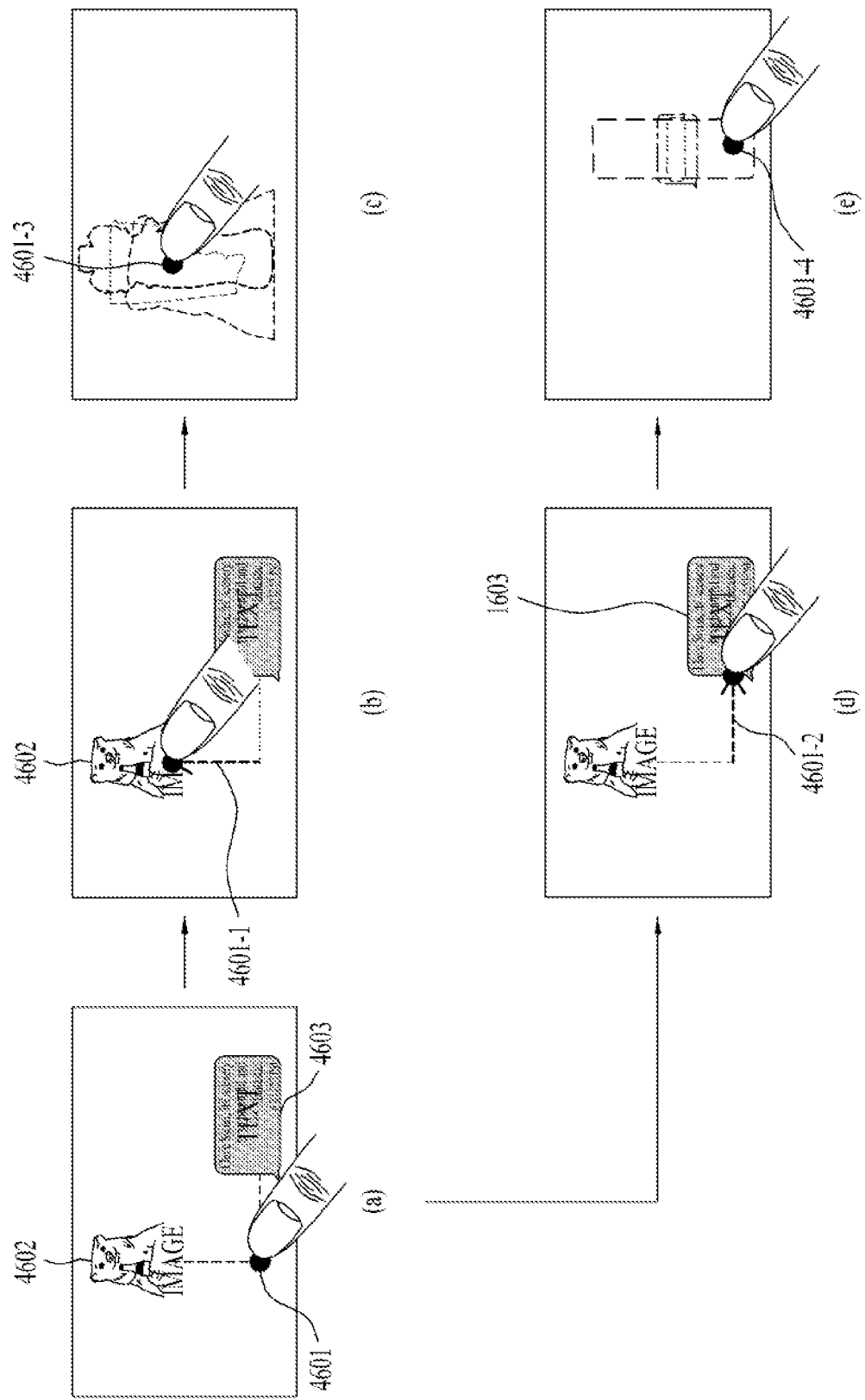
FIG. 46 is a diagram illustrating one example of a method of discriminating a paste operation for a text data and a paste operation for an image data according to one embodiment of the present invention.

FIG. 46 is a diagram illustrating one example of a method of discriminating a paste operation for a text data and a paste operation for an image data according to one embodiment of the present invention. FIG. 46 (a) is a state diagram of a pasting mode. If the controller 180 receives a paste command 4601, the controller 180 can output an image icon 4602 and a text icon 4603. A user can select one of the two icons 4602 and 4603 and can then perform a paste operation appropriate for the selected icon.

FIG. 46 (b) and FIG. 46 (c) show one example of when the image icon 4602 is selected. In this instance, the input for selecting the image icon 4602 may include an input of performing a touch drag 4601-1 toward the image icon 4602. If the image icon 4602 is selected, the controller 180 outputs outline figures of images saved in the clipboard so that a user can select one of the output outline figures. Since this process is identical to the former operation described with reference to FIG. 38, its details shall be omitted from the following description.

FIG. 46 (d) and FIG. 46 (e) show one example of when the text icon 4603 is selected. In this instance, the input for selecting the text icon 4603 may include an input of performing a touch drag 4601-2 toward the text icon 4603. If the text icon 4603 is selected, the controller 180 outputs word balloon figures of texts saved in the clipboard so that a user can select one of the word balloon figures. Since this process is identical to the former operation described with reference to FIG. 45, its details shall be omitted from the following description.

Paste Operation through Gesture—Emoticon or Sticker

So far, a paste operation for pasting image or text data saved in the memory 160 (or clipboard) has been described. According to one embodiment of the present invention, proposed is an extensible method applicable to a case of an emoticon (or a sort of sticker) saved in the memory 160. Although an emoticon or sticker may be provided by the mobile terminal 100 itself in the embodiment shown in FIG. 47, it may include an emoticon or sticker provided by a third party application.

Figure 47:
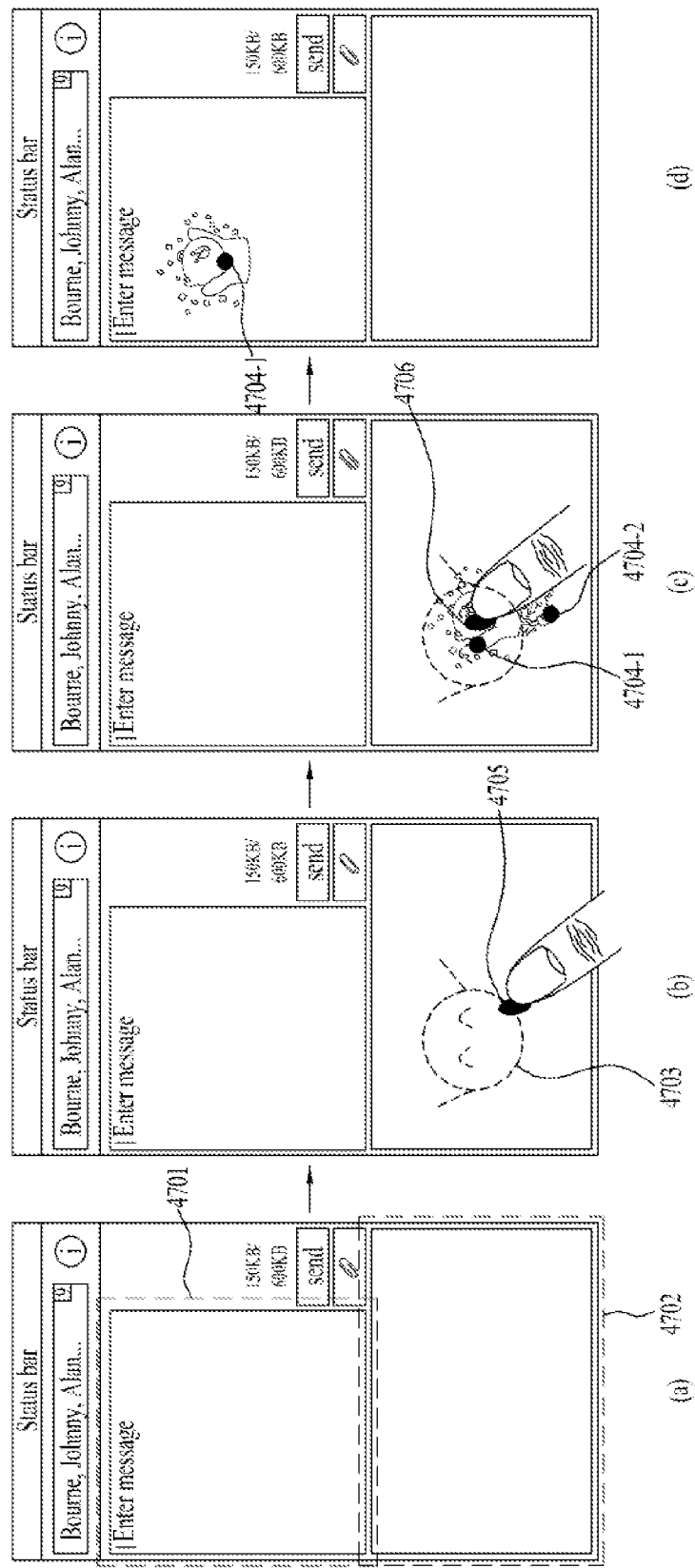
FIG. 47 is a diagram illustrating one extensible example of applying a copy & paste operation to a content previously saved in a memory 160 according to one embodiment of the present invention.

FIG. 47 is a diagram illustrating one extensible example of applying a copy & paste operation to a content previously saved in a memory 160 according to one embodiment of the present invention. FIG. 47 (a) is a state diagram of a message transceiving application. In this instance, the message transceiving application may include an application of the mobile terminal 100 or an application of a third party application.

The message transceiving application can provide a state diagram a little bit different from that of the former description. The message transceiving application can output an input window for inputting a message to a third region 4701. In addition, the message transceiving application can output a touch input window for inputting a touch gesture to a fourth region 4702.

Referring to FIG. 47 (b), a user can search for a desired emotion or sticker by inputting a gesture having a configuration similar to that of the desired emoticon or sticker. If the controller 180 receives a command 4705 for searching using a gesture input to the fourth region 4702, the controller 180 searches for emoticons 4704-1 and 4704-2, each of which has a configuration (or emotion) similar to that of the input gesture, and can then output the found emotions 4704-1 and 4704-2 (FIG. 47 (c)). If the controller 180 receives an input 4706 of selecting one of the found emotions 4704-1 and 4704-2, the controller 180 can paste the selected emoticon 4704-1 on the message input window 4701 of the third region 4701 (FIG. 47 (d)).

Meanwhile, according to one embodiment of the present invention, in performing a paste operation of pasting an emoticon or sticker, the controller 180 can provide an emoticon indicating an outline figure of an image or a similar emotion even if an input of a gesture is not perfectly identical.

Paste Operation through Gesture—Text Data

According to one embodiment of the present invention, proposed is to paste text data through an input of a gesture.

Figure 48:
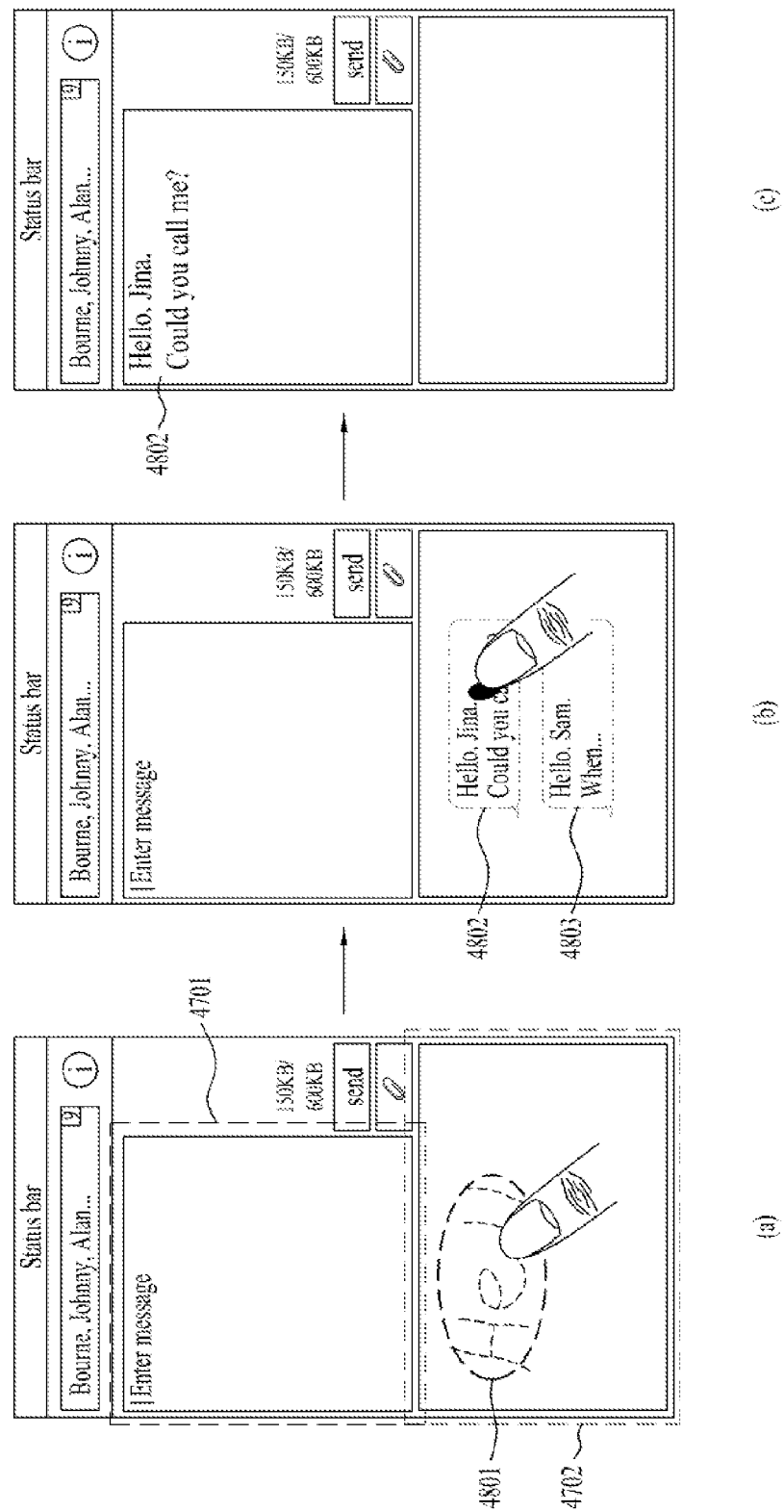
FIG. 48 is a diagram illustrating one example of a copy & paste operation for a text data according to one embodiment of the present invention.

FIG. 48 is a diagram illustrating one example of a copy & paste operation for a text data according to one embodiment of the present invention. FIG. 48 (a) is a state diagram of a message transceiving application. In this instance, the message transceiving application may include an application of the mobile terminal 100 or an application of a third party application.

Like FIG. 47, the message transceiving application can output an input window for inputting a message to a third region 4701. In addition, the message transceiving application can output a touch input window for inputting a touch gesture to a fourth region 4702.

According to one embodiment of the present invention, it is proposed to recognize a text of a touch gesture input through the touch input window. In addition, it is also proposed to search a plurality of text data saved in a clipboard for a text data including the recognized text.

Referring to FIG. 48 (a), a touch gesture input to the fourth region 4702 is a handwriting 'Hello'. The controller 180 recognizes the handwriting as a text, searches a plurality of text data saved in the clipboard for text data 4802 and 4803 including the recognized text, and can then output the found text data 4802 and 4803.

Meanwhile, in determining a timing point of completing an input for a touch gesture, the controller 180 can determine the corresponding timing point as one of a timing point of receiving a gesture complete input and a timing point at the expiration of a prescribed time from a timing point of receiving a last gesture input. In particular, since it may be unclear to specify a timing point of completion of the input of the gesture may, the reference is determined in order to clarify the complete timing point of the input. Therefore, once the input of the touch gesture is complete, the controller 180 recognizes a text with reference to the input completed touch gesture and can then perform the search operation based on the recognized text.

Referring to FIG. 48 (b), if the controller 180 receives an input of selecting one of a plurality of the found text data 4802 and 4803, the controller 180 can perform a paste operation of pasting the selected text data on the message input window 4701 (i.e., the third region) (FIG. 48 (c)).

Meanwhile, the emoticon input through the gesture shown in FIG. 47 and the text data input through the gesture shown in FIG. 48 may contend with each other in their operations. Hence, according to one embodiment of the present invention, in order to discriminate the two operations from each other, an emoticon input mode and a text input mode are discriminated from each other. The operation shown in FIG. 47 is performed in the emoticon input mode, whereas the operation shown in FIG. 48 is performed in the text input mode.

Discrimination Between Paste Operation and Copy Operation

Figure 49:
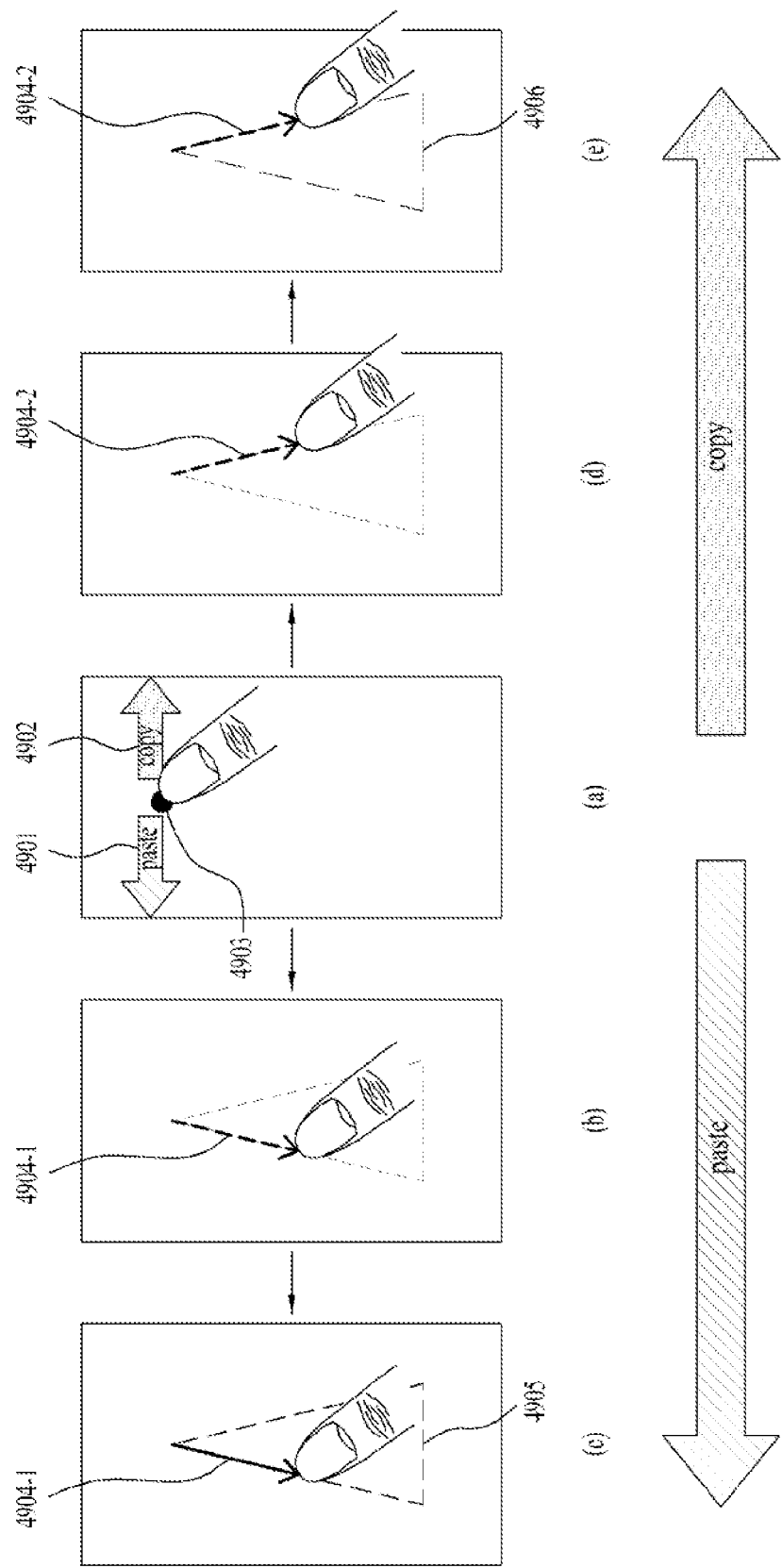
FIG. 49 is a diagram illustrating a first example of discriminating a paste operation and a copy operation according to one embodiment of the present invention.

According to the above-described embodiments, a paste operation is performed in paste mode and a copy operation is performed in copy mode. In the following description, without the discrimination between the paste mode and the copy mode, a method of discriminating the two operations from each other depending a selection of a gesture or action is explained, FIG. 49 is a diagram illustrating a first example of discriminating a paste operation and a copy operation according to one embodiment of the present invention. Referring to FIG. 49 (a), a state diagram of an image editing mode is output. In this editing mode, both a paste operation and a copy operation can be performed. If the controller 180 receives an input 4903 of touching a prescribed region in an image editing mode, the controller 180 can output a direction arrow 4901 indicating a direction of the paste operation and a copy direction arrow 4902 indicating a direction of the copy operation. In particular, while the touch input 4903 is maintained, if a drag input starts in a left direction, the copy operation can be performed. If a drag input starts in a right direction, the copy operation can be performed.

FIG. 49 (b) and FIG. 49 (c) show one example of performing the paste operation. Referring to FIG. 49 (b), since a touch drag input 4904-1 starts in the left direction, the controller 180 can perform the paste operation in response to the touch drag input 4904-1. As mentioned in the foregoing description with reference to FIG. 40, a touch path is recognized by real time and an image corresponding to the real-time recognized touch path can be then found and output by real time. Moreover, an operation of outputting an outline figure 4905 of the corresponding image is as good as mentioned in the foregoing description.

FIG. 49 (d) and FIG. 49 (e) show one example of performing the copy operation. Referring to FIG. 49 (d), since a touch drag input 4904-2 starts in the right direction, the controller 180 can perform the copy operation in response to the touch drag input 4904-2. As mentioned in the foregoing description with reference to FIG. 7, if the touch drag input 4904-2 is performed along with an outline figure of a specific object, the controller 180 can automatically designate a closed curve 4906 of the corresponding outline figure.

Meanwhile, since the designation in the left/right direction is just exemplary, it is apparent to those skilled in the art that the designation may be non-limited by a specific direction. In particular, on the contrary to the example shown in FIG. 49, a drag start in a right direction can select a paste operation. In addition, a drag start in a left direction can select a copy operation.

Moreover, according to one embodiment of the present invention, it can select a paste operation or a copy operation depending on a clockwise or counterclockwise formation of a closed curve.

Figure 50:
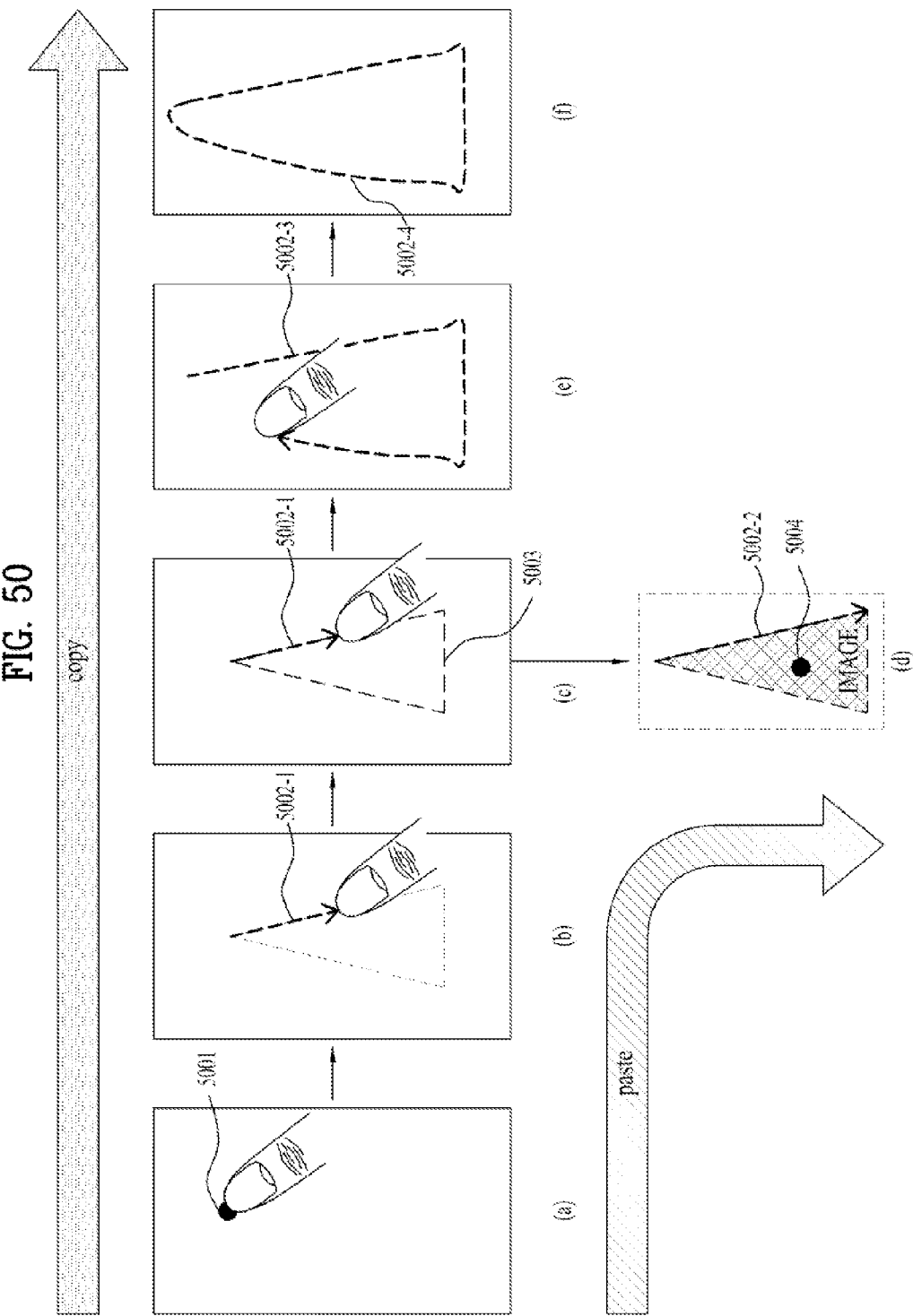
FIG. 50 is a diagram illustrating a second example of discriminating a paste operation and a copy operation according to one embodiment of the present invention.

FIG. 50 is a diagram illustrating a second example of discriminating a paste operation and a copy operation according to one embodiment of the present invention. Referring to FIG. 50, according to the second example, a paste operation is proposed to be performed in the first place. If an image on which a paste operation will be performed is not found, a copy operation is proposed to be performed. Referring to FIG. 50 (a), a touch input 5001 is currently received in image editing mode. If a touch drag input 5002-1 is received in continuation with the touch input 5001, as mentioned in the foregoing description with reference to FIG. 10, the controller 180 recognizes a touch path by real time and can then search for an image corresponding to the real-time recognized touch path by real time.

Subsequently, the controller 180 can output an outline figure 5003 corresponding to the found image (FIG. 50 (c)). Thereafter, if the controller 180 receives an input of selecting the outline figure 5003, the controller 180 can output an image 5004 corresponding to the selected outline figure 5003 (FIG. 50 (d)). Moreover, if the controller 180 receives a paste input (e.g., a press input to the mage) to the output image 5004, the controller 180 can pate the output image 5004 on an editing screen. In particular, in the drawing shown in FIG. 50, if a path proceeds in order of (a)→(b)→ (c)→(d), the controller 180 can perform a paste operation.

On the other hand, if there is no image found by real time, the controller 180 can perform a copy operation. While the outline figure 5003 corresponding to the real-time found image is output, as shown in FIG. 50 (c), the outline figure 5003 may not be further output by being filtered off due to the continuous touch path input. In this instance, the controller 180 can perform a copy operation in response to the corresponding touch path. In particular, in the drawing shown in FIG. 50, if a path proceeds in order of (a)→(b)→ (c)→(e)→(f), the controller 180 can perform the paste operation.

Thus, when a paste operation is performed, a user should input a touch path having the same configuration of an outline figure of an image saved in a clipboard. However, when a copy operation is performed, since a new touch path is input, it may be able to discriminate operations like the second example.

Figure 51:
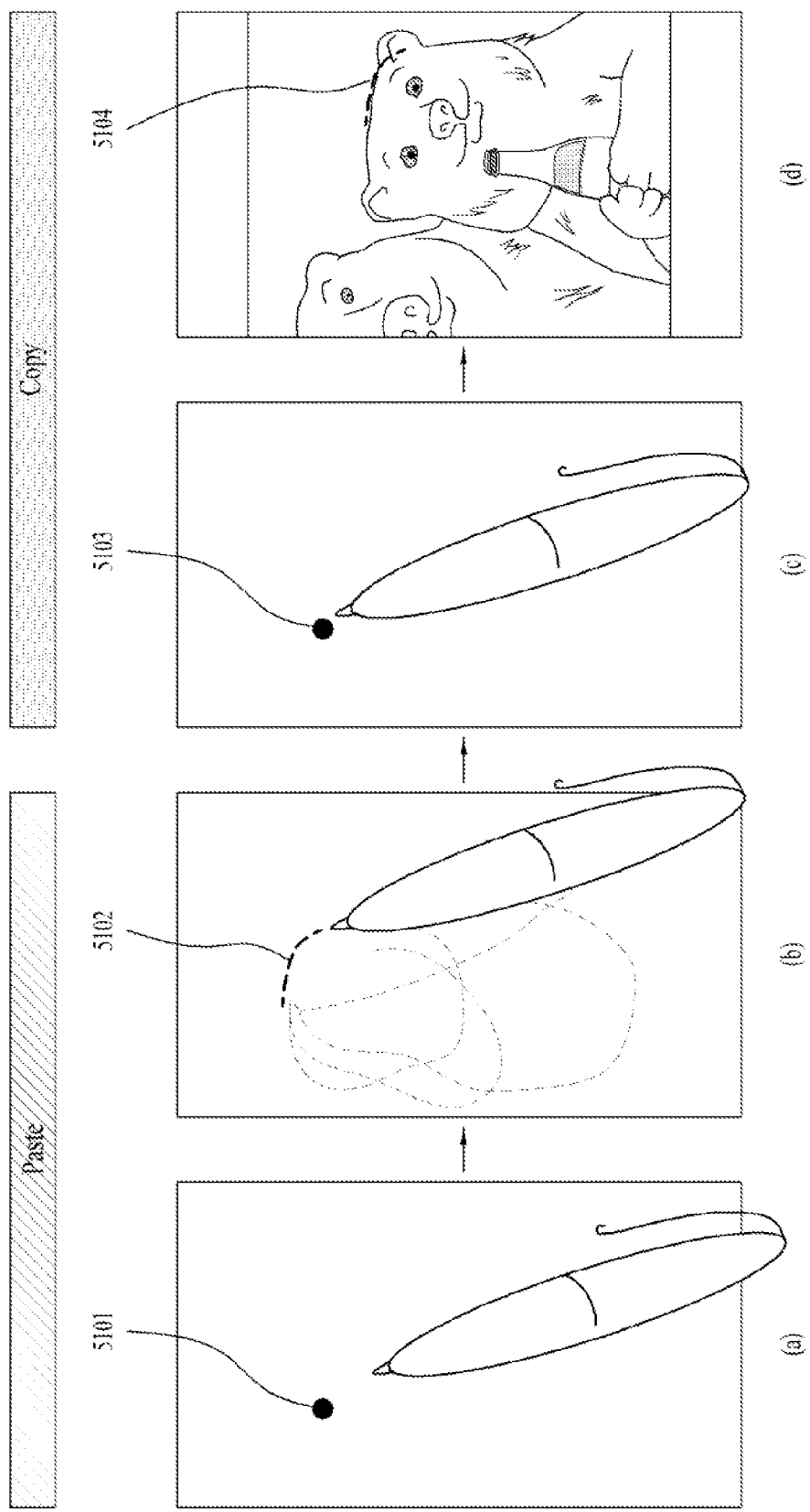
FIG. 51 is a diagram illustrating a third example of discriminating a paste operation and a copy operation according to one embodiment of the present invention.

FIG. 51 is a diagram illustrating a third example of discriminating a paste operation and a copy operation according to one embodiment of the present invention. According to the third example shown in FIG. 51, a pressure of a touch input is proposed to be further determined. In addition, a copy operation and a paste operation are discriminated from each other with the determined pressure.

FIG. 51 (a) shows a state of receiving a touch input 5101 at a high pressure. In this instance, the controller 180 can operate in paste mode in response to a touch drag input 5102 after the touch input 5101 at the high pressure (FIG. 51 (b)). FIG. 51 (c) shows a state of receiving a touch input 5103 at a low pressure. In this instance, the controller 180 can operate in copy mode in response to a touch drag input 5104 after the touch input 5103 at the low pressure (FIG. 51 (d)). Thus, while the controller 180 performs the copy operation, the controller 180 can output an animation effect of cutting with a sound effect of a burning-in sound.

Meanwhile, the above-described operation mode selection may be performed to the contrary. In particular, the controller 180 can operate in copy mode in response to a touch input at a high pressure. And the controller 180 can operate in paste mode in response to a touch input at a low pressure.

Figure 52:
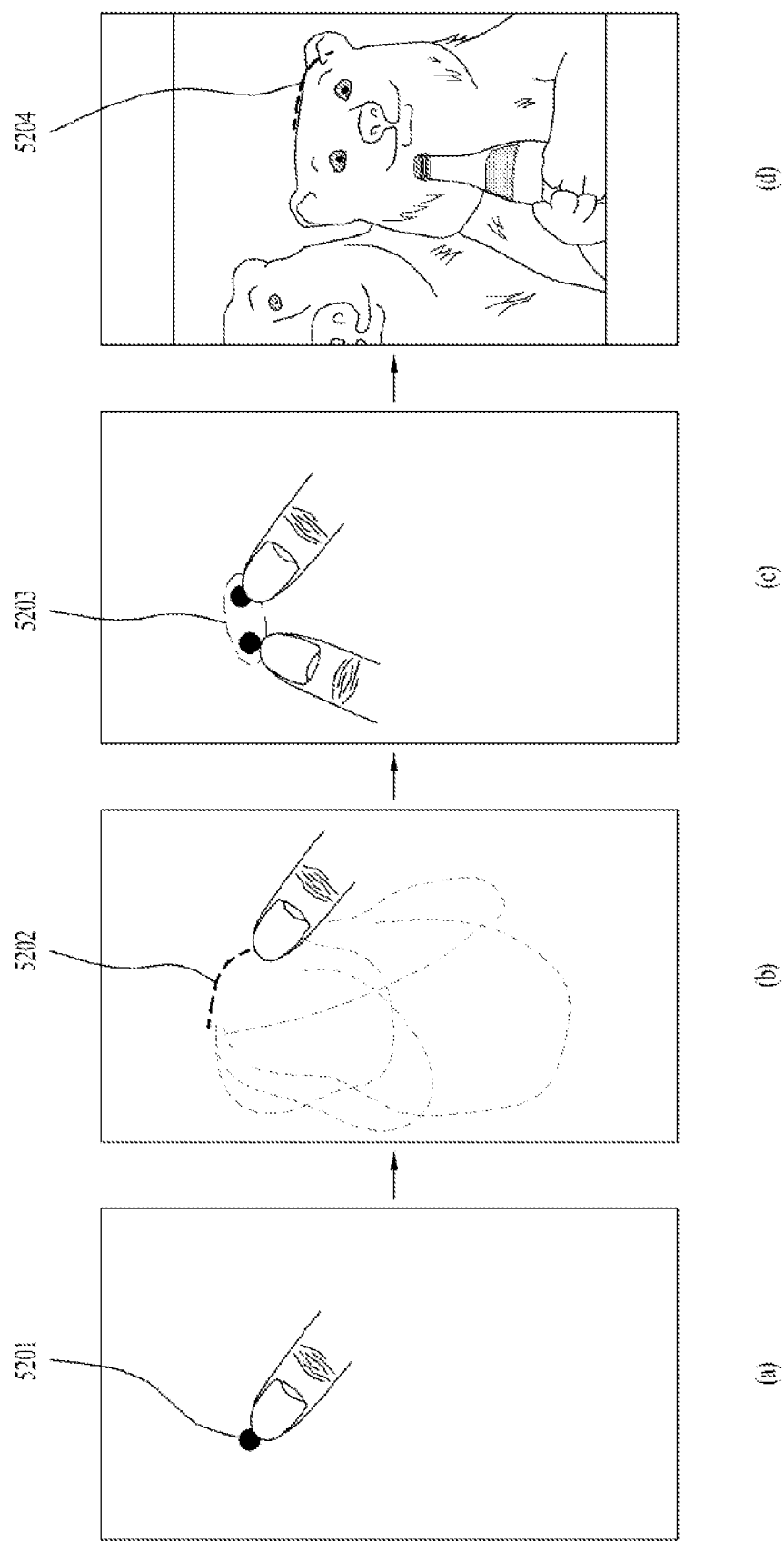
FIG. 52 is a diagram illustrating a fourth example of discriminating a paste operation and a copy operation according to one embodiment of the present invention.

FIG. 52 is a diagram illustrating a fourth example of discriminating a paste operation and a copy operation according to one embodiment of the present invention. According to the fourth example, a start input of a touch drag is discriminated as a single touch or a multi-touch. Based on a result of the discrimination, it is proposed to select an operating mode.

FIG. 52 (a) shows a state of receiving a single touch input 5201. In this instance, the controller 180 can operate in paste mode in response to a touch drag input 5202 after the single touch input 5201 (FIG. 52 (b)). FIG. 52 (c) shows a state of receiving a multi-touch input 5203. In this instance, the controller 180 can operate in copy mode in response to a touch drag input 5204 after the multi-touch input 5203 (FIG. 52 (d)).

Meanwhile, the above-described operation mode selection may be performed to the contrary. In particular, the controller 180 can operate in copy mode in response to a single touch input. And the controller 180 can operate in paste mode in response to a multi-touch input.

Figure 53:
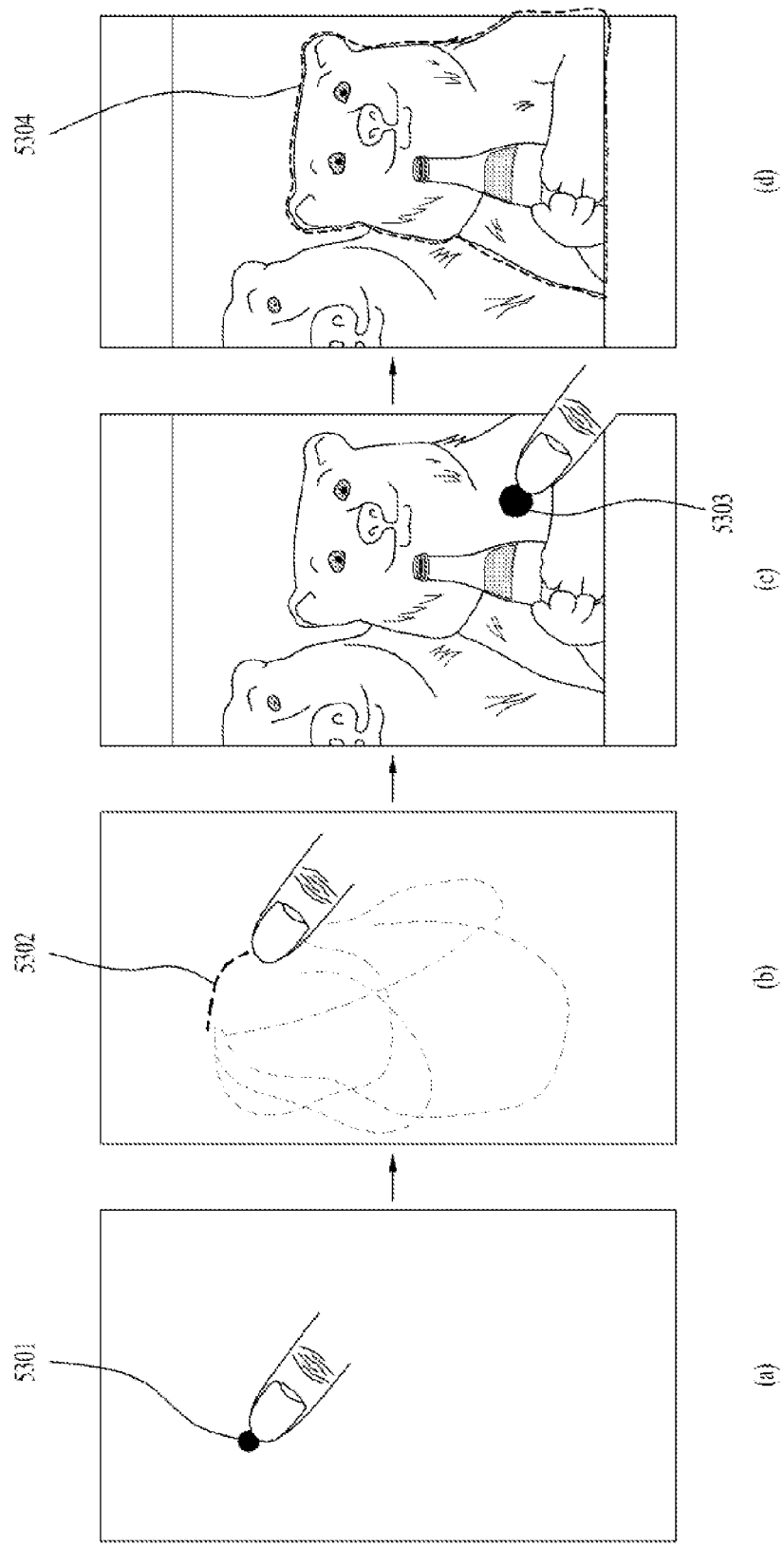
FIG. 53 is a diagram illustrating a fifth example of discriminating a paste operation and a copy operation according to one embodiment of the present invention.

FIG. 53 is a diagram illustrating a fifth example of discriminating a paste operation and a copy operation according to one embodiment of the present invention. According to the fifth example, operation discrimination is proposed to be performed through discrimination between a direct touch and a proximity touch.

FIG. 53 (a) shows a state of receiving a direct touch input 5301. In this instance, the controller 180 can operate in paste mode in response to a touch drag input 5302 after the direct touch input 5301 (FIG. 53 (b)). FIG. 53 (c) shows a state of receiving a proximity touch input 5303. In this instance, the controller 180 can operate in copy mode in response to a proximity touch drag input 5304 (or an air gesture) after the proximity touch input 5303 (FIG. 53 (d)).

Meanwhile, the above-described operation mode selection may be performed to the contrary. In particular, the controller 180 can operate in copy mode in response to a direct touch input. And the controller 180 can operate in paste mode in response to a proximity touch input.

Figure 54:
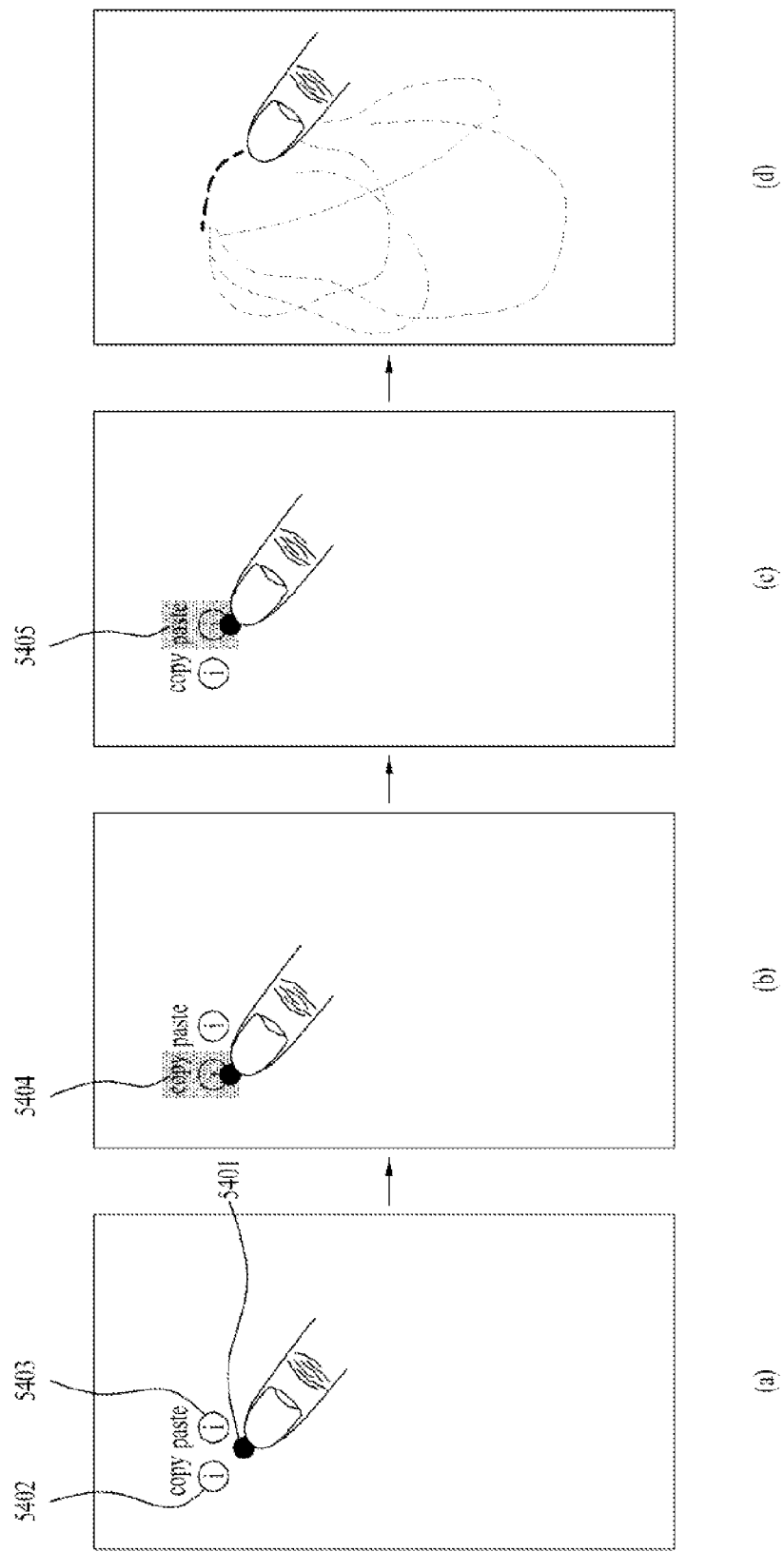
FIG. 54 is a diagram illustrating a sixth example of discriminating a paste operation and a copy operation according to one embodiment of the present invention.

FIG. 54 is a diagram illustrating a sixth example of discriminating a paste operation and a copy operation according to one embodiment of the present invention. According to the sixth example, after mode selecting icons 5402 and 5403 have been output, a mode is proposed to be selected by a user. FIG. 54 (a) shows a state of receiving a touch input 5401. In this instance, in response to the touch input 5401, the controller 180 can output a copy operation icon 5402 and a paste operation icon 5403.

If the controller 180 receives an input of selecting one of a copy operation icon 5402 and a paste operation icon 5403, the controller 180 can operate in the corresponding mode.

As an example of an input for selection, there is a drag input to each operation icon by maintaining the touch input 5401. In particular, referring to FIG. 54 (b), while the touch input 5401 is maintained, if a touch drag is input to the copy operation icon 5402, the controller 180 can output a first identifier 5404 indicating that the copy operation has been selected. While the copy operation icon 5402 is selected, if a prescribed time expires, the controller 180 confirms the selected operation and can then operate in the confirmed operation mode.

On the contrary, referring to FIG. 54 (c), while the touch input 5401 is maintained, if a touch drag is input to the paste operation icon 5403, the controller 180 can output a second identifier 5405 indicating that the paste operation has been selected. While the paste operation icon 5403 is selected, if a prescribed time expires, the controller 180 confirms the selected operation and can then operate in the confirmed operation mode, i.e., the paste operation mode (FIG. 54 (d)).

Figure 55:
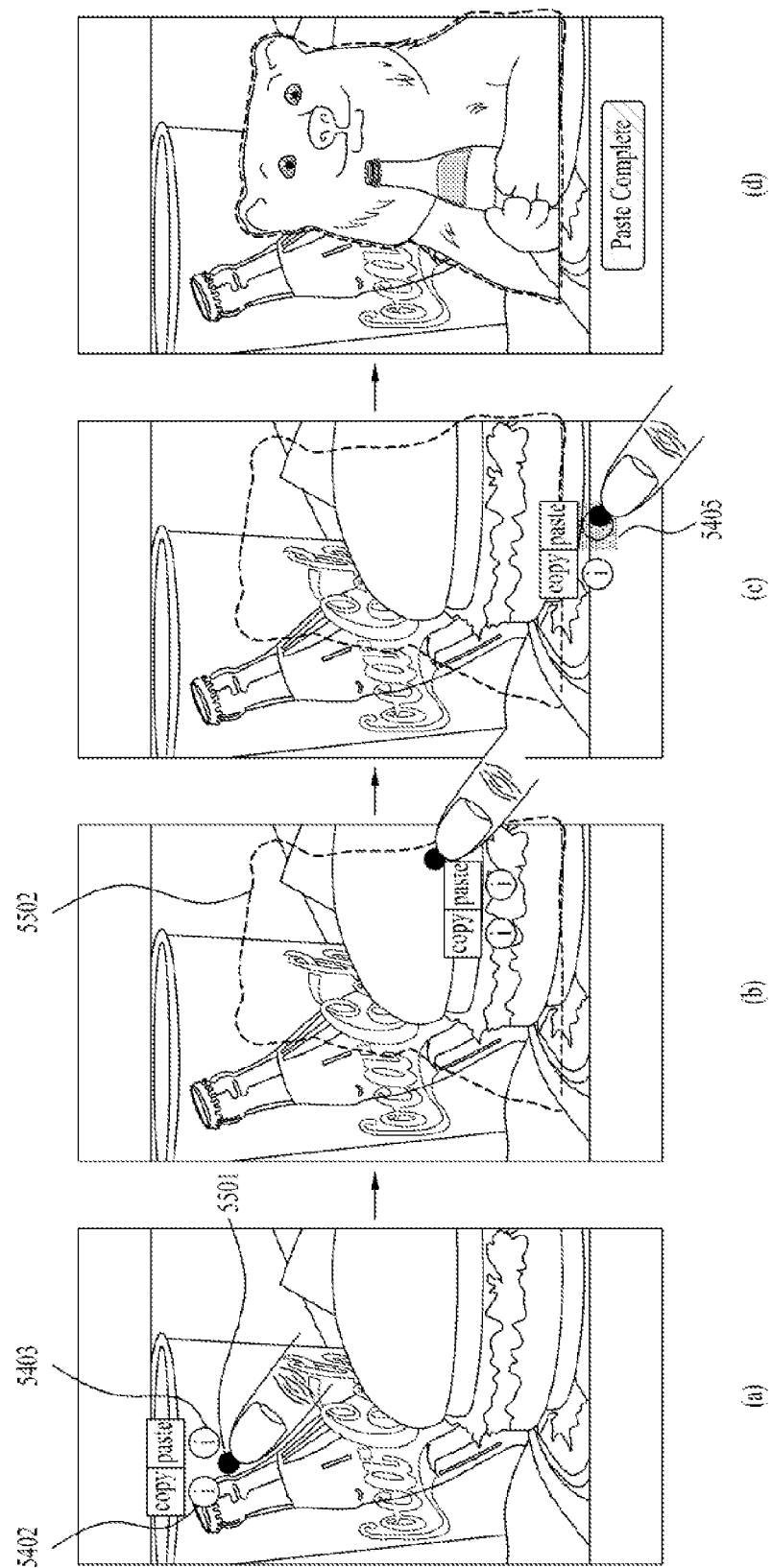
FIG. 55 is a diagram illustrating a seventh example of discriminating a paste operation and a copy operation according to one embodiment of the present invention.

FIG. 55 is a diagram illustrating a seventh example of discriminating a paste operation and a copy operation according to one embodiment of the present invention. According to the seventh example, after mode selecting icons 5402 and 5403 have been output, a mode is proposed to be selected by a user like the former example. A difference between FIG. 54 and FIG. 55 includes the difference between the example (FIG. 54) of making a selection before a touch drag input and the example (FIG. 55) of making a selection after a touch drag input.

FIG. 55 (a) is a state diagram of an image editing screen. Referring to FIG. 55 (a), a touch input 5501 is applied. Referring to FIG. 55 (b), while the touch input 5501 is maintained, a touch drag input 5502 is received. In the seventh example, the controller 180 can change locations of the mode selecting icons 5402 and 5403 depending on a location of the touch input changing in response to a touch drag. In particular, the controller 180 can change an output location of each of the mode selecting icons 5402 and 5403 using a location of a finger with which the touch is maintained.

FIG. 55 (c) is a state diagram of a point at which the touch drag input ends. Referring to FIG. 55 (c), the controller 180 currently outputs the mode selecting icons 5402 and 5403 to the touch input removed location. Subsequently, if the paste operation icon 5403 is selected, the controller 180 can perform the paste operation corresponding to an input touch path (FIG. 55 (d)). In particular, referring to FIG. 55 (d), the controller 180 searches for an image corresponding to the input touch path 5502 and then performs a paste operation on the found image (e.g., a first image 5503).

Meanwhile, in the seventh embodiment described with reference to FIG. 55, since a touch drag input is received before determining a copy mode or a paste mode, it may be appropriate not to perform an operation of outputting a candidate group in the paste mode. Moreover, although the paste operation mode is selected, if an image corresponding to an input touch path is not found, the controller 180 indicates that any image is not found and may not perform the paste operation.

Meanwhile, according to one embodiment of the present invention, the above described copy and paste operations may be applicable to an icon or widget on a home screen as well as to an image. Thus, a corresponding embodiment shall be described with reference to FIG. 56 as follows.

Figure 56:
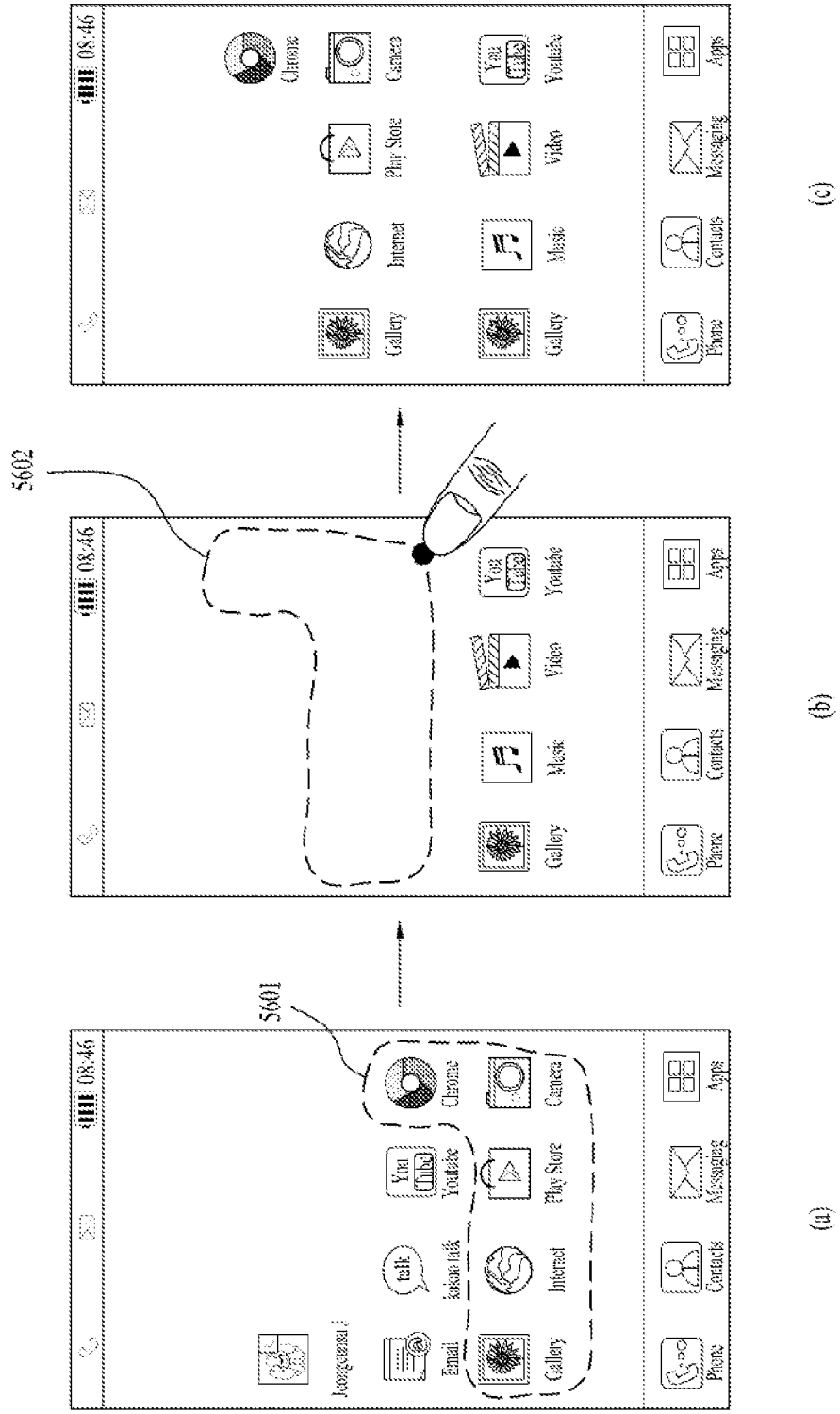
FIG. 56 is a diagram illustrating one example of a method of performing a copy & paste operation on a home screen according to one embodiment of the present invention.

FIG. 56 is a diagram illustrating one example of a method of performing a copy & paste operation on a home screen according to one embodiment of the present invention. FIG. 56 (a) is a state diagram of an icon copy mode. In the icon copy mode, the controller 180 recognizes a touch path established by a touch drag input. If a closed curve 5601 is formed by the recognized touch path, the controller 180 can copy the icons inside the formed closed curve. In particular, referring to FIG. 56 (a), an icon 'Chrome', an icon 'Gallery', an icon 'Internet', an icon 'Play store' and an icon 'camera' are copied to a clipboard.

FIG. 56 (b) is a state diagram of an icon paste mode. In the icon paste mode, the controller 180 recognizes a touch path 5602 established by a touch drag input and then searches for icons saved by a touch path similar to the recognized touch path 5602. In particular, by a gesture for drawing the touch path similar to the former touch path drawn for saving the icons, it can perform the paste operation of pasting icons. Subsequently, the controller 180 performs a paste operation of pasting the found icons on the home screen.

In particular, referring to FIG. 56 (b), the icon 'Chrome', the icon 'Gallery', the icon 'Internet', the icon 'Play store' and the icon 'camera' are pasted on the home screen (FIG. 56 (c)). If a prescribed one of the pasted icons is touched (or selected), it is a matter of course that a corresponding application can be activated. Regarding the mode switching between the icon copy mode and the icon paste mode, which is described with reference to FIG. 56, it may be able to discriminate the two modes from each other by one of the methods described with reference to FIGS. 49 to 55.

Moreover, one embodiment of the present invention can be extended and applied to a file and folder copy & paste operation as well as to the icon copy & paste operation. Thus, a corresponding embodiment shall be described with reference to FIG. 57 as follows.

Figure 57:
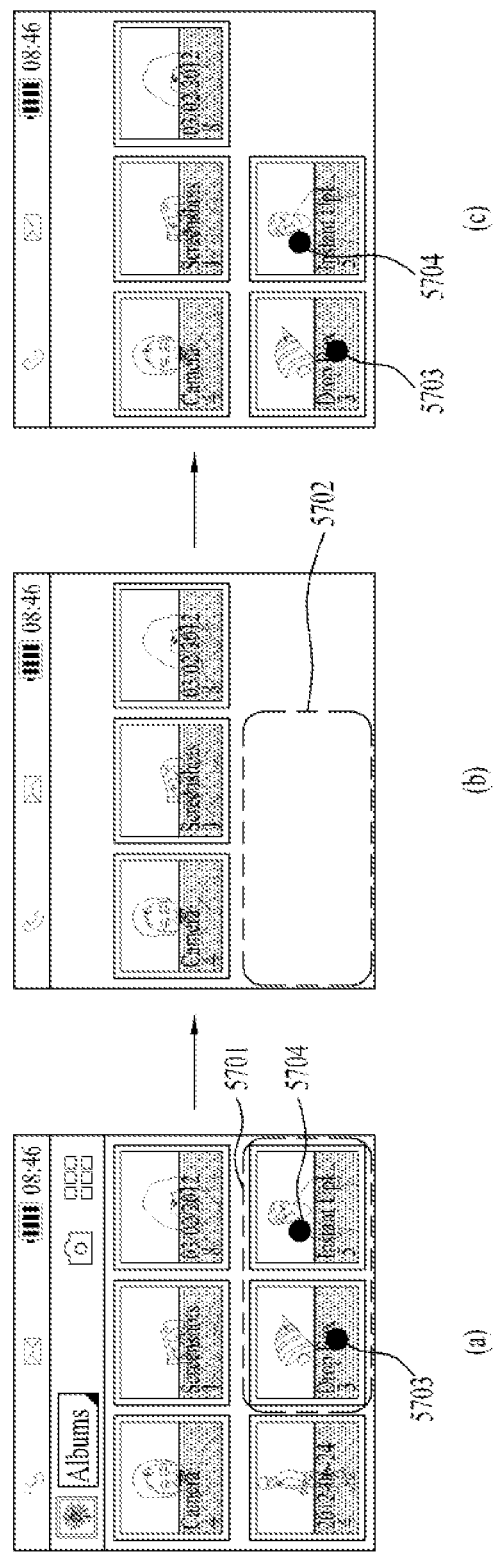
FIG. 57 is a diagram illustrating one example of a copy & paste operation for a file and folder according to one embodiment of the present invention.

FIG. 57 is a diagram illustrating one example of a copy & paste operation for a file and folder according to one embodiment of the present invention. In particular, FIG. 57 shows one example of a case of managing a photo file in a gallery application.

Referring to FIG. 57 (a), photo folders, each of which containing photo files, in a gallery application are displayed. In this instance, it can perform a copy operation according to one embodiment of the present invention. If a closed curve 5701 is formed by a touch path, the controller 180 can perform a copy operation on a folder (and file) located inside the formed closed curve 5701. In the example shown in FIG. 57 (a), a first folder 5703 and a second folder 5704 are copied to a clipboard. A user can paste the first and second folders 5703 and 5704 copied to the clipboard on another location or position.

Referring to FIG. 57 (b), files and folders different from those shown in FIG. 57 (a) are displayed on a gallery application. A user can perform a paste operation of pasting the first and second folders 5703 and 5704, which are copied to the clipboard, on the corresponding location. If a touch path 5702 similar to the aforementioned closed curve 5701 is input, the controller 180 can paste the first and second folders 5803 and 5704 on a location to which the touch path is input (FIG. 57 (c)).

Figure 58:
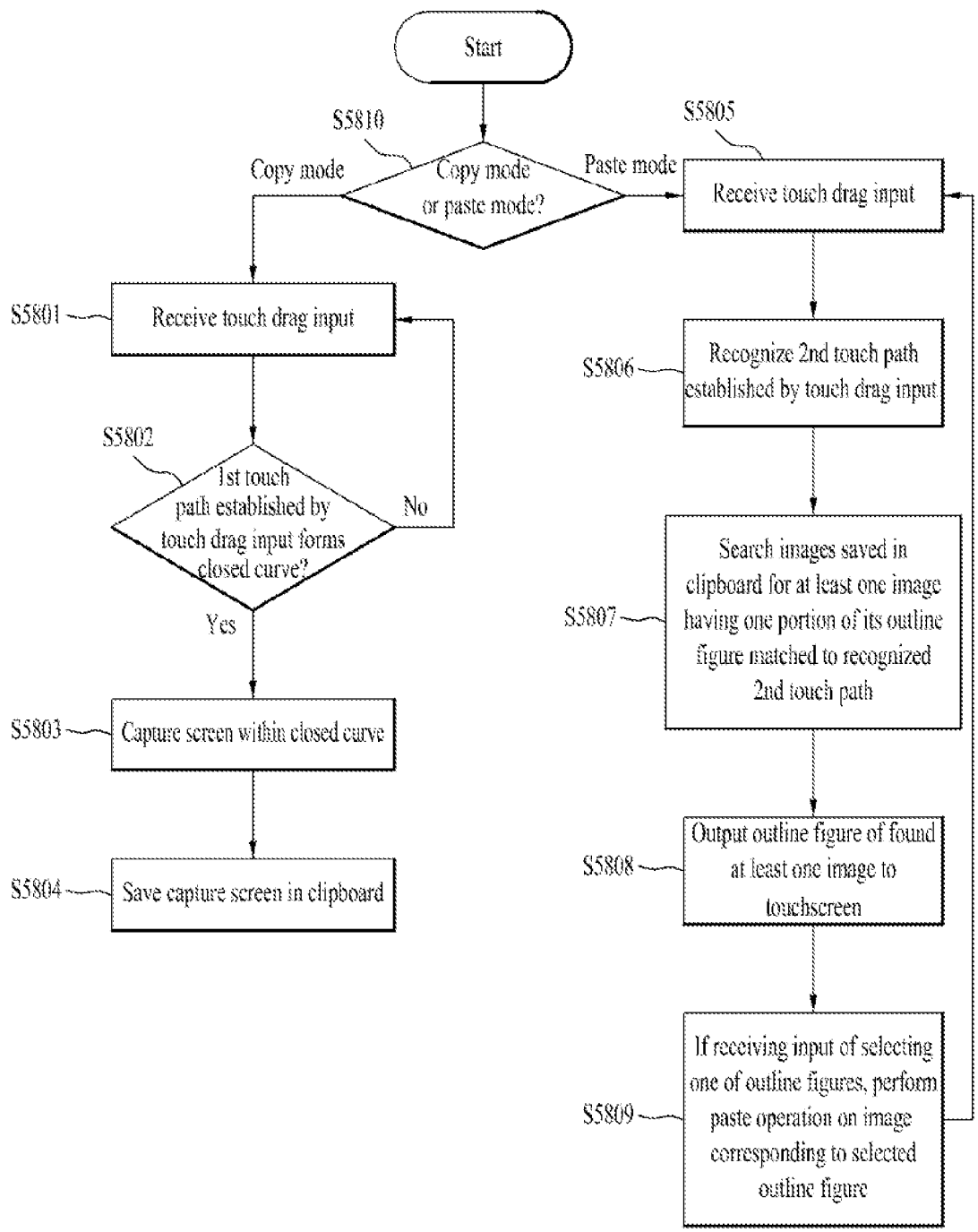
FIG. 58 is a flowchart of a method according to one embodiment of the present invention.

FIG. 58 is a flowchart of a method according to one embodiment of the present invention. Referring to FIG. 58, in a step S5810, the controller 180 determines whether a current mode is a copy mode or a paste mode. Thus, the controller 180 can discriminate the two modes from each other by one of the methods described with reference to FIGS. 49 to 55. If the controller 180 determines that the current mode is the copy mode, the controller 180 goes to a step S5801. If the controller 180 determines that the current mode is the paste mode, the controller 180 goes to a step S5805.

In the step S5801, the controller 180 receives a touch drag input through the touchscreen. In a step S5802, the controller 180 determines whether a first touch path established by the received touch drag input forms a closed curve. If the closed curve is not formed, the controller 180 returns to the step S5801. If the closed curve is formed, the controller 180 can go to a step S5803.

In the step S5803, the controller 180 can capture a screen within the closed curve. In a step S5804, the controller 180 saves the captured screen in the clipboard. If the controller 180 completes the saving, the controller 180 returns to the step S5801 of receiving a touch drag input.

In the following description, a pasting step is explained. First of all, in the step S5805, the controller receives a touch drag input in paste mode. In a step S5806, the controller 180 can recognize a second touch path established by the received touch drag input. In a step S5807, the controller 180 can search images saved in the clipboard for at least one image having a portion of its outline figure matched to the recognized second touch path.

In a step S5808, the controller 180 outputs the outline figure of the found at least one image to the touchscreen. Finally, in a step S5809, if the controller 180 receives an input of selecting one of outline figures, the controller 180 can perform a paste operation for the image corresponding to the selected outline figure. After performing the paste operation, the controller 180 can return to the step S5805.

Accordingly, embodiments of the present invention provide several advantages. According to at least one of embodiments of the present invention, various kinds of contents can be efficiently managed and controlled. Further, a copy & paste operation on a capture screen of a region designated by a user is facilitated.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
 a wireless communication transceiver configured to provide wireless communication;
 a touchscreen;
 a memory; and a processor configured to:
  display an active screen of a first application including at least one contact content on the touch screen;
  receive a first input for selecting at least one contact content displayed on the touch screen;
  receive a second input for copying the selected at least one contact content into a clipboard;
  display the clipboard with the active screen of the first application, wherein the clipboard includes clipboard data comprising the stored at least one contact content, wherein the processor is further configured to display a clipboard handler at an edge contents in the clipboard;
  receive a third input for displaying an execution screen of a second application;
  receive a fourth input for selecting the at least one contact content from the clipboard data displayed in the clipboard by touching the at least one contact content and maintaining the touch over a prescribed duration;
  when the clipboard occupies a full screen of the touch screen and in response to the received fourth input, stop displaying the clipboard except the at least one contact content; and
  receive a fifth input for pasting the selected at least one contact content from the clipboard to a location in the second application,
  if the location in the second application is a region designated by the second application for a reception counterpart, a contact information for designating a counterpart related to the copied at least one contact content is inputted in the region for designating the reception counterpart, and
  if the location in the second application is a region designated by the second application for inputting a message to be sent, the contact information and an additional content related to the corresponding copied at least one contact content is inputted in the region for inputting the message.

2. The mobile terminal of claim 1, wherein the processor is further configured to display the execution screen of the second application with the clipboard.

3. The mobile terminal of claim 1, wherein the first application is a contact application.

4. The mobile terminal of claim 1, wherein the second application is a message transceiving application.

5. The mobile terminal of claim 1, wherein the processor is further configured to modify the copied at least one contact content into image data if a property of the second application corresponds to a type of an image data.

6. The mobile terminal of claim 1, wherein the pasting the selected at least one contact content comprises a touch and drag from the clipboard to a first or second location of the displayed execution screen of the second application.

7. The mobile terminal of claim 1, wherein the processor is further configured to save the at least one contact content stored in the clipboard through the touchscreen in the memory.

8. The mobile terminal of claim 1, wherein the processor is further configured to vertically display the clipboard.

9. The mobile terminal of claim 1, wherein the selected at least one contact content includes at least one of a name, phone number and e-mail information of the selected at least one contact.

10. The mobile terminal of claim 1, wherein the processor is further configured to fade rest of regions except a designated area in response to receiving the first input.

11. A method of controlling a mobile terminal, the method comprising:
  displaying an active screen of a first application including at least one contact content on the touch screen;
  receiving a first input for selecting the at least one contact content displayed on the touch screen;
  receiving a second input for copying the selected at least one contact content into a clipboard;
  displaying the clipboard with the active screen of the first application, wherein the clipboard includes clipboard data comprising the stored at least one contact content;
  displaying a clipboard at an edge of the clipboard for expanding a size of the clipboard if there are multiple copied contents in the clipboard;
  receiving a third input for displaying an execution screen of a second application;
  receiving a fourth input selecting the at least one contact content from the clipboard data displayed in the clipboard by touching the at least one contact content and maintaining the touch over a prescribed duration;
  when the clipboard occupies a full screen of the touch screen and in response to the received fourth input, stopping displaying the clipboard except the at least one contact content; and
  receiving a fifth input for pasting the selected at least one contact content from the clipboard to a location in the second application,
  if the location in the second application is a region designated by the second application for a reception counterpart, inputting a contact information for designating a counterpart related to the copied at least one contact content in the region for designating the reception counterpart, and
  if the location in the second application is a region designated by the second application for inputting a message to be sent, inputting the contact information and an additional content related to the corresponding copied at least one contact content in the region for inputting the message.

12. The method of claim 11, further comprising displaying the execution screen of the second application with the clipboard.

13. The method of claim 11, wherein the first application is a contact application.

14. The method of claim 11, wherein the second application is a message transceiving application.

15. The method of claim 11, wherein the pasting the selected at least one contact content comprises a touch and drag from the clipboard to a first or second location of the displayed execution screen of the second application.

* * * * *